(12) United States Patent
McLaughlin et al.

(10) Patent No.: US 6,385,255 B1
(45) Date of Patent: May 7, 2002

(54) CODING SYSTEM AND METHOD FOR PARTIAL RESPONSE CHANNELS

(75) Inventors: Steven W. McLaughlin, Decatur, GA (US); David C. Lee, Berkeley, CA (US); Jonathan A. Zingman, Oakland, CA (US); John L. Fan, Palo Alto, CA (US)

(73) Assignee: Calimetrics, Inc., Alameda, CA (US)

( * ) Notice: Subject to any disclaimer, the term of this patent is extended or adjusted under 35 U.S.C. 154(b) by 0 days.

(21) Appl. No.: 09/369,746

(22) Filed: Aug. 6, 1999

(51) Int. Cl.[7] .............................. H03M 5/16; H03M 5/20
(52) U.S. Cl. ...................... 375/263; 375/290; 375/341; 360/40; 369/18
(58) Field of Search ................................. 375/262, 263, 375/264, 265, 290, 291, 296, 340, 341, 348; 714/755, 792, 794, 795; 369/18; 360/40

(56) References Cited

U.S. PATENT DOCUMENTS

| | | | | |
|---|---|---|---|---|
| 4,888,779 A | | 12/1989 | Karabed et al. | 371/43 |
| 5,257,272 A | | 10/1993 | Fredrickson | 371/43 |
| 5,331,320 A | | 7/1994 | Cideciyan et al. | 341/56 |
| 5,497,384 A | | 3/1996 | Fredrickson et al. | 371/43 |
| 5,537,382 A | | 7/1996 | McLaughlin et al. | 369/116 |
| 5,781,130 A | | 7/1998 | McLaughlin et al. | 341/56 |
| 5,790,571 A | | 8/1998 | Varanasi | 371/40.12 |
| 5,809,080 A | * | 9/1998 | Karabed et al. | 375/263 |
| 5,818,806 A | | 10/1998 | Wong et al. | 369/59 |
| 5,854,779 A | | 12/1998 | Johnson et al. | 369/59 |
| 6,029,264 A | * | 2/2000 | Kobayashi et al. | 714/755 |

OTHER PUBLICATIONS

"Magnetoresistive Heads and Parital Response Maximum Likelihood Read Channels Technology Overview", http://www.andatco.com/genesis_s/segment1/techinfo/white_papers/mrhead/mrhead.html, Feb. 3, 1999.

Taratorin, Alex, "Characterization of Magnetic Recording Systems: A Practical Approach", Chapter 9 "Introduction to PRML", http://www.guzik.com/Chapter9.htm, Feb. 3, 1999.

* cited by examiner

*Primary Examiner*—Amanda T. Le
(74) *Attorney, Agent, or Firm*—Knobbe Martens Olson & Bear LLP

(57) ABSTRACT

A system and method for reading data to and writing data from multi-level (M-ary) partial response channels uses a trellis coder to encode an input bit stream sequence into a stream of multi-level data symbols. The data symbols are written to the partial response channel using any of a number of techniques. Preferably, the trellis coder anticipates the modulation transfer function of the partial response channel in encoding the data. Because the partial response channel has its own transfer function, the relationship between the data read from the channel and the actual input data bits is a function not only of the data encoder but also of the partial response channel. Therefore, a decoder specification used to implement the decoder takes into account the effect of the trellis encoder as well as the effect of the partial response channel.

56 Claims, 17 Drawing Sheets

CODING SYSTEM AND METHOD FOR PARTIAL RESPONSE CHANNELS

BACKGROUND OF THE INVENTION

1. Field of the Invention

The present invention relates generally to partial response channels, and more particularly to a system and method for equalization and coding on a partial response channel.

2. Related Art

The proliferation of processors and processor-based systems in recent years has led to a tremendous increase in the ability of businesses, industry and individuals to share or otherwise communicate information. Most computers and workstations in today's homes and offices are connected in some manner to another computer or workstation, either locally or remotely. An early form of such inter-connection of computing systems is the local area network (LAN). Using LAN technology, several computers, workstations, peripherals, or other related devices can be connected to share data among one another and to share network resources.

Another technique used for sharing data among a plurality of computing resources is by writing the data to a data storage medium, and physically transporting the data on that medium to another computing system. One such medium that has gained popularity in recent years is the CD (compact disk). CD technology offers relatively high density recording and rapid data access. The cost of a blank recordable CD media has fallen dramatically. In fact, CD media is one of the cheapest mass-storage device available today, at slightly less then $0.01/MB. Additionally, the latest DVDs (Digital Versatile Discs) store 4.7 to 17 GB of data on a single, two-layered, double-sided disc.

Regardless of the communication or storage medium (i.e., channel) used to transmit or store data, system designers strive to increase data densities and access speeds, and to reduce media costs and error-rates. However, these interests are often competing. For example, as data densities and access speeds increase, the likelihood of introducing errors also increases. As such, data transmission and recording requires precise knowledge about the signal sensed by the read head.

When recording density is low, each transition written on the medium results in a relatively isolated voltage peak and conventional peak detection methods can be used to recover written information. However, as densities and readback speeds increase, inter-symbol interference arises and the peak detection channel can not provide reliable data detection. Inter-symbol interference results from the overlap of signal peaks as they stream past the read head at higher and higher rates. As a result, a different detection principle is desired if the density of recording is to be increased. Rather than being based on voltage peaks, the principle should take into account the fact that signals from adjacent transitions interfere. In other words, the method of detection should be aware of the inter-symbol interference in the signal.

Inter-symbol interference has traditionally been combated by encoding the data as a stream of "symbols" as the data is written, allowing the peaks to be separated during read operations. The problem as been that the encoding requires more than one symbol per bit, negatively impacting both disk capacity and drive performance.

To address this issue, Partial Response Maximum Likelihood (PRML) coding was developed in the early 70's by a group of IBM researchers. In fact, PRML may be best known for its application in NASA's Viking Lander project, whose quest was to gather scientific information from the planet Mars. Used to communicate radio signals generated millions of miles from Earth, PRML technology allows engineers to keep data clear from background interference on its long trip back home.

Regardless of the application, the principal effect of PRML is that it can handle more tightly packed data than can peak detection, while improving noise rejection. PRML channels are not required to separate the peaks during read operations, but instead use advanced digital filtering techniques to manage inter-symbol interference. Managing inter-symbol interference, and accounting for it in coding techniques allows greater recording density by allowing media to store more information with some forms of PRML.

PRML employs digital processing and maximum likelihood detection to determine the sequence of bits that was most likely written on the medium. The phrase "Partial Response" refers to the fact that PRML does not directly provide user output information. Instead, additional decoding is required to arrive at the actual data, and is typically accomplished using Viterbi decoding. The phrase "Maximum Likelihood" refers to the step of converting the waveform to data. Viterbi detection represents an algorithm that checks all possible combinations of data and looks for the best match of least error with incoming data. The pattern that has the least error (difference) is the one with the maximum likelihood to be correct.

PRML can be implemented in a remarkably efficient manner, and this contributes to a faster transfer of data. This can be accomplished by using a more efficient Run Length Limited (RLL) coding scheme than, for example, the (1,7) or (2,10) RLL coding used by traditional peak detection schemes.

SUMMARY OF THE INVENTION

The present invention is directed toward systems and methods for reading data from and writing data to multi-level (M-ary) partial response channels. According to one aspect of the invention, an encoder, such as, for example, a trellis coder, is used to encode an input bit stream sequence into a stream of multi-level data symbols. For example, in one application, the input bit stream is a stream of digital data bits and the output is a stream of M-ary multi-level symbols where M>2.

Although various coding techniques can be used, one embodiment utilizes Ungerboeck style trellis codes to code the input bit stream into multi-level data symbols. The data symbols can then be written to the channel using any of a number of techniques. In one embodiment, the multi-level symbols are used to modulate a write laser, which alters the properties of the medium onto which the data symbols are written. The altered properties can then be detected to read data off of the channel.

Preferably, according to one aspect of the invention, a trellis coder anticipates the modulation transfer function of the channel in encoding the data. For, example, for partial response channels, according to this aspect of the invention the encoder is designed taking into consideration the inter-symbol interference introduced by the channel. As such, the performance of the system can be enhanced.

Because the partial response channel has its own transfer function, the relationship between the data read from the channel and the actual input data bits is a function not only of the data encoder but also of the partial response channel. Therefore, according to another aspect of the invention, a decoder specification used to implement the decoder can be designed to take into account not only the effect of the encoder (e.g., trellis or other encoder), but also the effect of the partial response channel.

According to this aspect of the invention, in one embodiment, the decoder considers K*L states where K is the number of states in the trellis code and L is the number of possible states of the partial response channel. This is advantageous because typically the effects of the trellis coder and the partial response channel are not mutually exclusive but are, instead, dependent upon one another. It should be noted that the partial response channel can include, for example, the zero-forcing case (e.g., $\alpha_1=1$, $\alpha_2=0, \ldots \alpha_n=0$) as well as other partial response channels.

Further features, advantages and aspects of the invention are described in detail below in accordance with one or more embodiments and with reference to the accompanying drawings.

BRIEF DESCRIPTION OF THE DRAWINGS

FIG. 3A is a diagram illustrating an example pattern of marks representing the multi-level symbols according to one embodiment of the invention.

FIG. 3B is a diagram illustrating a conceptual waveform that represents the example signal written on the disc as illustrated in FIG. 3A according to one embodiment of the invention.

FIG. 3C is a diagram illustrating a signal r(t) representing the actual signal observed when the written pattern is read according to one embodiment of the invention.

FIG. 4A is a diagram illustrating a read laser pattern according to one embodiment of the invention.

FIG. 4B is a diagram illustrating a read laser pattern reading levels stored in marks according to one embodiment of the invention.

FIG. 4C is a diagram illustrating read laser results in the detection of a current mark according to one embodiment of the invention.

DETAILED DESCRIPTION OF THE PREFERRED EMBODIMENTS

1. Introduction and Overview

The present invention is directed toward a system and method for data coding techniques to improve the response of a channel. According to one aspect of the invention, coding techniques, including trellis coding, can be combined with decoding (e.g., Viterbi decoding) to store and read data to and from a multi-level partial response channel.

The present invention provides several features and aspects that can be included with the coding and decoding techniques to enhance the performance of the system. These features and aspects, which can be implemented individually or collectively, are discussed in detail below.

2. Example Environment—Multi-Level Data Storage

Before describing the invention in detail, it is useful to describe a simple example environment in which the invention can be implemented. One such example environment is that of storing or recording multi-level data in a linear or non-linear data storage medium.

Figure 1:
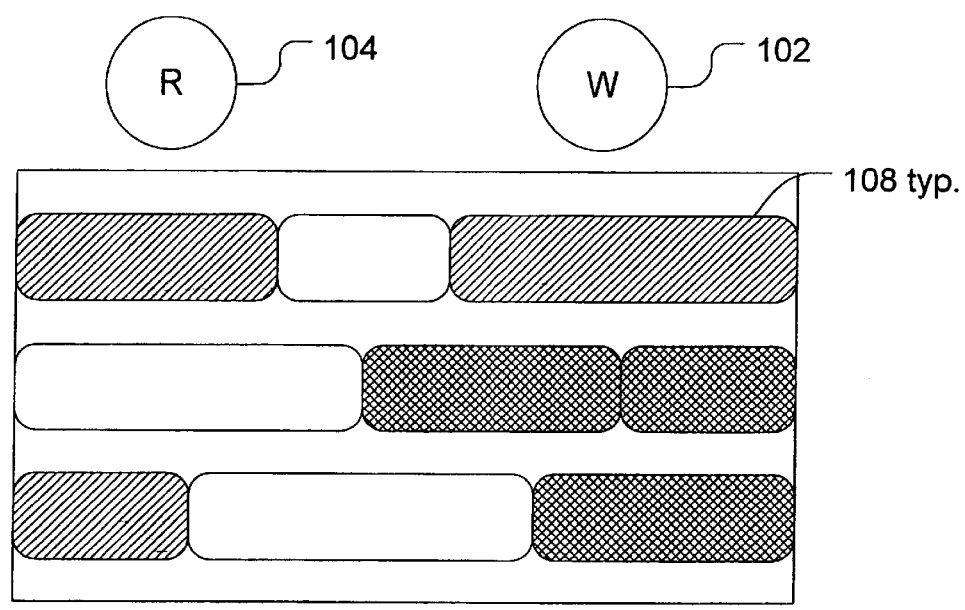
FIG. 1 is a diagram illustrating a portion of a track written to a channel with marks having different intensity and length according to one embodiment of the invention.

A model of an M-ary channel according to one example environment is now described. After reading this description, it will become apparent to one of ordinary skill in the art how to implement the invention using alternative channel configurations. FIG. 1 is a diagram illustrating a portion of a track written with marks 108 having different intensity and length. The different intensities represent the different levels of data. For an M-ary channel, there are M different intensities, one of which can be "zero."

The channel can be written and read optically by separate lasers, which are preferably focused to spots on the media. A write spot 102 of diameter $L_w$ and a read spot 104 of diameter $L_R$ result from focusing a write laser and a read laser onto the media. Because of the Gaussian properties of coherent laser beams, the spots are generally circular. However, because the disk is spinning during read and write operations, the effective spot shape 108 actually takes on more of an oblong shape as illustrated in FIG. 1. In one embodiment, the write laser and the read laser have the same beam diameter, and therefore, $L_W=L_R$. In alternative environments, $L_W \neq L_R$, which is one cause of inter-symbol interference as discussed below.

For writing multiple levels of data, the write laser is positioned above a track on a rotating disk and it is modulated. Different characteristics can be modulated, such as phase, intensity, etc. The attributes of the resultant mark on the disk is indicative of the modulated characteristic. For example, for intensity modulation, the intensity of the resultant spot is somewhat proportional to the write laser intensity. Thus, in this example, multiple levels of encoding are provided by modulating the intensity of the write laser.

For reading, the read laser is positioned relative to the track to be read. Preferably, a constant intensity illumination is provided to the written-to media. As a result of the energy provided by the read laser, the intensity, or other level-related attribute, of the spots can be read by a detector. This allows multiple levels of data to be detected at the read stage.

Some embodiments may utilize electron-trapping materials to store multiple levels of data on an optical storage medium. Examples of materials that can be used as storage media for M-ary storage are described in U.S. Pat. Nos. 4,915,982, 4,834,536, 4,830,875, 4,839,092, 4,806,772 and 4,842,960. Examples of an optical disk and optical disk drive incorporating electron trapping materials for data storage are disclosed in U.S. Pat. Nos. 5,142,493 and 5,007037. The full disclosure of each of these patents is incorporated herein by reference.

Others embodiments may use a modulated write laser to alter the reflective properties of the medium. For example, some embodiments may use phase-change or pit-depth-modulation materials, which are more common than electron-trapping materials. In these alternative embodiments, varying degrees of altered reflective property on the medium can be used to represent the multiple levels of data recorded onto the medium. As will become apparent to one of ordinary skill in the art after reading this description, the coding techniques disclosed herein are not dependent on the particular medium or channel and are not dependent on particular techniques for writing M-ary data to the channel. The features and advantages obtained by the invention can be achieved with a number of different and alternative channels, media, and read/write techniques. Additionally, the various aspects of the invention can be accomplished with non-linear as well as linear recording or communication channels.

3. Coding and Decoding for Multi-Level Channels

Figure 2:
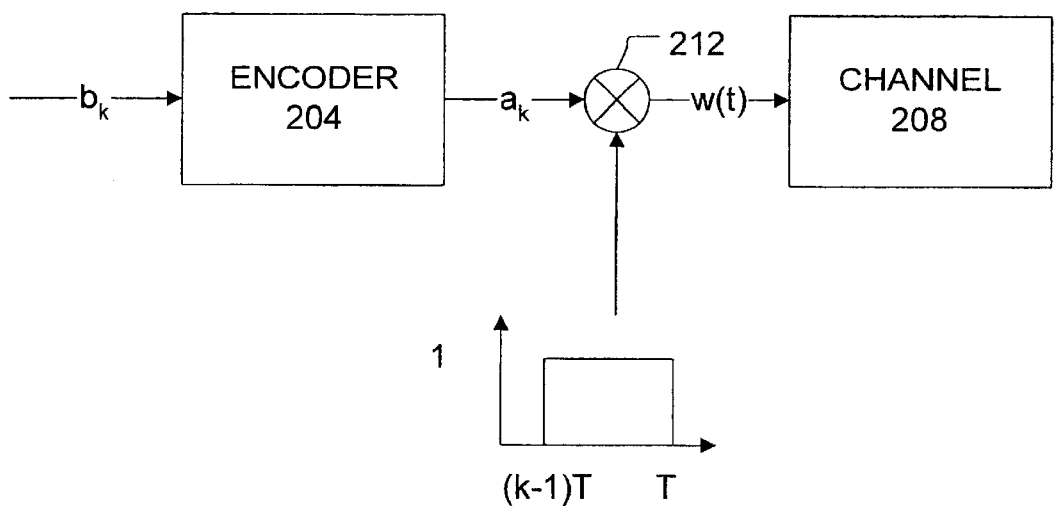
FIG. 2 is a block diagram illustrating a system-level channel model for an example multi-level, M-ary channel according to one embodiment of the invention.

FIG. 2 is a block diagram illustrating a system-level channel model for an example multi-level, M-ary channel. This model includes an encoder 204, an optical channel 208 and a multiplier 212. In this model, $b_k$ denotes a user bit sequence (i.e., the actual user data to be written to the channel). Typically, data to be recorded as provided by the user are in digital (binary) form, although other forms may be provided. This is because in most applications, the data are generated by a computer or other processor-based system.

To take full advantage of the multi-level properties of the storage medium, these digital data $b_k$ can encoded by encoder 204 to provide multi-level data $a_k$. To this end, encoder 204 receives the user bit sequence $b_k$ and codes this sequence to produce a coded channel symbol sequence $a_k$. The coded channel symbol sequence $a_k$ is the actual multi-level data to be written to the multi-level channel. As a result of this coding, the number of symbols $a_k$ used to represent the data in M-ary form is typically less than the number of bits $b_k$ used to represent the data in binary form. For example one octary (8-ary, or 8-level) symbol can carry as much information as three binary bits. Note, in other applications, data may already be provided as M-ary data, and as such, this encoding step can be avoided.

According to the examples described above, to record the sequence $a_k$ onto channel 208, the sequence is used to modulate the write laser as represented by multiplier 212. Variations in the amplitude of $a_k$ result in a variation in the intensity, phase, or other attribute of the modulated write-laser signal w(t). Because sequence $a_k$ is a sequence having M levels (theoretically $M \leq \infty$), the write laser is modulated to M levels. Therefore, M levels of data can be written to the medium.

In the example illustrated in FIG. 2, w(t) represents the modulated laser light, or, in reality, the mark pattern written on the disk where:

$$w(t) = \sum_{i=1}^{n} a_i b(t - iT_s)$$

In this equation, $b(t-iT_s)$ can be, for example, a "box" function representing one pulse of the unmodulated write laser and having a nominal height of one (1), a duration time of $T_s$ and $n<\infty$. Although there is flexibility in choosing a value for $T_s$, in one application, $T_s$ can be chosen to be substantially close to or equal to $T_w=L_w/v$, where $L_w$ is the spotsize of the write laser and v is the velocity of the medium. In an alternative application, at least one class of modulation codes, however, uses $T_s<T_w$. Of course, depending on the frequency response of the laser and optics, in the real world, the box function is generally not an ideal box function as illustrated in FIG. 2. Additionally, alternative pulse shapes can be used as well, and the shape is not restricted to a "box" function.

During the read process, information is read from the media using, for example, a read laser. For purposes of discussion, the read laser is assumed to have a spotsize $L_R$. The read laser illuminates the recorded marks and the media responds with a signal that is somewhat proportional to the mark intensity as originally determined by the modulation of the write laser (i.e., as modulated by $a_k$). With intensity modulation, for example, the output light can be measured using a photodetector whose output is an analog voltage r(t). An approximation to r(t) is a sliding, ideal integrator, namely $$r(t) = K \left[ \int_{t-T_R}^{t} w(\tau) d\tau + n(t) \right].$$

where the duration of the impulse is $T_R=L_R/v$. K is a proportionality constant and n(t) is a white Gaussian noise. Without loss of generality it can be assumed that K=1. A decoder (not illustrated in FIG. 2) can use r(t) to estimate the code sequence $a_k$.

One function of encoder 204 is to convert a sequence of user data bits to a channel waveform. Specifically, as described above, encoder 204 converts the user binary data to multi-level data. One measure of the performance of the code is its storage density D (in bits/unit area) and error probability $P_e$ (bit error rate, or BER).

The bit density D in user-bits/area is computed as D=b/vTW, where b is the number of bits stored during period T on a disk rotating at speed v with a track width W. Assuming a normalized product vW=1, and for convenience let $T=T_R$, the linear density D (often called density ratio) becomes(in bits/sec):

$$D=b/T_R,$$

Given this model, a preferable coded modulation scheme is one that densely stores user data with high reliability.

4. Example M-ary data with varying intensity

Figure 3:
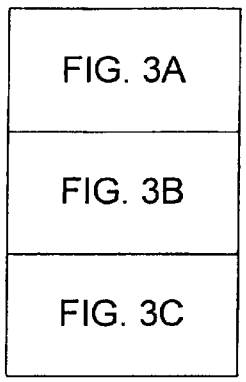
FIG. 3, which comprises
Figure 3A:
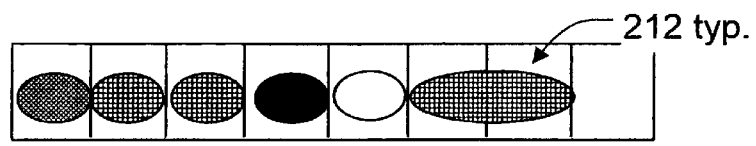
FIGS. 3A, 3B and 3C, is a diagram illustrating a multilevel phase change recording system according to one embodiment of the invention.
Figure 3B:
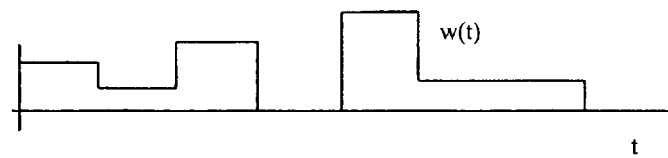
Figure 3C:
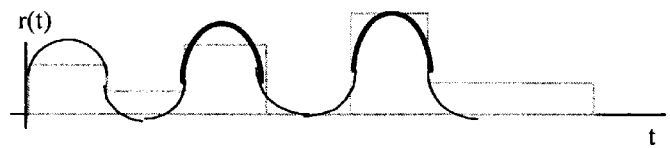

FIG. 3, which comprises FIGS. 3A, 3B and 3C, is a diagram illustrating a multilevel phase change recording system according to one embodiment of the invention. In this example system, the level of each symbol is represented by a different amplitude/phase write signal. Marks written using this write strategy can produce multilevel reflectivities. FIG. 3A shows an example pattern of marks representing the multi-level symbols. In the illustration, various shades of grey are used to illustrate different levels of the M-ary data.

The signal w(t) illustrated in FIG. 3B is a conceptual waveform that represents the example signal written on the disc(or to the channel) as illustrated in FIG. 3A. More specifically, w(t) is the encoded data that is desired to be stored on the disk. In one embodiment, the signal w(t) is applied to modulate the write laser, which, using the proper modulation techniques, can produce the reflectivities as illustrated in FIG. 3A.

FIG. 3C illustrates a signal r(t) representing the actual signal observed when the written pattern is read. The primary objective of this is to recover the signal w(t) from the observed signal r(t). Because of the response characteristics of the channel, the square wave input signal w(t) appears as a signal with rounded or softer transitions.

Intersymbol Interference

As a result of factors such as, for example, higher densities and faster read rates, inter-symbol interference can occur. Furthermore, in some applications, the read and write lasers may be diffraction limited. As a result, in these applications the read and write spot diameters, $L_R$ and $L_w$ as focused on the medium, can be made quite small. This has the beneficial effect of increasing storage density on the medium. The diffraction limits $L_{W,diff}$ and $L_{R,diff}$ are lower bounds on the spot sizes $L_w$ and $L_R$, respectively. Because the diffraction limit is proportional to the laser wavelength, $\lambda$, and because the lasers are diffraction limited, depending on the read and write wavelengths chosen, in some applications the read spot size $L_R$ is larger than the write spot size $L_w$. In fact, in one application using, for example, a blue write laser and a red read laser, $L_R$ is approximately 1⅓ times the size of $L_w$. The manner in which this spot size differential can induce an inter-symbol interference (i.e. partial response) channel is now described. Because the parameters can be controlled, the inter-symbol interference can also be controlled.

As described above, in this example both the read and the write laser are diffraction limited. The minimum mark $T_{min}$ is constrained by the spot size of the write laser $L_w$ and speed of the disk, namely $T_{min}=T_w$. The maximum mark $T_{max}$ is constrained by system timing requirements. Because many recording systems derive timing from transitions in the recorded signal level, periodic transitions in recorded amplitude are required, thus constraining the maximum width $T_{max}$ of a mark.

Due to the diffraction limiting, in the above-described embodiment having a blue write and a red read laser, read spot 104 is actually approximately 1⅓ times the size of write spot 102. One reason for diffraction limiting the write laser is to increase the density at which marks are written to the medium. Because spot size $L_w$ is constrained to the minimum beam waist size, the data density is maximized for a given write laser wavelength $\lambda_w$.

Figure 4:
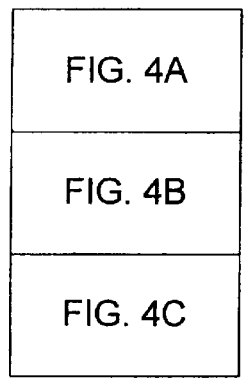
FIG. 4, which comprises
Figure 4A:
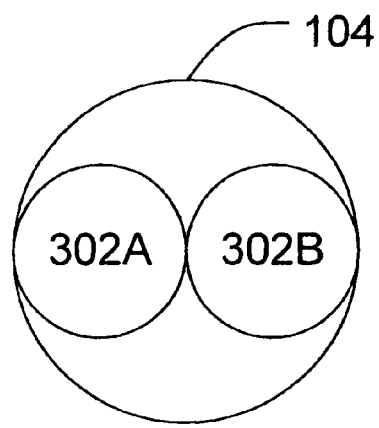
FIGS. 4A, 4B and 4C is a diagram illustrating read and write laser marks according to one embodiment of the invention.
Figure 4B:
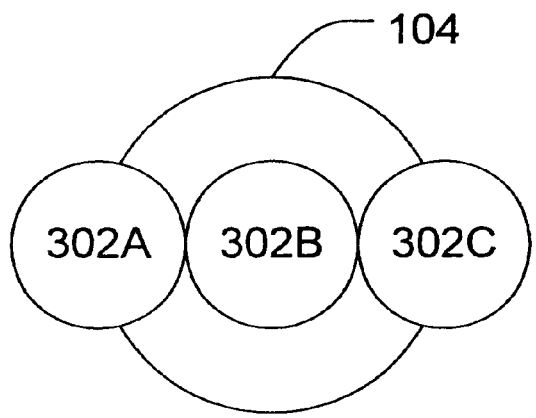

This advantage of a minimum $L_w$, however, is somewhat offset by a resultant inter-symbol interference that occurs during the read process. To elaborate, because $L_R$ is larger than $L_w$, when data are read, more than one symbol is read at a time. For example, assume that $L_R$ is twice the diameter of $L_W$. In this example, the read laser can actually cause data to be read from the spatial equivalent of two marks. This is illustrated in FIG. 4, which comprises FIGS. 4A, 4B and 4C. In FIG. 4A, read laser actually reads the data stored in marks 302A and 302B. In FIG. 4B, read laser reads the levels stored in marks 302A, 302B, and 302C. Because the detector cannot distinguish which of the received photons are from which mark, the detector provides a signal level that is the total of all photons detected. Thus, this inter-symbol interference can result in an erroneous reading.

Figure 4C:
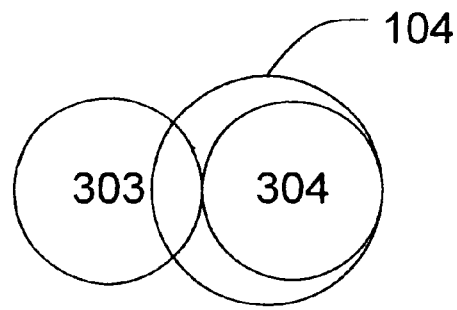

As another example, consider the embodiment described above where $L_R$ is 1⅓ times the size of $L_w$. In this example, illustrated in FIG. 4C, the read laser results in the detection of the current mark 304 (the mark we want to detect) plus one third of the previous mark 303. This is illustrated in FIG. 4C.

Inter-symbol interference may also arise out of factors other than wavelength or spot-size differentials. For example consider CD technology in which the symbols are written as well defined and discrete marks on the optical medium. When the marks are read, the speed of the disk results in the effect that the spots tend to blur, even though the marks are well defined. This phenomenon is similar to motion blur that occurs in photography. Where the subject is moving too fast for a given shutter speed, the subject appears blurred or elongated in the direction of travel. A similar phenomenon occurs with optical recording and playback. As disk speeds increase, the speed at which the spots move with respect to the read optics increases. Beyond a certain speed, the spots appear elongated, causing them to blur together. In high density recording, the spots are close enough together such that the read laser actually sees parts of the spots to the left and right of a subject spot. Consequently, inter-symbol interference occurs.

Thus, even with read and write lasers at the same wavelengths, inter-symbol interference may arise. Additionally, the addition of an equalizing filter can induce inter-symbol interference into the channel. For example, system memory may be used to add or otherwise combine a signal to previous signal to get inter-symbol interference.

Figure 5:
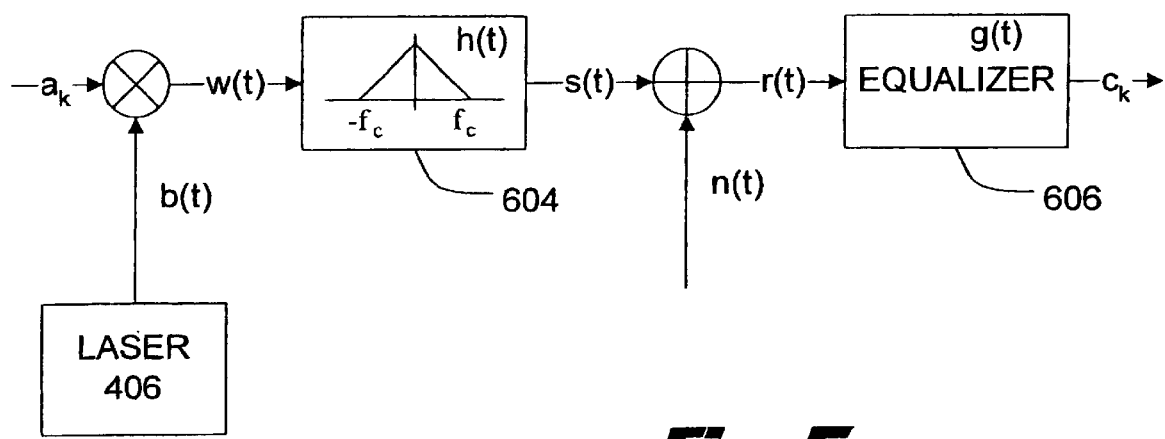
FIG. 5 is a block diagram illustrating an equivalent system for the read and write processes according to one embodiment of the invention, where the signals w(t) and r(t) represent the input data and the output data of a partial response channel, respectively.

FIG. 5 (FIG. 4 of disclosure) is a block diagram illustrating an equivalent system for the read and write processes, where the signals w(t) and r(t) represent the input data and the output data of a partial response channel, respectively. The symbols $a_k$ represent the coded multi-level data to be written to the channel. The symbols $a_k$ are modulated by laser b(t) to create the amplitudes of the marks w(t) actually written to the channel. In one embodiment, the laser light b(t) is a series of pulses occurring every $T_W$ seconds. In this embodiment, one mark having amplitude $a_k$ is written every $T_W$ seconds according to $$w(t) = \sum_i a_i b(t - iT_w)$$

where w(t) are the symbols written to the channel and i represents time, or the symbol in a stream of symbols being written. The relationship $b(t-iT_w)$, indicates that the mark is written at a discrete time interval, and is of width $T_w$.

Also illustrated in FIG. 5 is an example modulation transfer function 604 of the channel. The modulation transfer function h(t) has the effect of filtering the data written to and read from the channel. For typical channels, the modulation transfer function 604 acts as a low pass filter, diminishing high frequency components of a signal. With most channels, a primary contributor to the modulation transfer function is bandwidth limitations in the channel.

Thus, as a result of modulation transfer function 604 for most channels, a square-wave signal written to the channel appears more like a sinusoidal type of curve on readback (this concept is illustrated by FIG. 3C). This is because the sharp transitions from one level to the next in the written symbols are high frequency components of the square wave, while the constant level in the middle of the period appear more like a DC-level signal to the channel's filtering effects.

As also illustrated in FIG. 5, some noise n(t) is also added during the writing and reading processes. Thus considering the modulation transfer function h(t) and the addition of noise n(t), and assuming the channel is linear, the observed signal r(t) is a filtered version of w(t). The observed signal r(t) can be represented then, as:

$$r(t) = w(t) * h(t) + n(t)$$

where '*' denotes convolution and n(t) is the added noise. This representation for the observed signal r(t) can be expanded to:

$$r(t) = \int w(\tau) h(t-\tau) d\tau + n(t)$$

Substituting the equation above for $w(\tau)$ yields:

$$r(t) = \int \sum_i a_i b(\tau - iT_w) h(t-\tau) d\tau + n(t)$$

which can be rewritten as:

$$r(t) = \sum_i a_i \int b(\tau - iT_w) h(t-\tau) d\tau + n(t)$$

Thus, the model of the output signal r(t), based on the input signals $a_k$ can be written as:

$$r(t) = \sum_i a_i f(t - iT_w) + n(t)$$

where $a_i$ represents the symbols $a_k$ written, $f(t-iT_w)$ represents that the marks 'look' different from those actually written due to the modulation transfer function of the channel. That is, for most channels, the read data will be a smoothed or filtered version of the input symbols, and if f is broad, the $a_i$'s may actually bleed into one another.

To recover the data, in one embodiment the input symbols $a_k$ are estimated. That is, from r(t) symbols read from the channel, the goal is to extract w(t), or what was actually written to the channel. One technique for accomplishing this, especially if the inter-symbol interference is complex, is to include an equalizer 606. Preferably, this has the effect of keeping some inter-symbol interference in the system, but tightly controlling it. In one embodiment, equalizer 604 is implemented so as to filter the inter-symbol interference from the signal to only have the inter-symbol interference from a few immediate neighbors. Thus, the embodiment illustrated in FIG. 5 utilizes a filter, such as an equalization filter g(t). Preferably, the filter is implemented such that the output $c_k$ is equal to the input plus the inter-symbol interference. For instance for 1+D inter-symbol interference target, g(t) is implemented such that ck=$a_k$+$a_{k-1}$ (e.g., output equals input+previous input).

Thus, the signal r(t) is filtered by g(t) and sampled at times $kT_w$, which more formally can be represented by:

$$c(t) = r(t) * g(t)$$

where g(t) represents the equalization filter 606, and '*' is a convolution. Rewriting this equation to represent effects of the channel and the equalization filter for a stream of symbols written, $$c(t) = \sum_i a_i \int f(\tau - iT_w) g(t-\tau) d\tau + n'(t)$$

where, $g(t-\tau)$ represents the equalization, and n'(t) is the filtered noise process n(t). A sampled version of c(t) can be written as:

$$c_k = c(kT_W)$$
$$= \sum_i a_i \int f(\tau - iT_w) g(kT_w - \tau) d\tau + n'(kT_W)$$

which can be simplified to:

$$c_k = \sum_i a_i \int f(\sigma) g((k-i)T_w - \sigma) d\sigma + n'(kT_W) \quad (1)$$
$$= \sum_i a_i f_{k-i} + n'_k$$
$$= a_k f_0 + \sum_{ik} a_i f_{k-i} + n'_k$$

Thus, in the example illustrated in FIG. 5, $c_k$ can be thought of as having three parts. The first part contains $a_k$, which is the desired symbol to be extracted, and the remaining terms reflect the inter-symbol interference induced.

One approach to estimating the symbols $\{a_k\}$ from the sampled signal $r(kT_w)$ is to choose g(t) to be the whitened matched filter and to use a maximum likelihood sequence estimator to extract $a_k$ from $r(kT_W)$. The main drawback in using this approach is the complexity of the maximum likelihood sequence estimator. In practice there are several approaches that try to achieve the performance of the matched filter/maximum likelihood sequence estimator approach with reduced complexity. In binary recording the most popular approach is the so-called partial response maximum likelihood approach. In this case an equalization filter g(t) is chosen so that $\{f_k\}$ is simple enough to allow maximum likelihood decoding. In binary magnetic recording a common "target" (so-called class-IV partial response or PR4) is $$f_i = 1 \quad i = 0$$
$$= -1 \quad i = 2$$
$$= 0 \text{ else}$$

This implies that $c_k = a_k - a_{(k-2)}$. Therefore, in one embodiment, g(t) is chosen such that fi looks like $c_k = a_k - a_{(k-2)}$.

The choice of partial response polynomial can depend on a number of factors. Usually the choice is a tradeoff between matching the target to the channel and noise enhancement. One possible choice for g(t) is to completely eliminate the inter-symbol interference forcing $f_0=1$ and $f_i=0$. This is the so-called zero-forcing solution.

Figure 6:
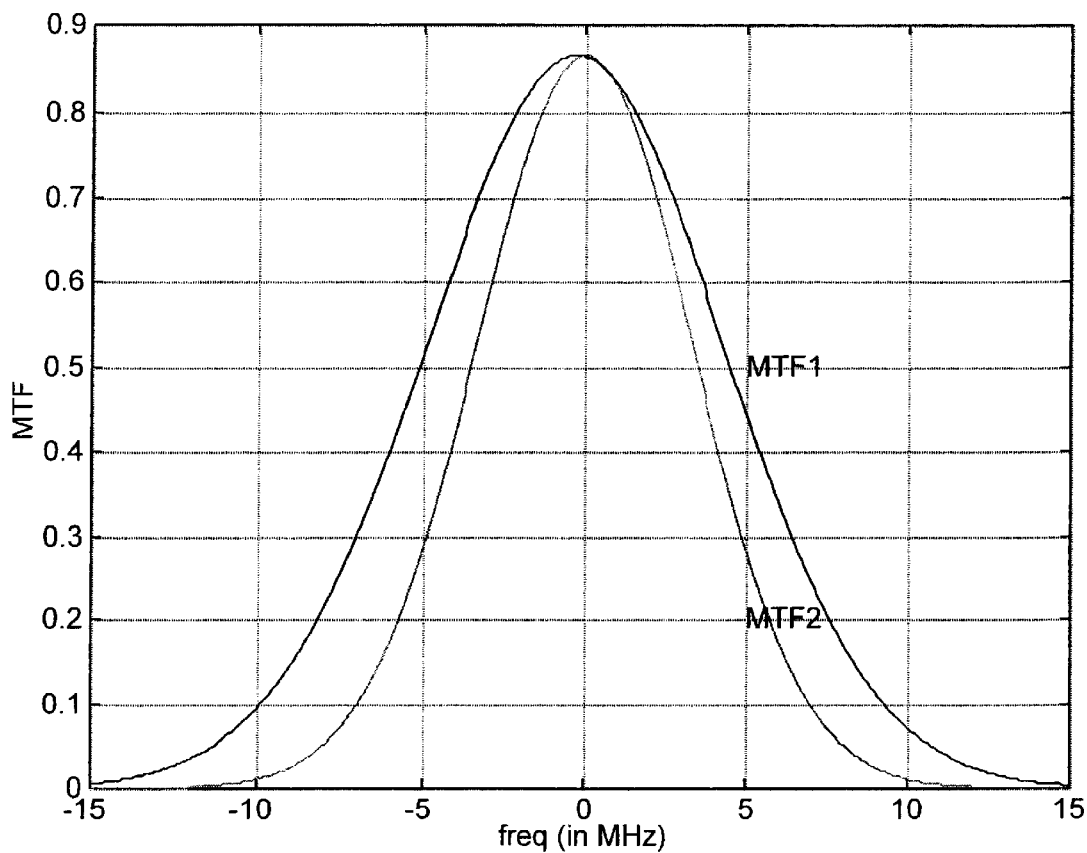
FIG. 6 is a diagram illustrating the frequency response of two different example channels, denoted MTF1 and MTF2 according to one embodiment of the invention.

The form of the system modulation transfer function h(t) in FIG. 5 can have a significant impact on the choice of equalizer and target inter-symbol interference. FIG. 6 illustrates the frequency response of two different example channels, denoted MTF1 and MTF2.

The different modulation transfer functions of various channels are a result of many factors, including the optics of the channel, the laser used, the wavelength of the light, and the physics and reflectivity of the media. There are several criterion for choosing the partial response target including complexity of implementation and resulting signal to noise ratio at the decision point r'.

As FIG. 6 illustrates, the DC levels (e.g., 0 Mhz) are passed by the modulation transfer function, while the higher frequency signals are attenuated. As such, the modulation transfer function h(t) has the effect of making the square wave appear rounded and spread out.

As stated, the equalization filter g(t) is chosen to improve the response of the channel. Before discussing how the filter can be implemented, it is useful to summarize how the signal-to-noise ratio depends on the choice of g(t). For moderate to high signal-to-noise ratios and symbol-by-symbol decoding, the error probability $P_e$ can approximated by:

$$P_e = NQ\left(\frac{d}{2\sigma_d}\right)$$

where d is the distance between signal values, or levels, at decision point r' and N is a small constant. The variable $2\sigma_d$ is the noise variance at the decision point, where $\sigma_d$ represents the square root of the power of the noise. Therefore, as this equation illustrates, the error probability $P_e$, is a result of noise and the modulation transfer function of the channel.

The function Q(x) can be defined by:

$$Q(x) = \frac{1}{(2\pi)^{1/2}} \int_x^\infty e^{-z^2} dz$$

These functions illustrate that for small $\sigma_d$, x is large. Where x is large, the integration occurs farther out on the tail of the curve and therefore Q is low. As a result, the probability of error will also be low for large values of x. Consequently, the filter is preferably chosen so as to make $\sigma_d$ small. Similarly, and perhaps an effect that is more intuitive, for larger values of d (the distance between signal levels), the probability of error is also smaller.

Without loss of generality we can assume the leading channel filter tap $f_0=1$ in (1) so d is the distance between signal points $a_k$ in [0,A]. Assuming M levels and a total dynamic range of A, the distance is given by:

$$d = A/(M-1)$$

Computing $\sigma_d$ it is easy to show that:

$$\sigma_d^2 = \int_{-\infty}^\infty S_n(f)|G(f)|^2 df$$

where $S_n(f)$ is the power spectral density of the additive noise n(t). Combining the above expressions we see that $$P_e = NQ\left(\frac{d}{2\sigma_d}\right)$$

$$= Q\left(\left(\frac{A^2}{4\sigma_d^2} \frac{1}{(M-1)^2}\right)^{1/2}\right)$$

The signal to noise ratio $A^2/\sigma_d^2$ is the ratio of the signal power to noise variance at the detection point r'. Because $\sigma_d^2$ is a direct function of the equalizing filter g(t), choices of g(t) have a direct impact on the performance of the system. Therefore it is beneficial to maximize the SNR and minimize the implementation complexity.

Figure 7:
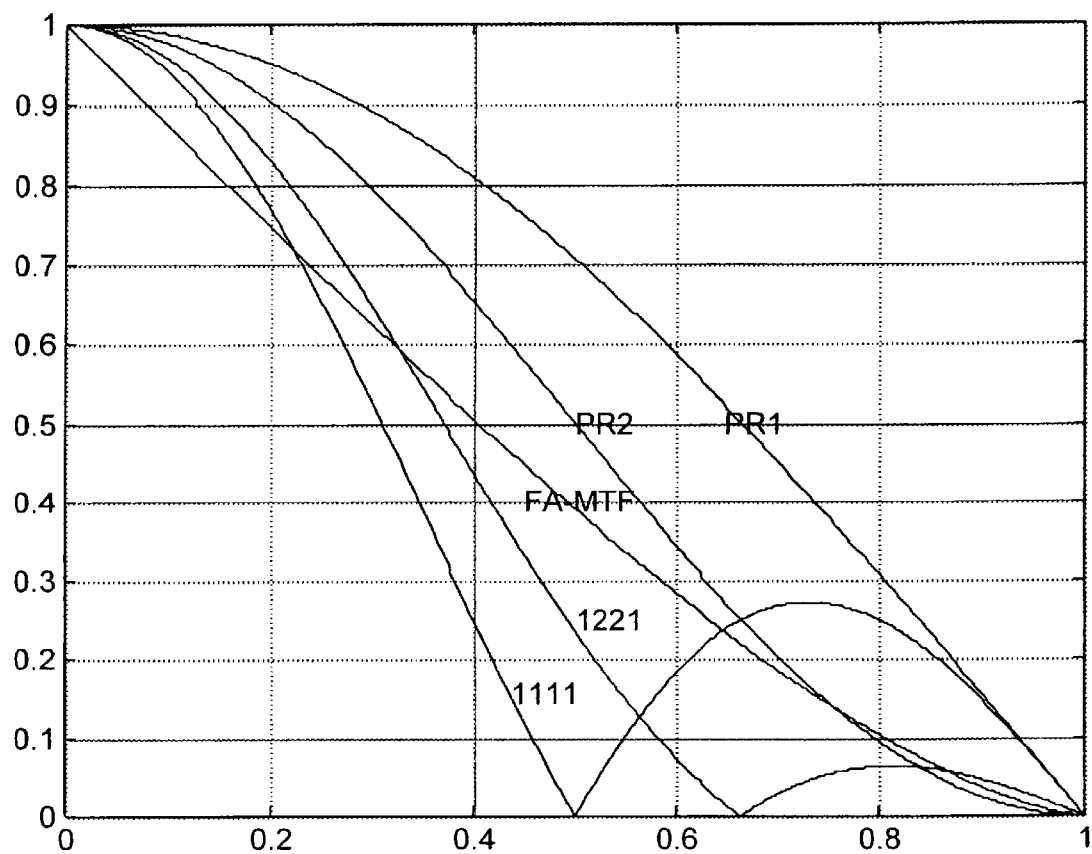
FIG. 7 is a diagram illustrating targets plotted together with the full-aperture modulation transfer function according to one embodiment of the invention.

For the modulation transfer functions in FIG. 6, there are many possible partial response targets. Some common targets can include, for example, 1+D (PR1), $(1+D)^2$ (PR2), $1+D+D^2+D^3$, and $1+2D+2D^2+D^3$. To help illustrate why these targets make sense they are plotted together with the so-called full-aperture modulation transfer function in FIG. 7 (original FIG. 13 in disclosure). The optimum matched filter has a response that closely matches to the channel. FIG. 7, illustrates how the partial response targets can also closely match the channel.

Figure 8:
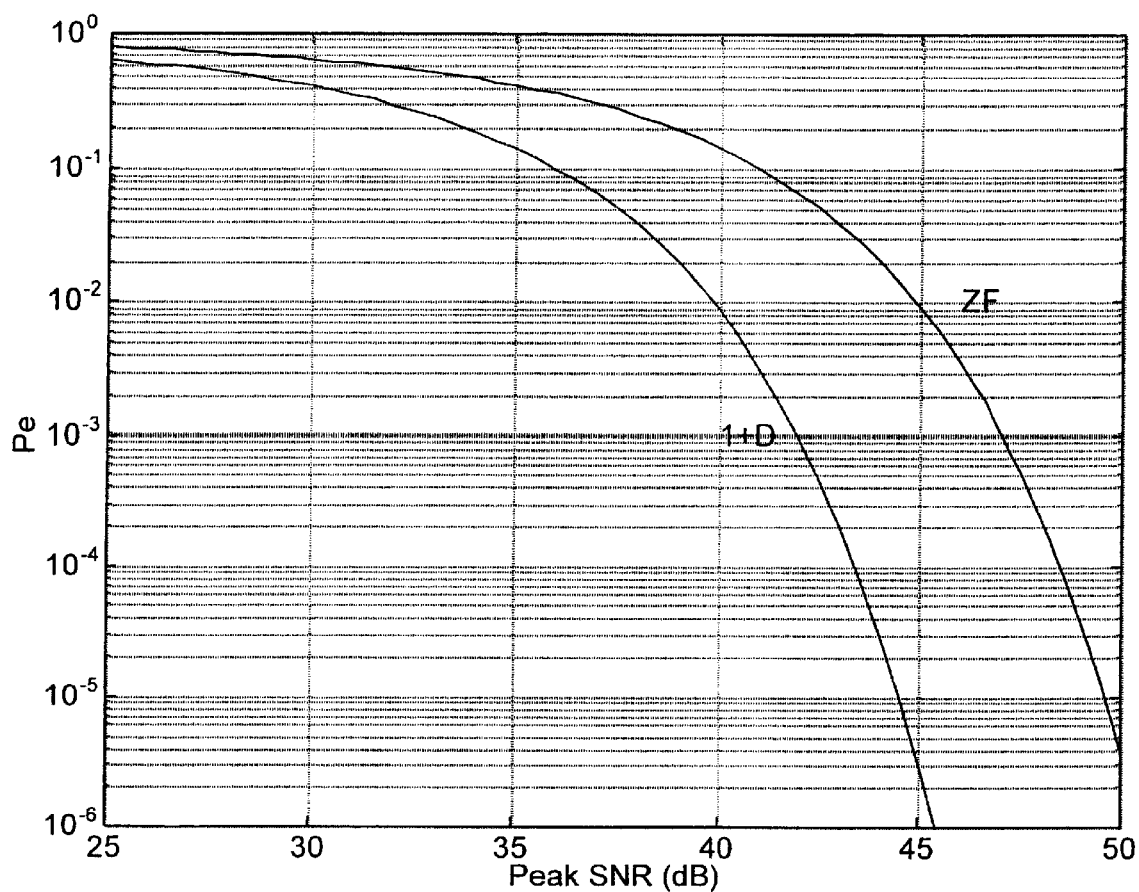
FIG. 8 is a diagram illustrating relative SNR's for a 1+D equalizing filter and a zero-forcing filter.
Figure 9:
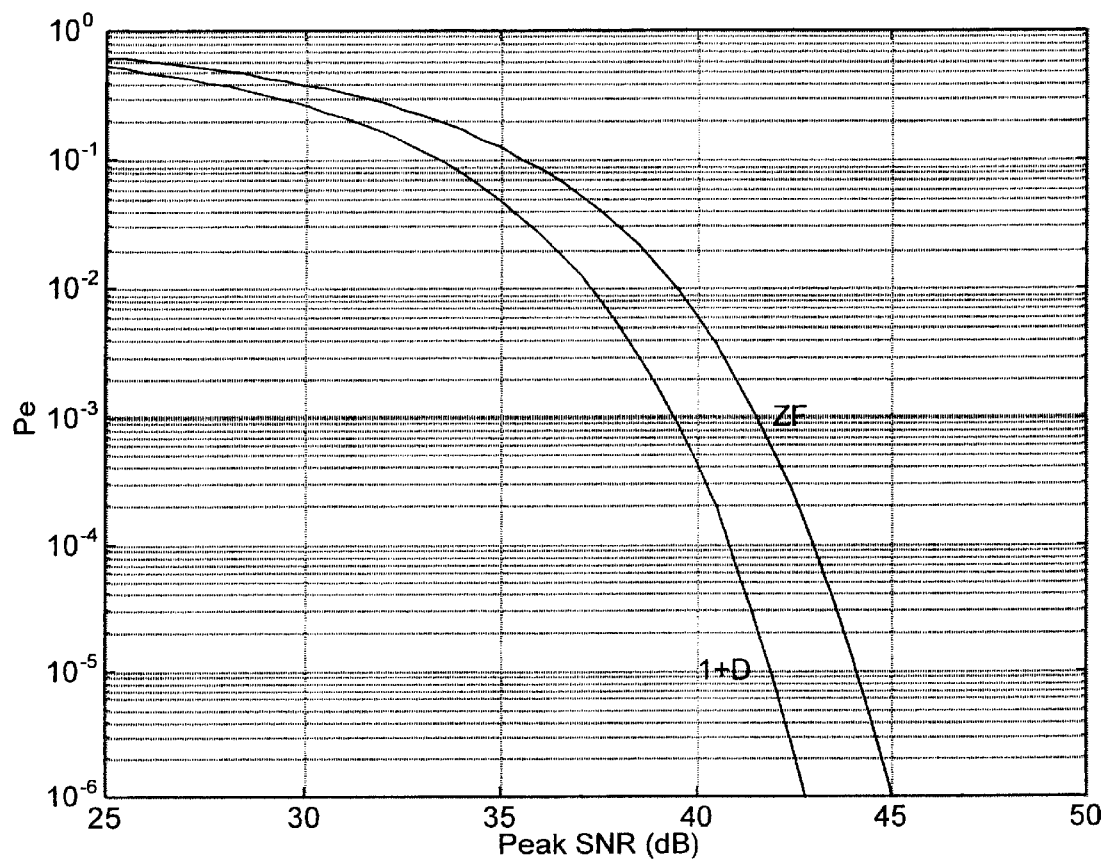
FIG. 9 is a diagram illustrating relative SNR's for a 1+D equalizing filter and a zero-forcing filter applied tot he example channel MTF.
Figure 10:
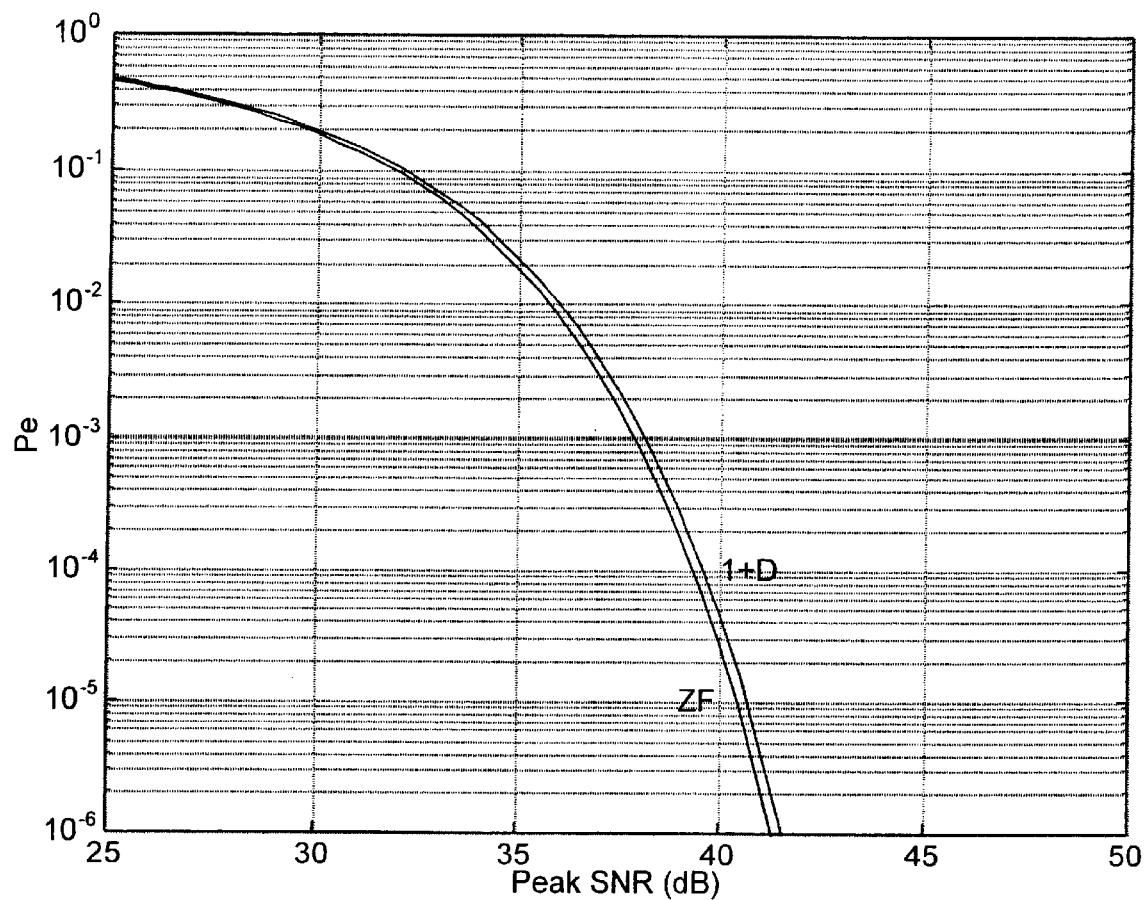
FIGS. 10 and 11 illustrate the same result for MTF2.
Figure 11:
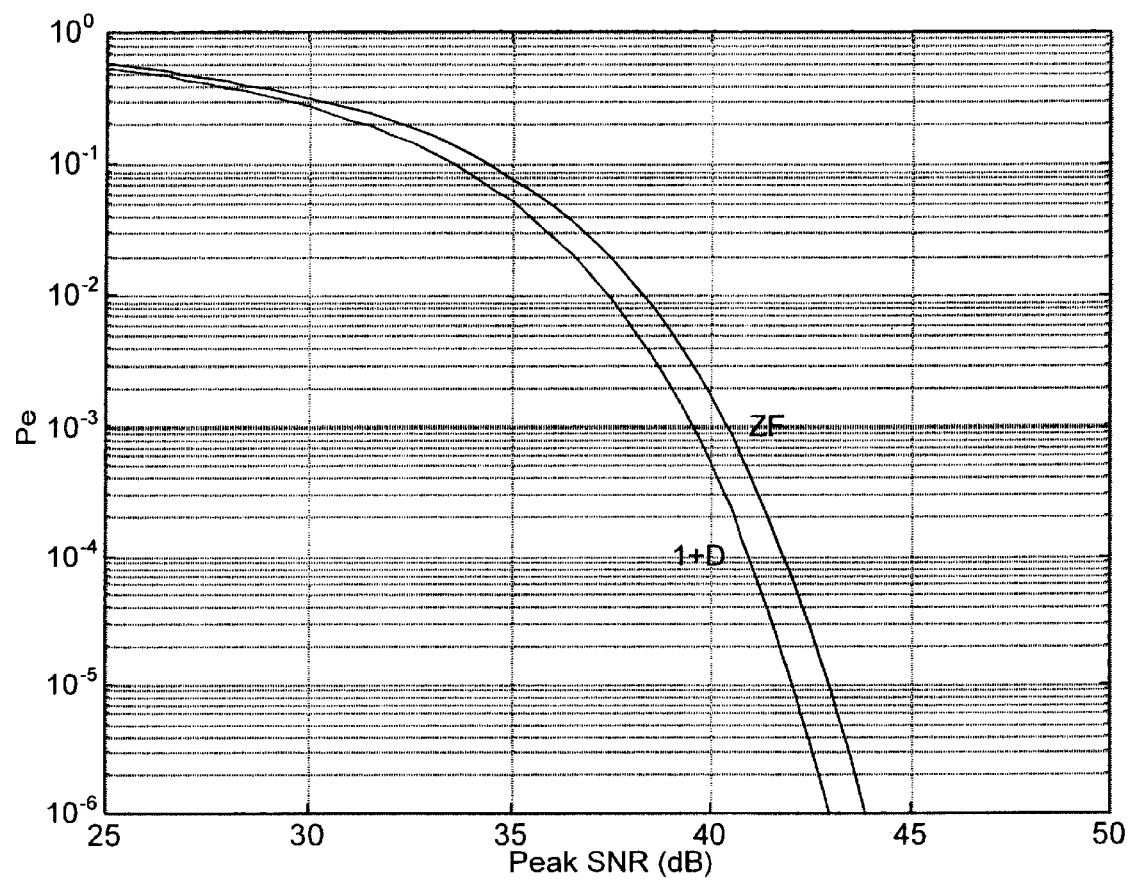

FIGS. 8–11 illustrate how different types of equalizers perform differently depending on the channel and other key system parameters. These figures show the error probability performance as a function of signal to noise ratio for the two different modulation transfer functions MTF 1 and MTF 2 and for different storage densities. FIGS. 8 and 9 illustrate the error probability performance for a system that has MTF1 as its channel transfer function for two different sizes of marks. In the example illustrated in FIG. 8, a 1+D equalizing filter is much better than a zero-forcing filter as it requires much less SNR to achieve the same performance. FIGS. 10 and 11 illustrate the same result for MTF2. In this example system the difference between ZF and 1+D is much less pronounced and, as a result, ZF is much more preferable because of its reduced complexity.

As these plots illustrate, a study of the tradeoff in signal-to-noise ratio and implementation complexity is beneficial before choosing the proper equalizing filter.

5. Encoding and precoding for equalization

The inventor has recognized that because inter-symbol interference is a phenomenon of the channel, it is advantageous to design codes to take advantage of the inter-symbol interference, thereby improving the signal-to-noise ratio of the channel. One motivation behind the choice of encoding is to get good performance while trying to minimize complexity. There are other considerations such as DC-control, timing and gain control. As alluded to above, depending on the choice of equalization, different encoding and/or precoding can be used. Now described are the encoding and preceding approaches that can be used for various equalization approaches according to several embodiments or aspects of the invention.

Zero-forcing approach

One approach to storing and decoding multi-level data is referred to as the zero-forcing approach. With the zero-forcing approach, the filtering is applied to totally eliminate inter-symbol interference. With this approach, in an ideal system with no noise, the filter totally eliminates inter-symbol interference such that $a_k=c_k$. In other words, the output symbols identically match the input symbols. One disadvantage, however, of the zero-forcing approach is that it amplifies noise that may be in the channel, resulting in a degraded signal-to-noise ratio.

Figure 12:
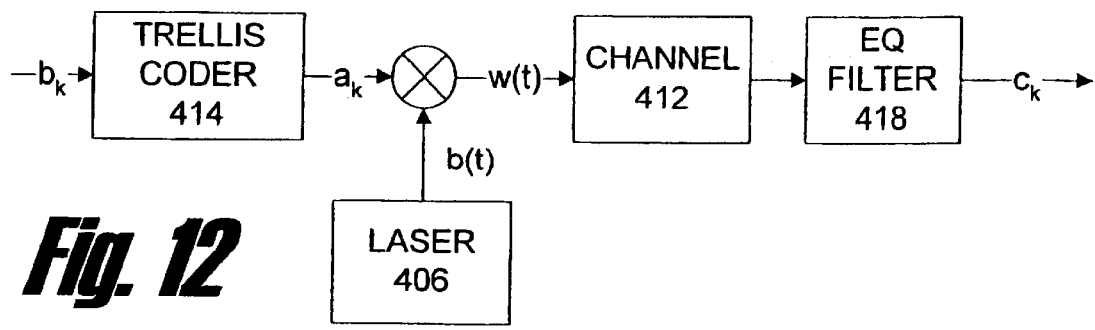
FIG. 12 is a block diagram illustrating an example system using the zero-forcing approach according to one embodiment of the invention.

FIG. 12 is a block diagram illustrating an example system using the zero-forcing approach. In this diagram, a trellis coder 414 encodes the raw bits $b_k$ to create the multilevel symbols $a_k$. One example of a trellis coder 414 is an Ungerboeck style coder. The multilevel symbols $a_k$ are modulated by a modulating laser 406, which generates a pulse b(t). The modulated signal w(t) is provided to the channel (e.g., stored on a disk). Upon reading the data from the channel (e.g., upon playback), the data is equalized by an equalization filter 418, resulting in playback data $c_k$. Equalization filter 418 is designed such that if there is no noise in the system, $a_k=c_k$. In other words, equalization filter 418 totally eliminates inter-symbol interference.

One application of the zero-forcing approach is disclosed in U.S. Pat. No. 5,818,806 to Wong, et al, which is incorporated herein by reference. Wong discloses techniques for coding raw bits of data to generate symbols $a_k$. Such techniques can include trellis coding and Ungerboeck codes.

As stated above, with the zero-forcing approach, the goal is to put $a_k$ into the channel and get $a_k$ out of the channel (e.g., $c_k=a_k$). Thus, with the zero-forcing approach, the goal is to have the output identically equal the input. Thus, for a noiseless channel $c_k=a_k$. For real world applications, however, channels are rarely noise-free and the actual output includes noise: $c_k=a_k+n_k$. In other words, with zero-forcing approaches, it appears as if the channel isn't even there, or, considering noise, the channel can be thought of as an additive white Gaussian noise channel.

Because the zero-forcing approach strives to achieve $c_k=a_k$, precoding is generally not required, and is preferably not used. Symbol encoding is put into place to encode the input bit stream $a_k$ to an M-ary data stream, and equalization filtering is used to subtract the known or predicted effects of inter-symbol interference.

In one embodiment, the code used for encoding the input bit stream is an Ungerboeck code. In choosing an Ungerboeck code, a tradeoff between performance and complexity is generally made. That is, in most cases, a more complex Ungerboeck code will yield a larger d (distance between levels), which results in better performance as discussed above. However, the more complex codes are generally more expensive or more complex to implement. For example, a 16-state code may require sixteen add, compare and select modules to implement.

Considering performance/complexity trade-offs, one viable code is a 2-dimensional, 16 state Ungerboeck code, with rates R=2.5 and R=3 bits/symbol. The dimension of the code relates to the number of consecutive output levels of the code. The number of states relates to the complexity, and the rate defines the ratio of bits to symbols in the encoding process. That is, for a rate R=3 code, 3 input bits $b_k$ result in one symbol $a_k$.

For the R=3 code, the signal constellation is an M=12, 2-dimensional constellation. A 12-by-12 constellation contains 144 points, of which only 128 are used (128/4=32 points per subconstellation), That is, six bits can be encoded by a convolutional code to produce seven coded bits. The seven coded bits can then be used to index or select one of 128 two dimensional points. The result is 6 bits per 2 symbols, or R=3 bits/symbol.

For the R=2.5 code, the signal constellation is an M=8, 2-dimensional constellation. The constellation contains 64 points, of which all 64 points are used (64/4=16 points per subconstellation). That is, five bits can be encoded by a convolutional code to produce six coded bits. The six coded bits can then be used to index or select one of 64 two dimensional points. The result is 5 bits per 2 symbols, or R=2.5 bits/symbol.

Considering the cost/performance trade-offs discussed above, in one embodiment a preferred maximum number of states for implementation is 16 states, however other levels of complexity can be implemented. This example code yields 3.80 dB of coding gain above uncoded signaling.

One motivating factor behind the use of these codes is simplicity and performance. While zero forcing might not be the best equalization approach, from the signal processing point of view, it is the simplest. The combination of zero forcing with a very good trellis code may outweigh partial response(better equalizer) with a moderate trellis code Coding for partial response equalization.

A generalization of the zero-forcing approach described above is to make some concessions on the requirement that $a_k=c_k$, in an effort to improve the signal-to-noise ratio of the channel. This is especially beneficial where $c_k$ has a fixed inter-symbol interference pattern and this inter-symbol interference pattern can be predicted. In other words, this application is particularly useful where the inter-symbol interference pattern is simple, and not complicated. Such inter-symbol interference patterns can be fixed patterns as determined by the partial response target plus noise and can include, for example 1+D, $(1+D)^2$, $1+D^2+D^3$.

Figure 13:
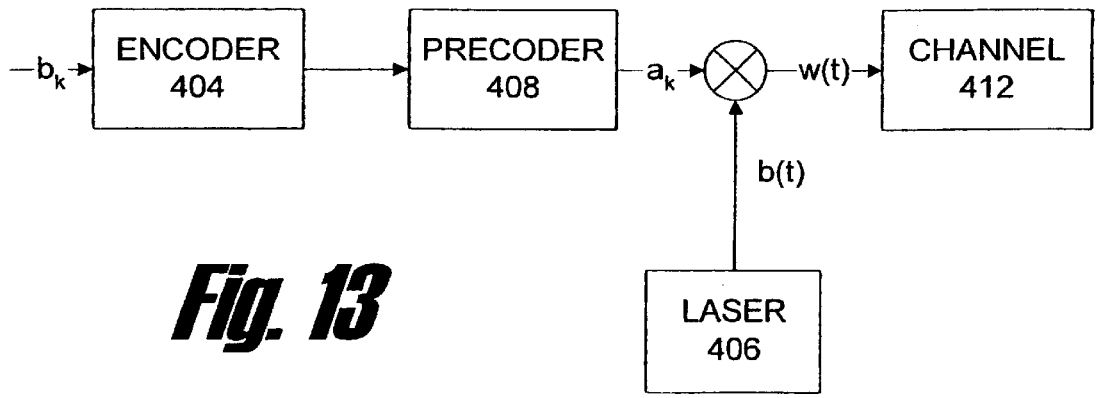
FIG. 13 is a block diagram illustrating an embodiment that includes precoding in addition to trellis coding according to one embodiment of the invention.

FIG. 13 is a block diagram illustrating an embodiment that includes precoding in addition to trellis coding. The purpose of the precoder is to counteract the effects of the inter-symbol interference before the data are written to the recording channel. Because the data are precoded before being recorded, the decoding process can be simplified, and where non-zero-forcing approaches are implemented the impacts of not having $a_k=c_k$ can be diminished. In one embodiment, the coding phases can be implemented as a trellis coder 404 and a Tomlinson-Harashima precoder 408, although other coders can be implemented. One example of a trellis coder 404 is an Ungerboeck style trellis coder.

Trellis coder 404 receives the binary input data, $b_k$, and encodes this input data to generate an M-ary output signal (having M levels). precoder 408 accepts the M-ary data and codes this data to anticipate the effects of the inter-symbol interference. This results in precoded multi-level data. It is this precoded multi-level data that modulates write laser 406 to record the precoded multi-level data onto the partial response equalized channel 412.

In summary, this approach uses trellis coding 404 and precoding 408 along with a partial response equalized channel 412. The precoder is designed to compensate for the partial response equalized channel 412. The trellis codes used can be the same as those in FIG. 12 The output of the channel is passed through a mod-M device before it is decoded.

Figure 14:
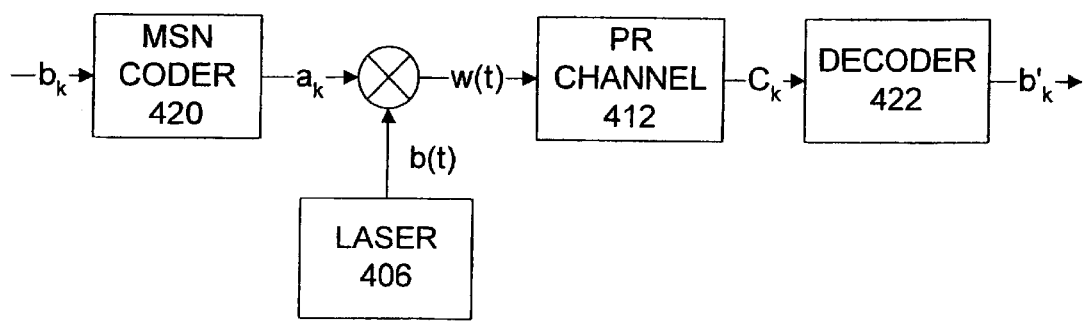
FIG. 14 is a block diagram illustrating the use of matched spectral null codes according to one embodiment of the invention.

Another embodiment uses a matched spectral null code, with no precoding. FIG. 14 is a block diagram illustrating the use of matched spectral null codes according to one embodiment of the invention. In the embodiment illustrated in FIG. 14, a matched spectral null coder 420 is used to encode data prior to writing data to the partial response channel 412. In one embodiment, the code is preferably constrained to produce a coded sequence whose power spectral density has nulls in the same place as the channel. One desirable property of matched spectral null codes is that the minimum distance d of the code is enhanced by the partial response channel. That is, the system uses precoding to eliminate the effects of the channel. The matched spectral null approach is designed to have the code and channel work together such that the channel enhances the distance d.

Figure 15:
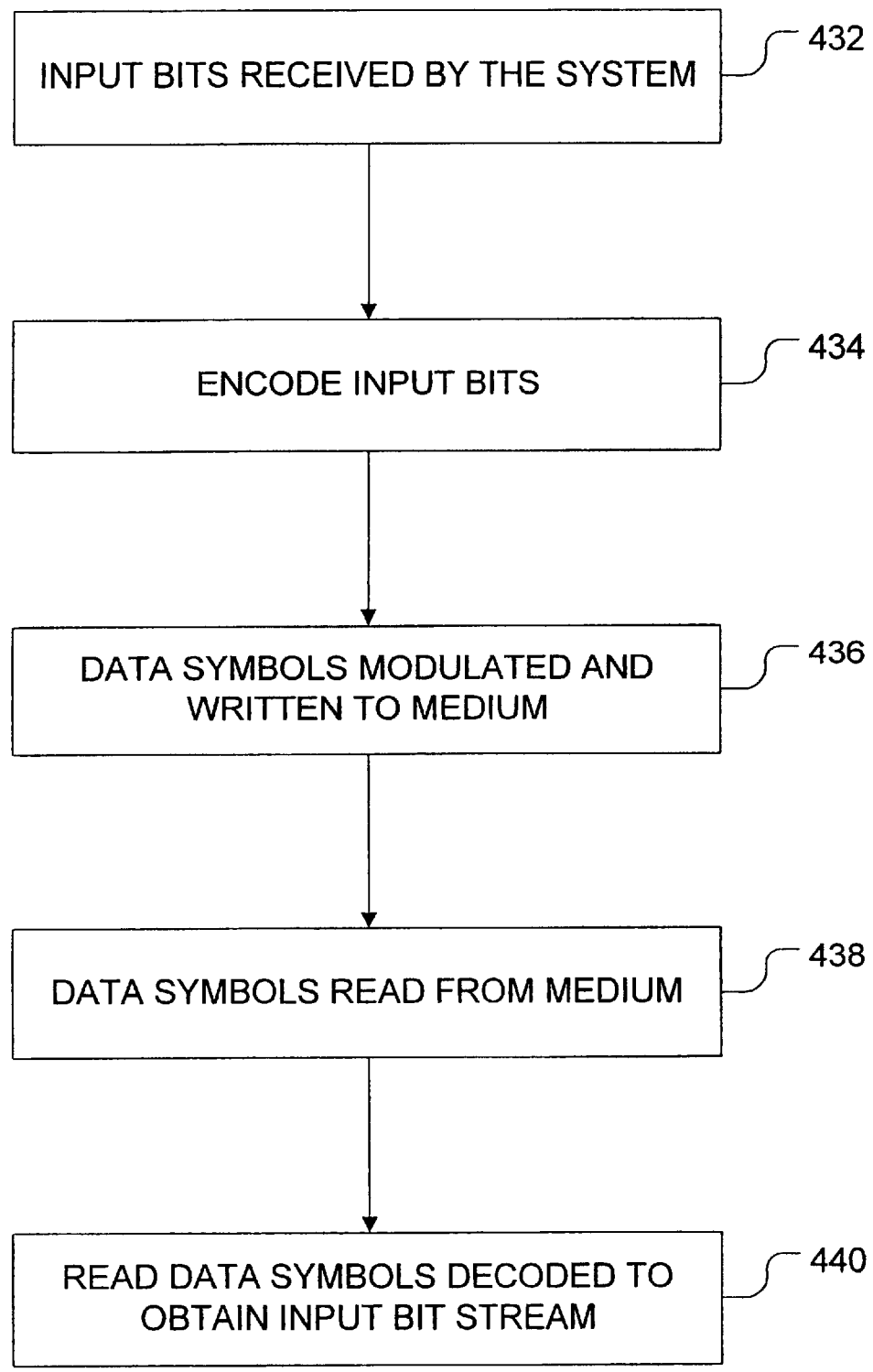
FIG. 15 is an operational flow diagram illustrating a process for writing data to and reading data from a partial response channel according to one embodiment of the invention.

FIG. 15 is an operational flow diagram illustrating a process for writing data to and reading data from a partial response channel according to one embodiment of the invention. Referring now to FIGS. 14, and 15, in a step 432, the input data bits $b_k$ are received by the system. In one embodiment, the input data bits $b_k$ are digital data.

In a step 434, the input data bits $b_k$ are encoded using matched spectral null coder 420 to create encoded data symbols $a_k$. Encoded data symbols $a_k$ are M-ary data symbols having one of M levels. As discussed above, matched spectral null coder 420 is preferably implemented to produce an output having nulls that match the frequency nulls of the partial response channel 412. In one embodiment, matched spectral null coder 420 is implemented as an Ungerboeck style coder. An example of an M=8, R=2.5 matched spectral null coder 420 is described in detail below, although other matched spectral null codes can be used as well.

The data symbols $a_k$ are modulated by write laser 406 and the modulated signal w(t) written to partial response channel 412. The resultant symbols $c_k$ are read from partial response channel 412. The write and read process is illustrated by steps 436 and 438.

Due at least in part to inter-symbol interference inherent with partial response channel 412, the resultant symbols $c_k$ obtained from the channel do not identically match the input symbols $a_k$. Therefore, a decoder 422 is used in step 440 to recover the input data. However, the symbols $c_k$ are not only a result of the effects of partial response channel 412, they are also a result of the effects of matched spectral null coder 420. As such, a proper decoder 422 considers the effects of both.

In one embodiment, two separate decoders can be implemented to separately decode the effects of partial response channel 412 and the effects of matched spectral null coder 420. However, in a preferred embodiment, the decoder is implemented to consider the effects of both components somewhat simultaneously. In this preferred embodiment, the decoder can be implemented to consider the possible encoder states combined with the possible states of the partial response channel 412.

6. M=8 R=2.5 bits/mark matched spectral null code specification

Having thus described a system for using matched spectral null codes with a partial response channel, an example matched spectral null code is now described according to one embodiment of the invention. After reading this description, it will become apparent to one of ordinary skill in the art how to implement a system using alternative matched spectral null codes, partial response channels and decoding tables according to the invention. However, one goal of the system is. to utilize a matched spectral null code and partial response channel combination that helps to minimize decoder complexity.

Figure 16:
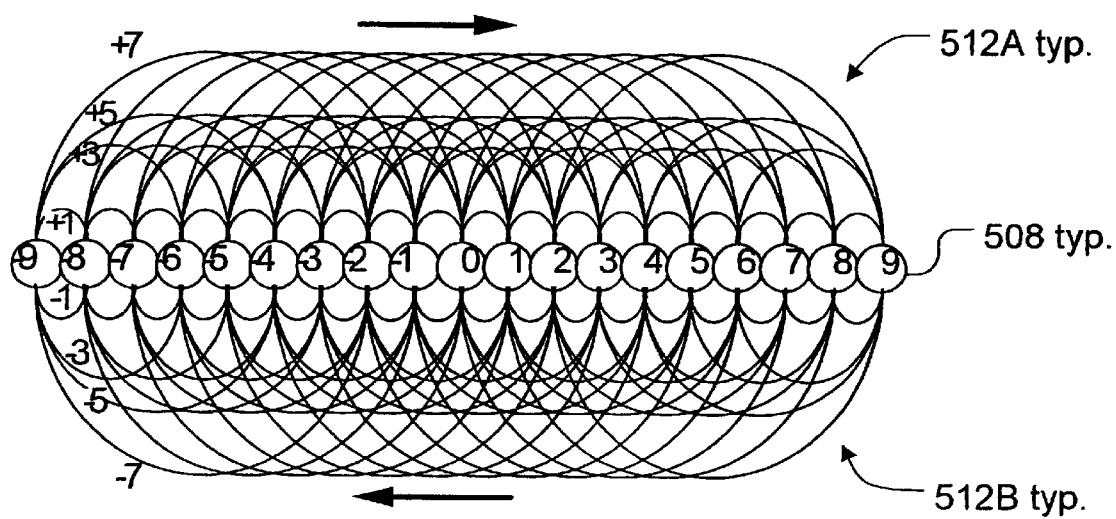
FIG. 16 is a constraint graph illustrating an implementation of an encoder for the M=8, 2.5 code according to one embodiment of the invention.

The example code now described is an 8-level (M=8), rate 2.5 code. FIG. 16 is a constraint graph illustrating an implementation of an encoder for the M=8, 2.5 code according to one embodiment of the invention. According to the constraint graph illustrated in FIG. 16, the code sequence of $a_k$'s output from the encoder takes on one of M=8 (±1,±3, ±5,±7) values. That is, the encoder encodes the input bit stream into an 8-ary symbol stream. Because the code is a rate 2.5 code, five input bits $b_k$ result in 2 output symbols $a_k$.

In the example embodiment now described, the sequence $a_k$ is constrained to have zero frequency content at frequency f=0 (a so-called DC-null). A necessary and sufficient condition for the sequence $a_k$ to have a DC-null is that its running digital sum (RDS) be bounded. Where the running digital sum at time i, RDS(i) is defined as $$RDS(i) = \sum_{k=-\infty}^{i} a_k$$

A necessary and sufficient condition for there to be a null at the Nyquist frequency is for $$RDS'(i) = \sum_{k=-\infty}^{i} a_k(-1)^k$$

to be bounded. Given a sequence $a_k$ that satisfies the RDS (I) condition (it has a DC null), one can use this sequence to create a sequence $a_k'$ with a null at Nyquist by $$a_k' = a_k (-1)^k$$

This fact can be used for creating a null at Nyquist for the 1+D channel, as discussed in detail below.

The code produced by the constraint graph illustrated in FIG. 16 has a bounded running digital sum at >−9 and <9, or the constraint $$|RDS(i)| \leq 9$$

More specifically, the constraint graph in FIG. 16 has 19 states 508, from −9 to +9. Each state 508 has associated therewith a plurality of edges 512. Edges 512 are used to define allowable transitions from one state 508 to another state 508. For ease of description in this document, edges are referred to as positive edges 512A, and negative edges 512B. Positive edges 512A transition to a numerically higher state 508, while negative edges transition to a numerically lower state 508.

Edges 512 also have associated therewith values. For the example illustrated in FIG. 16, the edges 512 can be of the values ±1, ±3, ±5, and ±7. The input bit stream is coded such that the output symbols reflect one of these eight values. Thus, with the rate 2.5 code, a sequence of five input bits results in a pair of output levels representing two transitions along two edges 512.

In operation, at a given time, the encoder will be in one of the 19 states 508. Every five input bits will result in two transitions, leading to another one of the 19 states. Thus, the states 508 reflect the running digital sum of the encoder, while the two transitions represent a pair of output bits $a_k$ of the encoder. As clearly illustrated, regardless of the input bit sequence, the encoder is restricted to states having values from −9 to +9. In other words, the running digital sum is bounded as defined above. By restricting the states to have value less than 9, a walk on this constraint graph describes all valid M=8 sequences with a running digital sum less than or equal to 9.

Provided below is an adjacency matrix T of the constraint graph illustrated in FIG. 16. In adjacency matrix T, the ij'th entry is the number of ways of getting from state i to state j. For the constraint graph of FIG. 16, the matrix T is:

$$T = \begin{matrix}
0 & 1 & 0 & 1 & 0 & 1 & 0 & 1 & 0 & 0 & 0 & 0 & 0 & 0 & 0 & 0 & 0 & 0; \\
1 & 0 & 1 & 0 & 1 & 0 & 1 & 0 & 1 & 0 & 0 & 0 & 0 & 0 & 0 & 0 & 0 & 0; \\
0 & 1 & 0 & 1 & 0 & 1 & 0 & 1 & 0 & 1 & 0 & 0 & 0 & 0 & 0 & 0 & 0 & 0; \\
1 & 0 & 1 & 0 & 1 & 0 & 1 & 0 & 1 & 0 & 1 & 0 & 0 & 0 & 0 & 0 & 0 & 0; \\
0 & 1 & 0 & 1 & 0 & 1 & 0 & 1 & 0 & 1 & 0 & 1 & 0 & 0 & 0 & 0 & 0 & 0; \\
1 & 0 & 1 & 0 & 1 & 0 & 1 & 0 & 1 & 0 & 1 & 0 & 1 & 0 & 0 & 0 & 0 & 0; \\
0 & 1 & 0 & 1 & 0 & 1 & 0 & 1 & 0 & 1 & 0 & 1 & 0 & 1 & 0 & 0 & 0 & 0; \\
1 & 0 & 1 & 0 & 1 & 0 & 1 & 0 & 1 & 0 & 1 & 0 & 1 & 0 & 1 & 0 & 0 & 0; \\
0 & 1 & 0 & 1 & 0 & 1 & 0 & 1 & 0 & 1 & 0 & 1 & 0 & 1 & 0 & 1 & 0 & 0; \\
0 & 0 & 1 & 0 & 1 & 0 & 1 & 0 & 1 & 0 & 1 & 0 & 1 & 0 & 1 & 0 & 1 & 0; \\
0 & 0 & 0 & 1 & 0 & 1 & 0 & 1 & 0 & 1 & 0 & 1 & 0 & 1 & 0 & 1 & 0 & 1; \\
0 & 0 & 0 & 0 & 1 & 0 & 1 & 0 & 1 & 0 & 1 & 0 & 1 & 0 & 1 & 0 & 1 & 0; \\
0 & 0 & 0 & 0 & 0 & 1 & 0 & 1 & 0 & 1 & 0 & 1 & 0 & 1 & 0 & 1 & 0 & 1; \\
0 & 0 & 0 & 0 & 0 & 0 & 1 & 0 & 1 & 0 & 1 & 0 & 1 & 0 & 1 & 0 & 1 & 0; \\
0 & 0 & 0 & 0 & 0 & 0 & 0 & 1 & 0 & 1 & 0 & 1 & 0 & 1 & 0 & 1 & 0 & 1; \\
0 & 0 & 0 & 0 & 0 & 0 & 0 & 0 & 1 & 0 & 1 & 0 & 1 & 0 & 1 & 0 & 1 & 0; \\
0 & 0 & 0 & 0 & 0 & 0 & 0 & 0 & 0 & 1 & 0 & 1 & 0 & 1 & 0 & 1 & 0 & 1; \\
0 & 0 & 0 & 0 & 0 & 0 & 0 & 0 & 0 & 0 & 1 & 0 & 1 & 0 & 1 & 0 & 1 & 0;
\end{matrix}$$

A code can be constructed from the constraint graph in FIG. 16 as follows. Consider all walks of length two on the constraint graph, recording only the beginning and ending state 508. That is, starting at a given state, referred to as the beginning state, an end state is reached after two transitions on the constraint graph. Doing this for each state as the starting state results in what is called a second power graph.

Figure 17:
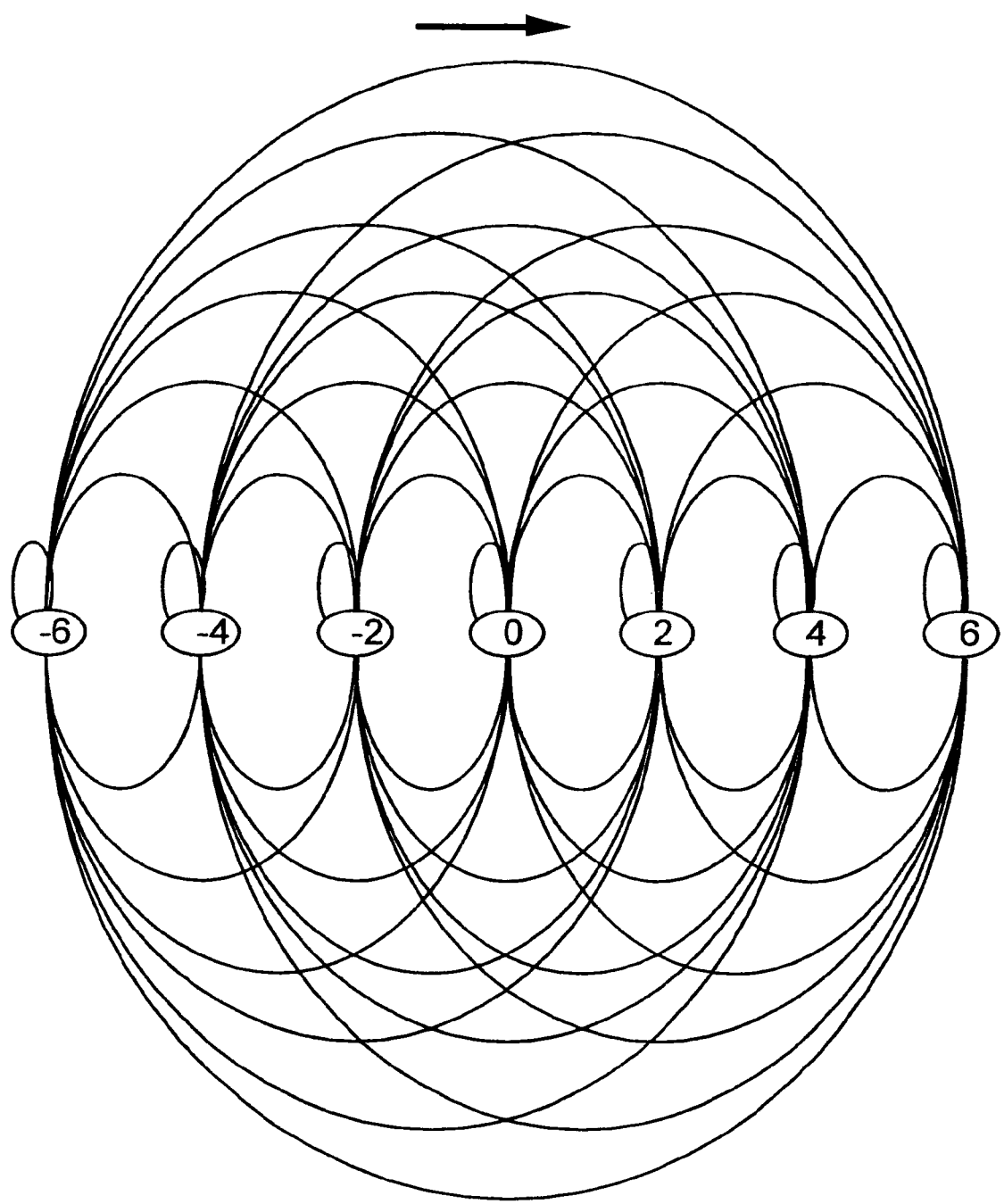
FIG. 17 is a diagram illustrating a second power graph for the constraint graph illustrated in FIG. 16.

Due to the nature of the constraint graph in FIG. 16, walks of length two from an odd state 508 will result in another odd state 508, while walks of length two from an even state 508 will result in another even state 508. This results in two second power graphs which are disjointed. Therefore, only one of the two second power graphs needs to be considered. FIG. 17 is a diagram illustrating a second power graph for the constraint graph illustrated in FIG. 16. FIG. 17 illustrates the second power graph where the states 522 are restricted to the even states in $-6 \leq RDS \leq +6$.

It is easy to show that the adjacency matrix for this graph is:

$$T' = \begin{matrix}
6 & 6 & 6 & 5 & 4 & 3 & 2 \\
6 & 7 & 7 & 6 & 5 & 4 & 3 \\
6 & 7 & 8 & 7 & 6 & 5 & 4 \\
5 & 6 & 7 & 8 & 7 & 6 & 5 \\
4 & 5 & 6 & 7 & 8 & 7 & 6 \\
3 & 4 & 5 & 6 & 7 & 7 & 6 \\
2 & 3 & 4 & 5 & 6 & 6 & 6
\end{matrix}$$

In the adjacency matrix T' the ij'th entry represents the number of different ways of getting from state i to state j of the constraint graph in two transitions. For example, the quantity '6' in the upper left hand corner of matrix T' illustrates that there are six pairs of transitions that allow a move from the −6 state back to the −6 state. Similarly, the quantity '2' in the lower left hand corner of the matrix T' indicates that there are two pairs of transitions that will lead from the +6 state to the −6 state. The quantity '2' in the upper right hand corner indicates that there are two pairs of transitions that will lead from the −6 state to the +6 state, and so on.

The elements in matrix T' can be summed across each row. The sum of the elements in the i'th row is the number of edges leaving the i'th state of the second power graph in FIG. 17. This represents the number of edge pairs leaving the i'th state in the constraint graph in FIG. 16. In other words, this represents the number of possible output pair combinations $a_k$ from the encoder, when the encoder is in the i'th state.

The row sums of each of the rows of T' are at least 32. This implies that the encoder can be designed to accept a sequence of bits at the input and uniquely index one of 32 edges for each state. Thus, each possible value for a sequence of five binary input bits $b_k$ can be uniquely represented by an output edge at each state.

Because each edge in the second power graph actually represents two transitions in the original constraint graph, each such edge has associated therewith two values. These original transition values are the symbol outputs $a_k$ from the encoder. Because five input bits $b_k$ can uniquely index to one edge, and each edge represents two transitions, every five input bits $b_k$ results in two output symbols $a_k$. Thus, this encoder is capable of coding at a rate of 5 bits/2 symbols=2.5 bits/symbol.

Table 1 gives a list of the 32 sequences for each state and the resulting state transitions. This serves as the encoder for the example M=8, R=2.5 matched spectral null code described herein. Each column subheading represents the state transitions, while the numbers in each column represent the possible transitions between those states.

TABLE 1

Example Encoder Table

| −6 to −6 | −4 to −6 | −2 to −6 | 0 to −6 | 2 to −6 | 4 to −6 | 6 to −6 |
|---|---|---|---|---|---|---|
| 7 −7 | 5 −7 | 3 −7 | 1 −7 | −1 −7 | −3 −7 | −5 −7 |
| 5 −5 | 3 −5 | 1 −5 | −1 −5 | −3 −5 | −5 −5 | −7 −5 |
| 3 −3 | 1 −3 | −1 −3 | −3 −3 | −5 −3 | −7 −3 | |
| 1 −1 | −1 −1 | −3 −1 | −5 −1 | −7 −1 | | 6 to −4 |
| −1  1 | −3  1 | −5  1 | −7 −1 | | 4 to −4 | −3 −7 |
| −3  3 | −5  3 | −7  3 | | 2 to −4 | −1 −7 | −5 −5 |
| | | | 0 to −4 | 1 −7 | −3 −5 | −7 −3 |
| −6 to −4 | −4 to −4 | −2 to −4 | 3 −7 | −1 −5 | −5 −3 | |
| 7 −5 | 7 −7 | 5 −7 | 1 −5 | −3 −3 | −7 −1 | 6 to −2 |
| 5 −3 | 5 −5 | 3 −5 | −1 −3 | −5 −1 | | −1 −7 |
| 3 −1 | 3 −3 | 1 −3 | −3 −1 | −7  1 | 4 to −2 | −3 −5 |
| 1  1 | 1 −1 | −1 −1 | −5  1 | | 1 −7 | −5 −3 |
| −1  3 | −1  1 | −3  1 | −7  3 | 2 to −2 | −1 −5 | −7 −1 |
| −3  5 | −3  3 | −5  3 | | 3 −7 | −3 −3 | |
| | −5  5 | −7  5 | 0 to −2 | 1 −5 | −5 −1 | 6 to 0 |
| −6 to −2 | | | 5 −7 | −1 −3 | −7  1 | 1 −7 |

TABLE 1-continued

Example Encoder Table

| | | | | | | |
|---|---|---|---|---|---|---|
| 7 -3 | -4 to -2 | -2 to -2 | 3 -5 | -3 -1 | | -1 -5 |
| 5 -1 | 7 -5 | 7 -7 | 1 -3 | -5 1 | 4 to 0 | -3 -3 |
| 3 1 | 5 -3 | 5 -5 | -1 -1 | -7 3 | 3 -7 | -5 -1 |
| 1 3 | 3 -1 | 3 -3 | -3 1 | | 1 -5 | -7 1 |
| -1 5 | 1 1 | 1 -1 | -5 3 | 2 to 0 | -1 -3 | |
| -3 7 | -1 3 | -1 1 | -7 5 | 5 -7 | -3 -1 | 6 to 2 |
| | -3 5 | -3 3 | | 3 -5 | -5 1 | 3 -7 |
| -6 to 0 | -5 7 | -5 5 | 0 to 0 | 1 -3 | -7 3 | 1 -5 |
| 7 -1 | | -7 7 | 7 -7 | -1 -1 | | -1 -3 |
| 5 1 | -4 to 0 | | 5 -5 | -3 1 | 4 to 2 | -3 -1 |
| 3 3 | 7 -3 | -2 to 0 | 3 -3 | -5 3 | 5 -7 | -5 1 |
| 1 5 | 5 -1 | 7 -5 | 1 -1 | -7 5 | 3 -5 | -7 3 |
| -1 7 | 3 1 | 5 -3 | -1 1 | | 1 -3 | |
| | 1 3 | 3 -1 | -3 3 | 2 to 2 | -1 -1 | 6 to 4 |
| -6 to 2 | -1 5 | 1 1 | -5 5 | 7 -7 | -3 1 | 3 -5 |
| 7 1 | -3 7 | -1 3 | -7 7 | 5 -5 | -5 3 | 1 -3 |
| 5 3 | | -3 5 | | 3 -3 | -7 5 | -1 -1 |
| 3 5 | -4 to 2 | -5 7 | 0 to 2 | 1 -1 | | -3 1 |
| 1 7 | 7 -1 | | 7 -5 | -1 1 | 4 to 4 | -5 3 |
| | 5 1 | -2 to 2 | 5 -3 | -3 3 | 5 -5 | -7 5 |
| -6 to 4 | 3 3 | 7 -3 | 3 -1 | -5 5 | 3 -3 | |
| 7 3 | 1 5 | 5 -1 | 1 1 | -7 7 | 1 -1 | 6 to 6 |
| 5 5 | -1 7 | 3 1 | -1 3 | | -1 1 | 3 -3 |
| 3 7 | | 1 3 | -3 5 | 2 to 4 | -3 3 | 1 -1 |
| | -4 to 4 | | | 7 -5 | -5 5 | -1 1 |
| -6 to 6 | 7 1 | | | 5 -3 | -7 7 | -3 3 |
| 7 5 | | | | | | -5 5 |
| 5 7 | | | | | | -7 7 |

Thus, Table 1 lists the possible $a_k$ output pairs for each state-to-state transition in the second power graph of FIG. 17. Note that these values produce a null at zero frequency (DC). To produce a matched spectral null for a 1+D partial response channel, the second value in each pair is negated. Thus, in one embodiment where partial response channel 412 is a 1+D channel, the values on the right hand side of each subcolumn are negated prior to writing the data to the channel.

7. Example Decoder Specification

Having thus described an example matched spectral null encoder for encoding $b_k$ data bits into $a_k$ symbols for placement onto the channel, a decoder for recovering the original $b_k$ data bits is now described. The decoder can be implemented to estimate the sequence $b_k$ from the equalizer output $c_k$.

The decoder described herein is a joint matched spectral null/channel decoder that combines the knowledge of the matched spectral null trellis code (which converts the $b_k$ sequence into a sequence $a_k$) and the knowledge about the partial response channel (which converts the $a_k$ sequence into a sequence $c_k$). That is, in conducting the decoding process the decoder considers the effects of the matched spectral null trellis coder as well as the effects of the channel.

Figure 18:
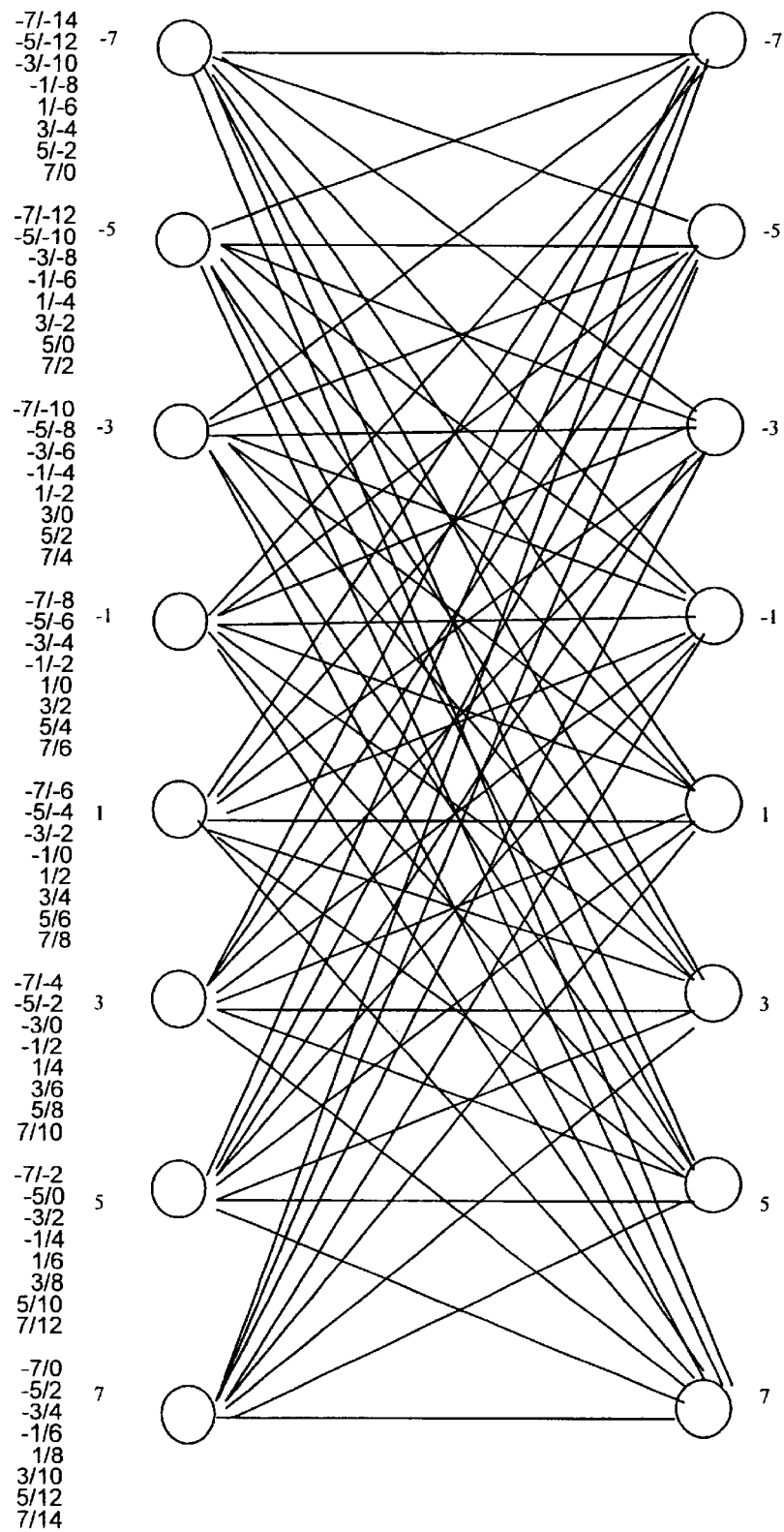
FIG. 18 is a diagram illustrating a state machine for an M=8 1+D channel according to one embodiment of the invention.

The state machine structure of the matched spectral null trellis encoder is described above in general, and specifically with reference to an M=8, R=2.5 matched spectral null code. The state machine description of the channel is now described. FIG. 18 is a diagram illustrating a state machine for an M=8 1+D channel according to one embodiment of the invention. The expression that governs the relationship between $c_k$ and $a_{k-1}$ for the 1+D channel is $c_k=a_k+a_{k-1}$. The state of the channel is defined according to as the previous input $a_{k-1}$ therefore the channel has L=M=8 states. Illustrated in FIG. 18 are eight current states 564, eight next states 566 and the edges 568 representing transitions therebetween. Current states 564 represent the inputs to the channel $a_{k-1}$. Next states 566 represent the next input $a_k$.

If the channel input is defined to be $a_k$ and the channel output to be $c_k$, then FIG. 18 shows the L=8 current and next states. The columns along the left-hand side of FIG. 18 illustrate the state transitions $a_k/c_k$, where for the 1+D channel $c_k=a_k+a_{k-1}$. These edge labelings correspond to outgoing edges from top to bottom.

As an example, assume that we are in the state $a_{k-1}=1$ and let the channel input be $a_k=-3$. The 1+D channel causes the output from the channel $c_k$ to be $c_k=a_k+a_{k-1}=2$, and the next state is $a_k=-3$. This is illustrated in FIG. 16 by looking at state 1 and then finding the list entry 1/-3 and noting that the corresponding edge 568 in the trellis transitions from state 1 to state -3. Thus, FIG. 16 illustrates an example behavior of an M=8, 1+D channel.

Any channel output $c_k$ is a function of the current state of both the matched spectral null trellis code and the channel. Because the $c_k$'s that result at the output of the channel reflect the effects of the matched spectral null trellis code and the effects of the channel, the effects of both of these are considered in the decoding process. Consequently, a preferred decoder takes into account all possible states of both systems. For example, with the example encoder and partial response channel described above, the decoder considers the combined effects of the K=7 state matched spectral null encoder and the M=8 partial response channel.

A joint decoder can be implemented by defining a joint state pair $(s_{rds}, s_{chan})$. The first component $s_{rds}$ is the current running digital sum value of the matched spectral null encoder (this is the state of the matched spectral null encoder). The second component, $s_{chan}$ is the previous channel input $a_{k-1}$. The relation between $b_k$ and $c_k$ can nominally be described by a KL-state product trellis that gives all possible values of the joint state $(s_{rds}, s_{chan})$. For the example M=8, 1+D channel and the K=7 MSN a code trellis given in Table 1. The possible states are, in this example, K*L=56 states.

Careful inspection of the possible channel inputs and transitions in the running digital sum state machine in this example reveal that some of the state pairs ($s_{rds}, s_{chan}$) do not occur. For instance if the matched spectral null trellis code has a current RDS value of −6, then it is not possible for the next channel input (which is the next channel state) to be a −5, so there is no way that such a state would be used. The other joint states that do not get used are:

−6, −5  6, 5

−6, −7  6, 7

−4, −7  4, 7

Therefore, in this particular example, there are only 50 of the possible 56 states that are used. Table 2 shows the resulting decoder for the joint MSN/channel decoder. A Viterbi decoding algorithm can be run on the 50-state decoder to decode the sequence $b_k$ from the channel outputs $c_k$.

Referring now to Table 2, the two terms that comprise the beginning state (the first column) are the current running digital sum or state of the encoder, and the last input $a_{k-1}$. Thus, considering the first row of the example decoder table, the current running digital sum of the encoder is −6, and the last input $a_{k-1}$ is −3.

The second column, labeled end state, reflects the next running digital sum of the encoder, and the last input $a_{k+1}1$ of the input pair that leads to this next state. Deferring further discussion of the end state column and turning now to the third column, the channel input reflects the input pair that leads to a transition from the beginning state to the end state. Remembering in the discussion for the example encoder described above, the encoder transitions from one running digital sum to the next running digital sum in pairs. The third column, then, represents the input pairs used to get from the beginning state to the end state. These represent the $a_k$, and $a_k+1$ inputs.

Referring to Table 1, the encoder table, one possible input pair leading from a beginning state of −6 to an end state of −6 is the pair (7,−7). Table 1, however, is for an encoder producing a spectral null at DC (i.e., F=0). To produce a null at the Nyquist frequency to match the 1+D channel, the second input is negated. Consequently, for a 1+D channel the input pair leading from a −6 to a −6 is (7,7). Thus, the channel inputs for the first row, representing a transition from a −6 to a −6 is 7,7 for the 1+D channel.

Returning discussion to the end state column, as discussed, the end state is reached from the current state by a pair of inputs. In the example illustrated in Table 2, end state −6 is reached from beginning state −6 with the last input $a_{k+1}$ being a 7 (negated to create a null at the Nyquist frequency for a 1+D channel.

The last column labeled "channel output" represents the output received from the channel for decoding. The two columns in the "channel output" column represent two subsequent outputs $c_k$ and $c_{k+1}$. To illustrate, recall that for the 1+D channel the output $c_k=a_k+a_{k-1}$, and the next output $c_{k+1}=a_{k+1}+a_k$. As such, in Table two, the left entry $c_k=4$ represents the first channel input $a_{k-1}=-3$ plus the next channel input $a_k=7$. Similarly, the right entry $c_{k+1}=14$ represents the next channel input $a_k=7$ plus the last channel input $a_{k+1}=7$.

The decoder table is used to build a Viterbi decoder, and the channel outputs are run through the Viterbi decoder to predict or estimate the input sequence of $b_k$'s that led to the detected channel outputs. In one embodiment, the channel outputs used in the Viterbi decoding process are soft outputs, that is they are not confined to whole integer numbers.

TABLE 2

Example joint MSN/Channel Decoder

| Begin state | end state | channel input | channel output |
|---|---|---|---|
| −6 −3 | −6 7 | 7 7 | 4 14 |
| −6 −3 | −6 5 | 5 5 | 2 10 |
| −6 −3 | −6 3 | 3 3 | 0 6 |
| −6 −3 | −6 1 | 1 1 | −2 2 |
| −6 −3 | −6 −1 | −1 −1 | −4 −2 |
| −6 −3 | −6 −3 | −3 −3 | −6 −6 |
| −6 −3 | −4 5 | 7 5 | 4 12 |
| −6 −3 | −4 3 | 5 3 | 2 8 |
| −6 −3 | −4 1 | 3 1 | 0 4 |
| −6 −3 | −4 −1 | 1 −1 | −2 0 |
| −6 −3 | −4 −3 | −1 −3 | −4 −4 |
| −6 −3 | −4 −5 | −3 −5 | −6 −8 |
| −6 −3 | −2 3 | 7 3 | 4 10 |
| −6 −3 | −2 1 | 5 1 | 2 6 |
| −6 −3 | −2 −1 | 3 −1 | 0 2 |
| −6 −3 | −2 −3 | 1 −3 | −2 −2 |
| −6 −3 | −2 −5 | −1 −5 | −4 −6 |
| −6 −3 | −2 −7 | −3 −7 | −6 −10 |
| −6 −3 | 0 1 | 7 1 | 4 8 |
| −6 −3 | 0 −1 | 5 −1 | 2 4 |
| −6 −3 | 0 −3 | 3 −3 | 0 0 |
| −6 −3 | 0 −5 | 1 −5 | −2 −4 |
| −6 −3 | 0 −7 | −1 −7 | −4 −8 |
| −6 −3 | 2 −1 | 7 −1 | 4 6 |
| −6 −3 | 2 −3 | 5 −3 | 2 2 |
| −6 −3 | 2 −5 | 3 −5 | 0 −2 |
| −6 −3 | 2 −7 | 1 −7 | −2 −6 |
| −6 −3 | 4 −3 | 7 −3 | 4 4 |
| −6 −3 | 4 −5 | 5 −5 | 2 0 |
| −6 −3 | 4 −7 | 3 −7 | 0 −4 |
| −6 −3 | 6 −5 | 7 −5 | 4 2 |
| −6 −3 | 6 −7 | 5 −7 | 2 −2 |
| −6 −1 | −6 7 | 7 7 | 6 14 |
| −6 −1 | −6 5 | 5 5 | 4 10 |
| −6 −1 | −6 3 | 3 3 | 2 6 |
| −6 −1 | −6 1 | 1 1 | 0 2 |
| −6 −1 | −6 −1 | −1 −1 | −2 −2 |
| −6 −1 | −6 −3 | −3 −3 | −4 −6 |
| −6 −1 | −4 5 | 7 5 | 6 12 |
| −6 −1 | −4 3 | 5 3 | 4 8 |
| −6 −1 | −4 1 | 3 1 | 2 4 |
| −6 −1 | −4 −1 | 1 −1 | 0 0 |
| −6 −1 | −4 −3 | −1 −3 | −2 −4 |
| −6 −1 | −4 −5 | −3 −5 | −4 −8 |
| −6 −1 | −2 3 | 7 3 | 6 10 |
| −6 −1 | −2 1 | 5 1 | 4 6 |
| −6 −1 | −2 −1 | 3 −1 | 2 2 |
| −6 −1 | −2 −3 | 1 −3 | 0 −2 |
| −6 −1 | −2 −5 | −1 −5 | −2 −6 |
| −6 −1 | −2 −7 | −3 −7 | −4 −10 |
| −6 −1 | 0 1 | 7 1 | 6 8 |
| −6 −1 | 0 −1 | 5 −1 | 4 4 |
| −6 −1 | 0 −3 | 3 −3 | 2 0 |
| −6 −1 | 0 −5 | 1 −5 | 0 −4 |
| −6 −1 | 0 −7 | −1 −7 | −2 −8 |
| −6 −1 | 2 −1 | 7 −1 | 6 6 |
| −6 −1 | 2 −3 | 5 −3 | 4 2 |
| −6 −1 | 2 −5 | 3 −5 | 2 −2 |
| −6 −1 | 2 −7 | 1 −7 | 0 −6 |
| −6 −1 | 4 −3 | 7 −3 | 6 4 |
| −6 −1 | 4 −5 | 5 −5 | 4 0 |
| −6 −1 | 4 −7 | 3 −7 | 2 −4 |
| −6 −1 | 6 −5 | 7 −5 | 6 2 |
| −6 −1 | 6 −7 | 5 −7 | 4 −2 |
| −6 1 | −6 7 | 7 7 | 8 14 |
| −6 1 | −6 5 | 5 5 | 6 10 |
| −6 1 | −6 3 | 3 3 | 4 6 |
| −6 1 | −6 1 | 1 1 | 2 2 |
| −6 1 | −6 −1 | −1 −1 | 0 −2 |
| −6 1 | −6 −3 | −3 −3 | −2 −6 |
| −6 1 | −4 5 | 7 5 | 8 12 |
| −6 1 | −4 3 | 5 3 | 6 8 |
| −6 1 | −4 1 | 3 1 | 4 4 |
| −6 1 | −4 −1 | 1 −1 | 2 0 |

TABLE 2-continued

Example joint MSN/Channel Decoder

| Begin state | end state | channel input | channel output |
|---|---|---|---|
| −6 1 | −4 −3 | −1 −3 | 0 −4 |
| −6 1 | −4 −5 | −3 −5 | −2 −8 |
| −6 1 | −2 3 | 7 3 | 8 10 |
| −6 1 | −2 1 | 5 1 | 6 6 |
| −6 1 | −2 −1 | 3 −1 | 4 2 |
| −6 1 | −2 −3 | 1 −3 | 2 −2 |
| −6 1 | −2 −5 | −1 −5 | 0 −6 |
| −6 1 | −2 −7 | −3 −7 | −2 −10 |
| −6 1 | 0 1 | 7 1 | 8 8 |
| −6 1 | 0 −1 | 5 −1 | 6 4 |
| −6 1 | 0 −3 | 3 −3 | 4 0 |
| −6 1 | 0 −5 | 1 −5 | 2 −4 |
| −6 1 | 0 −7 | −1 −7 | 0 −8 |
| −6 1 | 2 −1 | 7 −1 | 8 6 |
| −6 1 | 2 −3 | 5 −3 | 6 2 |
| −6 1 | 2 −5 | 3 −5 | 4 −2 |
| −6 1 | 2 −7 | 1 −7 | 2 −6 |
| −6 1 | 4 −3 | 7 −3 | 8 4 |
| −6 1 | 4 −5 | 5 −5 | 6 0 |
| −6 1 | 4 −7 | 3 −7 | 4 −4 |
| −6 1 | 6 −5 | 7 −5 | 8 2 |
| −6 1 | 6 −7 | 5 −7 | 6 −2 |
| −6 3 | −6 7 | 7 7 | 10 14 |
| −6 3 | −6 5 | 5 5 | 8 10 |
| −6 3 | −6 3 | 3 3 | 6 6 |
| −6 3 | −6 1 | 1 1 | 4 2 |
| −6 3 | −6 −1 | −1 −1 | 2 −2 |
| −6 3 | −6 −3 | −3 −3 | 0 −6 |
| −6 3 | −4 5 | 7 5 | 10 12 |
| −6 3 | −4 3 | 5 3 | 8 8 |
| −6 3 | −4 1 | 3 1 | 6 4 |
| −6 3 | −4 −1 | 1 −1 | 4 0 |
| −6 3 | −4 −3 | −1 −3 | 2 −4 |
| −6 3 | −4 −5 | −3 −5 | 0 −8 |
| −6 3 | −2 3 | 7 3 | 10 10 |
| −6 3 | −2 1 | 5 1 | 8 6 |
| −6 3 | −2 −1 | 3 −1 | 6 2 |
| −6 3 | −2 −3 | 1 −3 | 4 −2 |
| −6 3 | −2 −5 | −1 −5 | 2 −6 |
| −6 3 | −2 −7 | −3 −7 | 0 −10 |
| −6 3 | 0 1 | 7 1 | 10 8 |
| −6 3 | 0 −1 | 5 −1 | 8 4 |
| −6 3 | 0 −3 | 3 −3 | 6 0 |
| −6 3 | 0 −5 | 1 −5 | 4 −4 |
| −6 3 | 0 −7 | −1 −7 | 2 −8 |
| −6 3 | 2 −1 | 7 −1 | 10 6 |
| −6 3 | 2 −3 | 5 −3 | 8 2 |
| −6 3 | 2 −5 | 3 −5 | 6 −2 |
| −6 3 | 2 −7 | 1 −7 | 4 −6 |
| −6 3 | 4 −3 | 7 −3 | 10 4 |
| −6 3 | 4 −5 | 5 −5 | 8 0 |
| −6 3 | 4 −7 | 3 −7 | 6 −4 |
| −6 3 | 6 −5 | 7 −5 | 10 2 |
| −6 3 | 6 −7 | 5 −7 | 8 −2 |
| −6 5 | −6 7 | 7 7 | 12 14 |
| −6 5 | −6 5 | 5 5 | 10 10 |
| −6 5 | −6 3 | 3 3 | 8 6 |
| −6 5 | −6 1 | 1 1 | 6 2 |
| −6 5 | −6 −1 | −1 −1 | 4 −2 |
| −6 5 | −6 −3 | −3 −3 | 2 −6 |
| −6 5 | −4 5 | 7 5 | 12 12 |
| −6 5 | −4 3 | 5 3 | 10 8 |
| −6 5 | −4 1 | 3 1 | 8 4 |
| −6 5 | −4 −1 | 1 −1 | 6 0 |
| −6 5 | −4 −3 | −1 −3 | 4 −4 |
| −6 5 | −4 −5 | −3 −5 | 2 −8 |
| −6 5 | −2 3 | 7 3 | 12 10 |
| −6 5 | −2 1 | 5 1 | 10 6 |
| −6 5 | −2 −1 | 3 −1 | 8 2 |
| −6 5 | −2 −3 | 1 −3 | 6 −2 |
| −6 5 | −2 −5 | −1 −5 | 4 −6 |
| −6 5 | −2 −7 | −3 −7 | 2 −10 |
| −6 5 | 0 1 | 7 1 | 12 8 |
| −6 5 | 0 −1 | 5 −1 | 10 4 |
| −6 5 | 0 −3 | 3 −3 | 8 0 |
| −6 5 | 0 −5 | 1 −5 | 6 −4 |
| −6 5 | 0 −7 | −1 −7 | 4 −8 |
| −6 5 | 2 −1 | 7 −1 | 12 6 |
| −6 5 | 2 −3 | 5 −3 | 10 2 |
| −6 5 | 2 −5 | 3 −5 | 8 −2 |
| −6 5 | 2 −7 | 1 −7 | 6 −6 |
| −6 5 | 4 −3 | 7 −3 | 12 4 |
| −6 5 | 4 −5 | 5 −5 | 10 0 |
| −6 5 | 4 −7 | 3 −7 | 8 −4 |
| −6 5 | 6 −5 | 7 −5 | 12 2 |
| −6 5 | 6 −7 | 5 −7 | 10 −2 |
| −6 7 | −6 7 | 7 7 | 14 14 |
| −6 7 | −6 5 | 5 5 | 12 10 |
| −6 7 | −6 3 | 3 3 | 10 6 |
| −6 7 | −6 1 | 1 1 | 8 2 |
| −6 7 | −6 −1 | −1 −1 | 6 −2 |
| −6 7 | −6 −3 | −3 −3 | 4 −6 |
| −6 7 | −4 5 | 7 5 | 14 12 |
| −6 7 | −4 3 | 5 3 | 12 8 |
| −6 7 | −4 1 | 3 1 | 10 4 |
| −6 7 | −4 −1 | 1 −1 | 8 0 |
| −6 7 | −4 −3 | −1 −3 | 6 −4 |
| −6 7 | −4 −5 | −3 −5 | 4 −8 |
| −6 7 | −2 3 | 7 3 | 14 10 |
| −6 7 | −2 1 | 5 1 | 12 6 |
| −6 7 | −2 −1 | 3 −1 | 10 2 |
| −6 7 | −2 −3 | 1 −3 | 8 −2 |
| −6 7 | −2 −5 | −1 −5 | 6 −6 |
| −6 7 | −2 −7 | −3 −7 | 4 −10 |
| −6 7 | 0 1 | 7 1 | 14 8 |
| −6 7 | 0 −1 | 5 −1 | 12 4 |
| −6 7 | 0 −3 | 3 −3 | 10 0 |
| −6 7 | 0 −5 | 1 −5 | 8 −4 |
| −6 7 | 0 −7 | −1 −7 | 6 −8 |
| −6 7 | 2 −1 | 7 −1 | 14 6 |
| −6 7 | 2 −3 | 5 −3 | 12 2 |
| −6 7 | 2 −5 | 3 −5 | 10 −2 |
| −6 7 | 2 −7 | 1 −7 | 8 −6 |
| −6 7 | 4 −3 | 7 −3 | 14 4 |
| −6 7 | 4 −5 | 5 −5 | 12 0 |
| −6 7 | 4 −7 | 3 −7 | 10 −4 |
| −6 7 | 6 −5 | 7 −5 | 14 2 |
| −6 7 | 6 −7 | 5 −7 | 12 −2 |
| −4 −5 | −6 7 | 5 7 | 0 12 |
| −4 −5 | −6 5 | 3 5 | −2 8 |
| −4 −5 | −6 3 | 1 3 | −4 4 |
| −4 −5 | −6 1 | −1 1 | −6 0 |
| −4 −5 | −6 −1 | −3 −1 | −8 −4 |
| −4 −5 | −6 −3 | −5 −3 | −10 −8 |
| −4 −5 | −4 −7 | 7 7 | 2 14 |
| −4 −5 | −4 5 | 5 5 | 0 10 |
| −4 −5 | −4 3 | 3 3 | −2 6 |
| −4 −5 | −4 1 | 1 1 | −4 2 |
| −4 −5 | −4 −1 | −1 −1 | −6 −2 |
| −4 −5 | −4 −3 | −3 −3 | −8 −6 |
| −4 −5 | −4 −5 | −5 −5 | −10 −10 |
| −4 −5 | −2 5 | 7 5 | 2 12 |
| −4 −5 | −2 3 | 5 3 | 0 8 |
| −4 −5 | −2 1 | 3 1 | −2 4 |
| −4 −5 | −2 −1 | 1 −1 | −4 0 |
| −4 −5 | −2 −3 | −1 −3 | −6 −4 |
| −4 −5 | −2 −5 | −3 −5 | −8 −8 |
| −4 −5 | −2 −7 | −5 −7 | −10 −12 |
| −4 −5 | 0 3 | 7 3 | 2 10 |
| −4 −5 | 0 1 | 5 1 | 0 6 |
| −4 −5 | 0 −1 | 3 −1 | −2 2 |
| −4 −5 | 0 −3 | 1 −3 | −4 −2 |
| −4 −5 | 0 −5 | −1 −5 | −6 −6 |
| −4 −5 | 0 −7 | −3 −7 | −8 −10 |
| −4 −5 | 2 1 | 7 1 | 2 8 |
| −4 −5 | 2 −1 | 5 −1 | 0 4 |
| −4 −5 | 2 −3 | 3 −3 | −2 0 |
| −4 −5 | 2 −5 | 1 −5 | −4 −4 |

TABLE 2-continued

Example joint MSN/Channel Decoder

| Begin state | end state | channel input | channel output |
|---|---|---|---|
| −4 −5 | 2 −7 | −1 −7 | −6 −8 |
| −4 −5 | 4 −1 | 7 −1 | 2 6 |
| −4 −3 | −6 7 | 5 7 | 2 12 |
| −4 −3 | −6 5 | 3 5 | 0 8 |
| −4 −3 | −6 3 | 1 3 | −2 4 |
| −4 −3 | −6 1 | −1 1 | −4 0 |
| −4 −3 | −6 −1 | −3 −1 | −6 −4 |
| −4 −3 | −6 −3 | −5 −3 | −8 −8 |
| −4 −3 | −4 7 | 7 7 | 4 14 |
| −4 −3 | −4 5 | 5 5 | 2 10 |
| −4 −3 | −4 3 | 3 3 | 0 6 |
| −4 −3 | −4 1 | 1 1 | −2 2 |
| −4 −3 | −4 −1 | −1 −1 | −4 −2 |
| −4 −3 | −4 −3 | −3 −3 | −6 −6 |
| −4 −3 | −4 −5 | −5 −5 | −8 −10 |
| −4 −3 | −2 5 | 7 5 | 4 12 |
| −4 −3 | −2 3 | 5 3 | 2 8 |
| −4 −3 | −2 1 | 3 1 | 0 4 |
| −4 −3 | −2 −1 | 1 −1 | −2 0 |
| −4 −3 | −2 −3 | −1 −3 | −4 −4 |
| −4 −3 | −2 −5 | −3 −5 | −6 −8 |
| −4 −3 | −2 −7 | −5 −7 | −8 −12 |
| −4 −3 | 0 3 | 7 3 | 4 10 |
| −4 −3 | 0 1 | 5 1 | 2 6 |
| −4 −3 | 0 −1 | 3 −1 | 0 2 |
| −4 −3 | 0 −3 | 1 −3 | −2 −2 |
| −4 −3 | 0 −5 | −1 −5 | −4 −6 |
| −4 −3 | 0 −7 | −3 −7 | −6 −10 |
| −4 −3 | 2 1 | 7 1 | 4 8 |
| −4 −3 | 2 −1 | 5 −1 | 2 4 |
| −4 −3 | 2 −3 | 3 −3 | 0 0 |
| −4 −3 | 2 −5 | 1 −5 | −2 −4 |
| −4 −3 | 2 −7 | −1 −7 | −4 −8 |
| −4 −3 | 4 −1 | 7 −1 | 4 6 |
| −4 −1 | −6 7 | 5 7 | 4 12 |
| −4 −1 | −6 5 | 3 5 | 2 8 |
| −4 −1 | −6 3 | 1 3 | 0 4 |
| −4 −1 | −6 1 | −1 1 | −2 0 |
| −4 −1 | −6 −1 | −3 −1 | −4 −4 |
| −4 −1 | −6 −3 | −5 −3 | −6 −8 |
| −4 −1 | −4 7 | 7 7 | 6 14 |
| −4 −1 | −4 5 | 5 5 | 4 10 |
| −4 −1 | −4 3 | 3 3 | 2 6 |
| −4 −1 | −4 1 | 1 1 | 0 2 |
| −4 −1 | −4 −1 | −1 −1 | −2 −2 |
| −4 −1 | −4 −3 | −3 −3 | −4 −6 |
| −4 −1 | −4 −5 | −5 −5 | −6 −10 |
| −4 −1 | −2 5 | 7 5 | 6 12 |
| −4 −1 | −2 3 | 5 3 | 4 8 |
| −4 −1 | −2 1 | 3 1 | 2 4 |
| −4 −1 | −2 −1 | 1 −1 | 0 0 |
| −4 −1 | −2 −3 | −1 −3 | −2 −4 |
| −4 −1 | −2 −5 | −3 −5 | −4 −8 |
| −4 −1 | −2 −7 | −5 −7 | −6 −12 |
| −4 −1 | 0 3 | 7 3 | 6 10 |
| −4 −1 | 0 1 | 5 1 | 4 6 |
| −4 −1 | 0 −1 | 3 −1 | 2 2 |
| −4 −1 | 0 −3 | 1 −3 | 0 −2 |
| −4 −1 | 0 −5 | −1 −5 | −2 −6 |
| −4 −1 | 0 −7 | −3 −7 | −4 −10 |
| −4 −1 | 2 1 | 7 1 | 6 8 |
| −4 −1 | 2 −1 | 5 −1 | 4 4 |
| −4 −1 | 2 −3 | 3 −3 | 2 0 |
| −4 −1 | 2 −5 | 1 −5 | 0 −4 |
| −4 −1 | 2 −7 | −1 −7 | −2 −8 |
| −4 −1 | 4 −1 | 7 −1 | 6 6 |
| −4 1 | −6 7 | 5 7 | 6 12 |
| −4 1 | −6 5 | 3 5 | 4 8 |
| −4 1 | −6 3 | 1 3 | 2 4 |
| −4 1 | −6 1 | −1 1 | 0 0 |
| −4 1 | −6 −1 | −3 −1 | −2 −4 |
| −4 1 | −6 −3 | −5 −3 | −4 −8 |
| −4 1 | −4 7 | 7 7 | 8 14 |
| −4 1 | −4 5 | 5 5 | 6 10 |
| −4 1 | −4 3 | 3 3 | 4 6 |
| −4 1 | −4 1 | 1 1 | 2 2 |
| −4 1 | −4 −1 | −1 −1 | 0 −2 |
| −4 1 | −4 −3 | −3 −3 | −2 −6 |
| −4 1 | −4 −5 | −5 −5 | −4 −10 |
| −4 1 | −2 5 | 7 5 | 8 12 |
| −4 1 | −2 3 | 5 3 | 6 8 |
| −4 1 | −2 1 | 3 1 | 4 4 |
| −4 1 | −2 −1 | 1 −1 | 2 0 |
| −4 1 | −2 −3 | −1 −3 | 0 −4 |
| −4 1 | −2 −5 | −3 −5 | −2 −8 |
| −4 1 | −2 −7 | −5 −7 | −4 −12 |
| −4 1 | 0 3 | 7 3 | 8 10 |
| −4 1 | 0 1 | 5 1 | 6 6 |
| −4 1 | 0 −1 | 3 −1 | 4 2 |
| −4 1 | 0 −3 | 1 −3 | 2 −2 |
| −4 1 | 0 −5 | −1 −5 | 0 −6 |
| −4 1 | 0 −7 | −3 −7 | −2 −10 |
| −4 1 | 2 1 | 7 1 | 8 8 |
| −4 1 | 2 −1 | 5 −1 | 6 4 |
| −4 1 | 2 −3 | 3 −3 | 4 0 |
| −4 1 | 2 −5 | 1 −5 | 2 −4 |
| −4 1 | 2 −7 | −1 −7 | 0 −8 |
| −4 1 | 4 −1 | 7 −1 | 8 6 |
| −4 3 | −6 7 | 5 7 | 8 12 |
| −4 3 | −6 5 | 3 5 | 6 8 |
| −4 3 | −6 3 | 1 3 | 4 4 |
| −4 3 | −6 1 | −1 1 | 2 0 |
| −4 3 | −6 −1 | −3 −1 | 0 −4 |
| −4 3 | −6 −3 | −5 −3 | −2 −8 |
| −4 3 | −4 7 | 7 7 | 10 14 |
| −4 3 | −4 5 | 5 5 | 8 10 |
| −4 3 | −4 3 | 3 3 | 6 6 |
| −4 3 | −4 1 | 1 1 | 4 2 |
| −4 3 | −4 −1 | −1 −1 | 2 −2 |
| −4 3 | −4 −3 | −3 −3 | 0 −6 |
| −4 3 | −4 −5 | −5 −5 | −2 −10 |
| −4 3 | −2 5 | 7 5 | 10 12 |
| −4 3 | −2 3 | 5 3 | 8 8 |
| −4 3 | −2 1 | 3 1 | 6 4 |
| −4 3 | −2 −1 | 1 −1 | 4 0 |
| −4 3 | −2 −3 | −1 −3 | 2 −4 |
| −4 3 | −2 −5 | −3 −5 | 0 −8 |
| −4 3 | −2 −7 | −5 −7 | −2 −12 |
| −4 3 | 0 3 | 7 3 | 10 10 |
| −4 3 | 0 1 | 5 1 | 8 6 |
| −4 3 | 0 −1 | 3 −1 | 6 2 |
| −4 3 | 0 −3 | 1 −3 | 4 −2 |
| −4 3 | 0 −5 | −1 −5 | 2 −6 |
| −4 3 | 0 −7 | −3 −7 | 0 −10 |
| −4 3 | 2 1 | 7 1 | 10 8 |
| −4 3 | 2 −1 | 5 −1 | 8 4 |
| −4 3 | 2 −3 | 3 −3 | 6 0 |
| −4 3 | 2 −5 | 1 −5 | 4 −4 |
| −4 3 | 2 −7 | −1 −7 | 2 −8 |
| −4 3 | 4 −1 | 7 −1 | 10 6 |
| −4 5 | −6 7 | 5 7 | 10 12 |
| −4 5 | −6 5 | 3 5 | 8 8 |
| −4 5 | −6 3 | 1 3 | 6 4 |
| −4 5 | −6 1 | −1 1 | 4 0 |
| −4 5 | −6 −1 | −3 −1 | 2 −4 |
| −4 5 | −6 −3 | −5 −3 | 0 −8 |
| −4 5 | −4 7 | 7 7 | 12 14 |
| −4 5 | −4 5 | 5 5 | 10 10 |
| −4 5 | −4 3 | 3 3 | 8 6 |
| −4 5 | −4 1 | 1 1 | 6 2 |
| −4 5 | −4 −1 | −1 −1 | 4 −2 |
| −4 5 | −4 −3 | −3 −3 | 2 −6 |
| −4 5 | −4 −5 | −5 −5 | 0 −10 |
| −4 5 | −2 5 | 7 5 | 12 12 |
| −4 5 | −2 3 | 5 3 | 10 8 |
| −4 5 | −2 1 | 3 1 | 8 4 |
| −4 5 | −2 −1 | 1 −1 | 6 0 |
| −4 5 | −2 −3 | −1 −3 | 4 4 |

TABLE 2-continued

Example joint MSN/Channel Decoder

| Begin state | end state | channel input | channel output |
|---|---|---|---|
| -4 5 | -2 -5 | -3 -5 | 2 -8 |
| -4 5 | -2 -7 | -5 -7 | 0 -12 |
| -4 5 | 0 3 | 7 3 | 12 10 |
| -4 5 | 0 1 | 5 1 | 10 6 |
| -4 5 | 0 -1 | 3 -1 | 8 2 |
| -4 5 | 0 -3 | 1 -3 | 6 -2 |
| -4 5 | 0 -5 | -1 -5 | 4 -6 |
| -4 5 | 0 -7 | -3 -7 | 2 -10 |
| -4 5 | 2 1 | 7 1 | 12 8 |
| -4 5 | 2 -1 | 5 -1 | 10 4 |
| -4 5 | 2 -3 | 3 -3 | 8 0 |
| -4 5 | 2 -5 | 1 -5 | 6 -4 |
| -4 5 | 2 -7 | -1 -7 | 4 -8 |
| -4 5 | 4 -1 | 7 -1 | 12 6 |
| -4 7 | -6 7 | 5 7 | 12 12 |
| -4 7 | -6 5 | 3 5 | 10 8 |
| -4 7 | -6 3 | 1 3 | 8 4 |
| -4 7 | -6 1 | -1 1 | 6 0 |
| -4 7 | -6 -1 | -3 -1 | 4 -4 |
| -4 7 | -6 -3 | -5 -3 | 2 -8 |
| -4 7 | -4 7 | 7 7 | 14 14 |
| -4 7 | -4 5 | 5 5 | 12 10 |
| -4 7 | -4 3 | 3 3 | 10 6 |
| -4 7 | -4 1 | 1 1 | 8 2 |
| -4 7 | -4 -1 | -1 -1 | 6 -2 |
| -4 7 | -4 -3 | -3 -3 | 4 -6 |
| -4 7 | -4 -5 | -5 -5 | 2 -10 |
| -4 7 | -2 5 | 7 5 | 14 12 |
| -4 7 | -2 3 | 5 3 | 12 8 |
| -4 7 | -2 1 | 3 1 | 10 4 |
| -4 7 | -2 -1 | 1 -1 | 8 0 |
| -4 7 | -2 -3 | -1 -3 | 6 -4 |
| -4 7 | -2 -5 | -3 -5 | 4 -8 |
| -4 7 | -2 -7 | -5 -7 | 2 -12 |
| -4 7 | 0 3 | 7 3 | 14 10 |
| -4 7 | 0 1 | 5 1 | 12 6 |
| -4 7 | 0 -1 | 3 -1 | 10 2 |
| -4 7 | 0 -3 | 1 -3 | 8 -2 |
| -4 7 | 0 -5 | -1 -5 | 6 -6 |
| -4 7 | 0 -7 | -3 -7 | 4 -10 |
| -4 7 | 2 1 | 7 1 | 14 8 |
| -4 7 | 2 -1 | 5 -1 | 12 4 |
| -4 7 | 2 -3 | 3 -3 | 10 0 |
| -4 7 | 2 -5 | 1 -5 | 8 -4 |
| -4 7 | 2 -7 | -1 -7 | 6 -8 |
| -4 7 | 4 -1 | 7 -1 | 14 6 |
| -2 -7 | -6 7 | 3 7 | -4 10 |
| -2 -7 | -6 5 | 1 5 | -6 6 |
| -2 -7 | -6 3 | -1 3 | -8 2 |
| -2 -7 | -6 1 | -3 1 | -10 -2 |
| -2 -7 | -6 -1 | -5 -1 | -12 -6 |
| -2 -7 | -6 -3 | -7 -3 | -14 -10 |
| -2 -7 | -4 7 | 5 7 | -2 12 |
| -2 -7 | -4 5 | 3 5 | -4 8 |
| -2 -7 | -4 3 | 1 3 | -6 4 |
| -2 -7 | -4 1 | -1 1 | -8 0 |
| -2 -7 | -4 -1 | -3 -1 | -10 -4 |
| -2 -7 | -4 -3 | -5 -3 | -12 -8 |
| -2 -7 | -4 -5 | -7 -5 | -14 -12 |
| -2 -7 | -2 7 | 7 7 | 0 14 |
| -2 -7 | -2 5 | 5 5 | -2 10 |
| -2 -7 | -2 3 | 3 3 | -4 6 |
| -2 -7 | -2 1 | 1 1 | -6 2 |
| -2 -7 | -2 -1 | -1 -1 | -8 -2 |
| -2 -7 | -2 -3 | -3 -3 | -10 -6 |
| -2 -7 | -2 -5 | -5 -5 | -12 -10 |
| -2 -7 | -2 -7 | -7 -7 | -14 -14 |
| -2 -7 | 0 5 | 7 5 | 0 12 |
| -2 -7 | 0 3 | 5 3 | -2 8 |
| -2 -7 | 0 1 | 3 1 | -4 4 |
| -2 -7 | 0 -1 | 1 -1 | -6 0 |
| -2 -7 | 0 -3 | -1 -3 | -8 4 |
| -2 -7 | 0 -5 | -3 -5 | -10 -8 |
| -2 -7 | 0 -7 | -5 -7 | -12 -12 |
| -2 -7 | 2 3 | 7 3 | 0 10 |
| -2 -7 | 2 1 | 5 1 | -2 6 |
| -2 -7 | 2 -1 | 3 -1 | -4 2 |
| -2 -7 | 2 -3 | 1 -3 | -6 -2 |
| -2 -5 | -6 7 | 3 7 | -2 10 |
| -2 -5 | -6 5 | 1 5 | -4 6 |
| -2 -5 | -6 3 | -1 3 | -6 2 |
| -2 -5 | -6 1 | -3 1 | -8 -2 |
| -2 -5 | -6 -1 | -5 -1 | -10 -6 |
| -2 -5 | -6 -3 | -7 -3 | -12 -10 |
| -2 -5 | -4 7 | 5 7 | 0 12 |
| -2 -5 | -4 5 | 3 5 | -2 8 |
| -2 -5 | -4 3 | 1 3 | -4 4 |
| -2 -5 | -4 1 | -1 1 | -6 0 |
| -2 -5 | -4 -1 | -3 -1 | -8 -4 |
| -2 -5 | -4 -3 | -5 -3 | -10 -8 |
| -2 -5 | -4 -5 | -7 -5 | -12 -12 |
| -2 -5 | -2 7 | 7 7 | 2 14 |
| -2 -5 | -2 5 | 5 5 | 0 10 |
| -2 -5 | -2 3 | 3 3 | -2 6 |
| -2 -5 | -2 1 | 1 1 | -4 2 |
| -2 -5 | -2 -1 | -1 -1 | -6 -2 |
| -2 -5 | -2 -3 | -3 -3 | -8 -6 |
| -2 -5 | -2 -5 | -5 -5 | -10 -10 |
| -2 -5 | -2 -7 | -7 -7 | -12 -14 |
| -2 -5 | 0 5 | 7 5 | 2 12 |
| -2 -5 | 0 3 | 5 3 | 0 8 |
| -2 -5 | 0 1 | 3 1 | -2 4 |
| -2 -5 | 0 -1 | 1 -1 | -4 0 |
| -2 -5 | 0 -3 | -1 -3 | -6 -4 |
| -2 -5 | 0 -5 | -3 -5 | -8 -8 |
| -2 -5 | 0 -7 | -5 -7 | -10 -12 |
| -2 -5 | 2 3 | 7 3 | 2 10 |
| -2 -5 | 2 1 | 5 1 | 0 6 |
| -2 -5 | 2 -1 | 3 -1 | -2 2 |
| -2 -5 | 2 -3 | 1 -3 | -4 -2 |
| -2 -3 | -6 7 | 3 7 | 0 10 |
| -2 -3 | -6 5 | 1 5 | -2 6 |
| -2 -3 | -6 3 | -1 3 | -4 2 |
| -2 -3 | -6 1 | -3 1 | -6 -2 |
| -2 -3 | -6 -1 | -5 -1 | -8 -6 |
| -2 -3 | -6 -3 | -7 -3 | -10 -10 |
| -2 -3 | -4 7 | 5 7 | 2 12 |
| -2 -3 | -4 5 | 3 5 | 0 8 |
| -2 -3 | -4 3 | 1 3 | -2 4 |
| -2 -3 | -4 1 | -1 1 | -4 0 |
| -2 -3 | -4 -1 | -3 -1 | -6 -4 |
| -2 -3 | -4 -3 | -5 -3 | -8 -8 |
| -2 -3 | -4 -5 | 7 -5 | -10 -12 |
| -2 -3 | -2 7 | 7 7 | 4 14 |
| -2 -3 | -2 5 | 5 5 | 2 10 |
| -2 -3 | -2 3 | 3 3 | 0 6 |
| -2 -3 | -2 1 | 1 1 | -2 2 |
| -2 -3 | -2 -1 | -1 -1 | -4 -2 |
| -2 -3 | -2 -3 | -3 -3 | -6 -6 |
| -2 -3 | -2 -5 | -5 -5 | -8 -10 |
| -2 -3 | -2 -7 | -7 -7 | -10 -14 |
| -2 -3 | 0 5 | 7 5 | 4 12 |
| -2 -3 | 0 3 | 5 3 | 2 8 |
| -2 -3 | 0 1 | 3 1 | 0 4 |
| -2 -3 | 0 -1 | 1 -1 | -2 0 |
| -2 -3 | 0 -3 | -1 -3 | -4 -4 |
| -2 -3 | 0 -5 | -3 -5 | -6 -8 |
| -2 -3 | 0 -7 | -5 -7 | -8 -12 |
| -2 -3 | 2 3 | 7 3 | 4 10 |
| -2 -3 | 2 1 | 5 1 | 2 6 |
| -2 -3 | 2 -1 | 3 -1 | 0 2 |
| -2 -3 | 2 -3 | 1 -3 | -2 -2 |
| -2 -1 | -6 7 | 3 7 | 2 10 |
| -2 -1 | -6 5 | 1 5 | 0 6 |
| -2 -1 | -6 3 | -1 3 | -2 2 |
| -2 -1 | -6 1 | -3 1 | -4 -2 |
| -2 -1 | -6 -1 | -5 -1 | -6 -6 |
| -2 -1 | -6 -3 | -7 -3 | -8 -10 |

TABLE 2-continued

Example joint MSN/Channel Decoder

| Begin state | end state | channel input | channel output |
|---|---|---|---|
| -2 -1 | -4 7 | 5 7 | 4 12 |
| -2 -1 | -4 5 | 3 5 | 2 8 |
| -2 -1 | -4 3 | 1 3 | 0 4 |
| -2 -1 | -4 1 | -1 1 | -2 0 |
| -2 -1 | -4 -1 | -3 -1 | -4 -4 |
| -2 -1 | -4 -3 | -5 -3 | -6 -8 |
| -2 -1 | -4 -5 | -7 -5 | -8 -12 |
| -2 -1 | -2 7 | 7 7 | 6 14 |
| -2 -1 | -2 5 | 5 5 | 4 10 |
| -2 -1 | -2 3 | 3 3 | 2 6 |
| -2 -1 | -2 1 | 1 1 | 0 2 |
| -2 -1 | -2 -1 | -1 -1 | -2 -2 |
| -2 -1 | -2 -3 | -3 -3 | -4 -6 |
| -2 -1 | -2 -5 | -5 -5 | -6 -10 |
| -2 -1 | -2 -7 | -7 -7 | -8 -14 |
| -2 -1 | 0 5 | 7 5 | 6 12 |
| -2 -1 | 0 3 | 5 3 | 4 8 |
| -2 -1 | 0 1 | 3 1 | 2 4 |
| -2 -1 | 0 -1 | 1 -1 | 0 0 |
| -2 -1 | 0 -3 | -1 -3 | -2 -4 |
| -2 -1 | 0 -5 | -3 -5 | -4 -8 |
| -2 -1 | 0 -7 | -5 -7 | -6 -12 |
| -2 -1 | 2 3 | 7 3 | 6 10 |
| -2 -1 | 2 1 | 5 1 | 4 6 |
| -2 -1 | 2 -1 | 3 -1 | 2 2 |
| -2 -1 | 2 -3 | 1 -3 | 0 -2 |
| -2 1 | -6 7 | 3 7 | 4 10 |
| -2 1 | -6 5 | 1 5 | 2 6 |
| -2 1 | -6 3 | -1 3 | 0 2 |
| -2 1 | -6 1 | -3 1 | -2 -2 |
| -2 1 | -6 -1 | -5 -1 | -4 -6 |
| -2 1 | -6 -3 | -7 -3 | -6 -10 |
| -2 1 | -4 7 | 5 7 | 6 12 |
| -2 1 | -4 5 | 3 5 | 4 8 |
| -2 1 | -4 3 | 1 3 | 2 4 |
| -2 1 | -4 1 | -1 1 | 0 0 |
| -2 1 | -4 -1 | -3 -1 | -2 -4 |
| -2 1 | -4 -3 | -5 -3 | -4 -8 |
| -2 1 | -4 -5 | -7 -5 | -6 -12 |
| -2 1 | -2 7 | 7 7 | 8 14 |
| -2 1 | -2 5 | 5 5 | 6 10 |
| -2 1 | -2 3 | 3 3 | 4 6 |
| -2 1 | -2 1 | 1 1 | 2 2 |
| -2 1 | -2 -1 | -1 -1 | 0 -2 |
| -2 1 | -2 -3 | -3 -3 | -2 -6 |
| -2 1 | -2 -5 | -5 -5 | -4 -10 |
| -2 1 | -2 -7 | -7 -7 | -6 -14 |
| -2 1 | 0 5 | 7 5 | 8 12 |
| -2 1 | 0 3 | 5 3 | 6 8 |
| -2 1 | 0 1 | 3 1 | 4 4 |
| -2 1 | 0 -1 | 1 -1 | 2 0 |
| -2 1 | 0 -3 | -1 -3 | 0 -4 |
| -2 1 | 0 -5 | -3 -5 | -2 -8 |
| -2 1 | 0 -7 | -5 -7 | -4 -12 |
| -2 1 | 2 3 | 7 3 | 8 10 |
| -2 1 | 2 1 | 5 1 | 6 6 |
| -2 1 | 2 -1 | 3 -1 | 4 2 |
| -2 1 | 2 -3 | 1 -3 | 2 -2 |
| -2 3 | -6 7 | 3 7 | 6 10 |
| -2 3 | -6 5 | 1 5 | 4 6 |
| -2 3 | -6 3 | -1 3 | 2 2 |
| -2 3 | -6 1 | -3 1 | 0 -2 |
| -2 3 | -6 -1 | -5 -1 | -2 -6 |
| -2 3 | -6 -3 | -7 -3 | -4 -10 |
| -2 3 | -4 7 | 5 7 | 8 12 |
| -2 3 | -4 5 | 3 5 | 6 8 |
| -2 3 | -4 3 | 1 3 | 4 4 |
| -2 3 | -4 1 | -1 1 | 2 0 |
| -2 3 | -4 -1 | -3 -1 | 0 -4 |
| -2 3 | -4 -3 | -5 -3 | -2 -6 |
| -2 3 | -4 -5 | -7 -5 | -4 -12 |
| -2 3 | -2 7 | 7 7 | 10 14 |
| -2 3 | -2 5 | 5 5 | 8 10 |
| -2 3 | -2 3 | 3 3 | 6 6 |
| -2 3 | -2 1 | 1 1 | 4 2 |
| -2 3 | -2 -1 | -1 -1 | 2 -2 |
| -2 3 | -2 -3 | -3 -3 | 0 -6 |
| -2 3 | -2 -5 | -5 -5 | -2 -10 |
| -2 3 | -2 -7 | -7 -7 | -4 -14 |
| -2 3 | 0 5 | 7 5 | 10 12 |
| -2 3 | 0 3 | 5 3 | 8 8 |
| -2 3 | 0 1 | 3 1 | 6 4 |
| -2 3 | 0 -1 | 1 -1 | 4 0 |
| -2 3 | 0 -3 | -1 -3 | 2 -4 |
| -2 3 | 0 -5 | -3 -5 | 0 -8 |
| -2 3 | 0 -7 | -5 -7 | -2 -12 |
| -2 3 | 2 3 | 7 3 | 10 10 |
| -2 3 | 2 1 | 5 1 | 8 6 |
| -2 3 | 2 -1 | 3 -1 | 6 2 |
| -2 3 | 2 -3 | 1 -3 | 4 -2 |
| -2 5 | -6 7 | 3 7 | 8 10 |
| -2 5 | -6 5 | 1 5 | 6 6 |
| -2 5 | -6 3 | -1 3 | 4 2 |
| -2 5 | -6 1 | -3 1 | 2 -2 |
| -2 5 | -6 -1 | -5 -1 | 0 -6 |
| -2 5 | -6 -3 | -7 -3 | -2 -10 |
| -2 5 | -4 7 | 5 7 | 10 12 |
| -2 5 | -4 5 | 3 5 | 8 8 |
| -2 5 | -4 3 | 1 3 | 6 4 |
| -2 5 | -4 1 | -1 1 | 4 0 |
| -2 5 | -4 -1 | -3 -1 | 2 -4 |
| -2 5 | -4 -3 | -5 -3 | 0 -8 |
| -2 5 | -4 -5 | -7 -5 | -2 -12 |
| -2 5 | -2 7 | 7 7 | 12 14 |
| -2 5 | -2 5 | 5 5 | 10 10 |
| -2 5 | -2 3 | 3 3 | 8 6 |
| -2 5 | -2 1 | 1 1 | 6 2 |
| -2 5 | -2 -1 | -1 -1 | 4 -2 |
| -2 5 | -2 -3 | -3 -3 | 2 -6 |
| -2 5 | -2 -5 | -5 -5 | 0 -10 |
| -2 5 | -2 -7 | -7 -7 | -2 -14 |
| -2 5 | 0 5 | 7 5 | 12 12 |
| -2 5 | 0 3 | 5 3 | 10 8 |
| -2 5 | 0 1 | 3 1 | 8 4 |
| -2 5 | 0 -1 | 1 -1 | 6 0 |
| -2 5 | 0 -3 | -1 -3 | 4 -4 |
| -2 5 | 0 -5 | -3 -5 | 2 -8 |
| -2 5 | 0 -7 | -5 -7 | 0 -12 |
| -2 5 | 2 3 | 7 3 | 12 10 |
| -2 5 | 2 1 | 5 1 | 10 6 |
| -2 5 | 2 -1 | 3 -1 | 8 2 |
| -2 5 | 2 -3 | 1 -3 | 6 -2 |
| -2 7 | -6 7 | 3 7 | 10 10 |
| -2 7 | -6 5 | 1 5 | 8 6 |
| -2 7 | -6 3 | -1 3 | 6 2 |
| -2 7 | -6 1 | -3 1 | 4 -2 |
| -2 7 | -6 -1 | -5 -1 | 2 -6 |
| -2 7 | -6 -3 | -7 -3 | 0 -10 |
| -2 7 | -4 7 | 5 7 | 12 12 |
| -2 7 | -4 5 | 3 5 | 10 8 |
| -2 7 | -4 3 | 1 3 | 8 4 |
| -2 7 | -4 1 | -1 1 | 6 0 |
| -2 7 | -4 -1 | -3 -1 | 4 -4 |
| -2 7 | -4 -3 | -5 -3 | 2 -8 |
| -2 7 | -4 -5 | -7 -5 | 0 -12 |
| -2 7 | -2 7 | 7 7 | 14 14 |
| -2 7 | -2 5 | 5 5 | 12 10 |
| -2 7 | -2 3 | 3 3 | 10 6 |
| -2 7 | -2 1 | 1 1 | 8 2 |
| -2 7 | -2 -1 | -1 -1 | 6 -2 |
| -2 7 | -2 -3 | -3 -3 | 4 -6 |
| -27 | -2 -5 | -5 -5 | 2 -10 |
| -2 7 | -2 -7 | -7 -7 | 0 -14 |
| -2 7 | 0 5 | 7 5 | 14 12 |
| -2 7 | 0 3 | 5 3 | 12 8 |
| -2 7 | 0 1 | 3 1 | 10 4 |
| -2 7 | 0 -1 | 1 -1 | 8 0 |
| -2 7 | 0 -3 | -1 -3 | 6 -4 |

TABLE 2-continued

Example joint MSN/Channel Decoder

| Begin state | end state | channel input | channel output |
|---|---|---|---|
| -2 7 | 0 -5 | -3 -5 | 4 -8 |
| -2 7 | 0 -7 | -5 -7 | 2 -12 |
| -2 7 | 2 3 | 7 3 | 14 10 |
| -2 7 | 2 1 | 5 1 | 12 6 |
| -2 7 | 2 -1 | 3 -1 | 10 2 |
| -2 7 | 2 -3 | 1 -3 | 8 -2 |
| 0 -7 | -6 7 | 1 7 | -6 8 |
| 0 -7 | -6 5 | -1 5 | -8 4 |
| 0 -7 | -6 3 | -3 3 | -10 0 |
| 0 -7 | -6 1 | -5 1 | -12 -4 |
| 0 -7 | -6 -1 | -7 -1 | -14 -8 |
| 0 -7 | -4 7 | 3 7 | -4 10 |
| 0 -7 | -4 5 | 1 5 | -6 6 |
| 0 -7 | -4 3 | -1 3 | -8 2 |
| 0 -7 | -4 1 | -3 1 | -10 -2 |
| 0 -7 | -4 -1 | -5 -1 | -12 -6 |
| 0 -7 | -4 -3 | -7 -3 | -14 -10 |
| 0 -7 | -2 7 | 5 7 | -2 12 |
| 0 -7 | -2 5 | 3 5 | -4 8 |
| 0 -7 | -2 3 | 1 3 | -6 4 |
| 0 -7 | -2 1 | -1 1 | -8 0 |
| 0 -7 | -2 -1 | -3 -1 | -10 4 |
| 0 -7 | -2 -3 | -5 -3 | -12 -8 |
| 0 -7 | -2 -5 | -7 -5 | -14 -12 |
| 0 -7 | 0 7 | 7 7 | 0 14 |
| 0 -7 | 0 5 | 5 5 | -2 10 |
| 0 -7 | 0 3 | 3 3 | -4 6 |
| 0 -7 | 0 1 | 1 1 | -6 2 |
| 0 -7 | 0 -1 | -1 -1 | -8 -2 |
| 0 -7 | 0 -3 | -3 -3 | -10 -6 |
| 0 -7 | 0 -5 | -5 -5 | -12 -10 |
| 0 -7 | 0 -7 | -7 -7 | -14 -14 |
| 0 -7 | 2 5 | 7 5 | 0 12 |
| 0 -7 | 2 3 | 5 3 | -2 8 |
| 0 -7 | 2 1 | 3 1 | -4 4 |
| 0 -7 | 2 -1 | 1 -1 | -6 0 |
| 0 -7 | 2 -3 | -1 -3 | -8 4 |
| 0 -7 | 2 -5 | -3 -5 | -10 -8 |
| 0 -5 | -6 7 | 1 7 | -4 8 |
| 0 -5 | -6 5 | -1 5 | -6 4 |
| 0 -5 | -6 3 | -3 3 | -8 0 |
| 0 -5 | -6 1 | -5 1 | -10 -4 |
| 0 -5 | -6 -1 | -7 -1 | -12 -8 |
| 0 -5 | -4 7 | 3 7 | -2 10 |
| 0 -5 | -4 5 | 1 5 | -4 6 |
| 0 -5 | -4 3 | -1 3 | -6 2 |
| 0 -5 | -4 1 | -3 1 | -8 -2 |
| 0 -5 | -4 -1 | -5 -1 | -10 -6 |
| 0 -5 | -4 -3 | -7 -3 | -12 -10 |
| 0 -5 | -2 7 | 5 7 | 0 12 |
| 0 -5 | -2 5 | 3 5 | -2 8 |
| 0 -5 | -2 3 | 1 3 | -4 4 |
| 0 -5 | -2 1 | -1 1 | -6 0 |
| 0 -5 | -2 -1 | -3 -1 | -8 -4 |
| 0 -5 | -2 -3 | -5 -3 | -10 -8 |
| 0 -5 | -2 -5 | -7 -5 | -12 -12 |
| 0 -5 | 0 7 | 7 7 | 2 14 |
| 0 -5 | 0 5 | 5 5 | 0 10 |
| 0 -5 | 0 3 | 3 3 | -2 6 |
| 0 -5 | 0 1 | 1 1 | -4 2 |
| 0 -5 | 0 -1 | -1 -1 | -6 -2 |
| 0 -5 | 0 -3 | -3 -3 | -8 -6 |
| 0 -5 | 0 -5 | -5 -5 | -10 -10 |
| 0 -5 | 0 -7 | -7 -7 | -12 -14 |
| 0 -5 | 2 5 | 7 5 | 2 12 |
| 0 -5 | 2 3 | 5 3 | 0 8 |
| 0 -5 | 2 1 | 3 1 | -2 4 |
| 0 -5 | 2 -1 | 1 -1 | -4 0 |
| 0 -5 | 2 -3 | -1 -3 | -6 -4 |
| 0 -5 | 2 -5 | -3 -5 | -8 -8 |
| 0 -3 | -6 7 | 1 7 | -2 8 |
| 0 -3 | -6 5 | -1 5 | -4 4 |
| 0 -3 | -6 3 | -3 3 | -6 0 |
| 0 -3 | -6 1 | -5 1 | -8 -4 |
| 0 -3 | -6 -1 | -7 -1 | -10 -8 |
| 0 -3 | -4 7 | 3 7 | 0 10 |
| 0 -3 | -4 5 | 1 5 | -2 6 |
| 0 -3 | -4 3 | -1 3 | -4 2 |
| 0 -3 | -4 1 | -3 1 | -6 -2 |
| 0 -3 | -4 -1 | -5 -1 | -8 -6 |
| 0 -3 | -4 -3 | -7 -3 | -10 -10 |
| 0 -3 | -2 7 | 5 7 | 2 12 |
| 0 -3 | -2 5 | 3 5 | 0 8 |
| 0 -3 | -2 3 | 1 3 | -2 4 |
| 0 -3 | -2 1 | -1 1 | -4 0 |
| 0 -3 | -2 -1 | -3 -1 | -6 -4 |
| 0 -3 | -2 -3 | -5 -3 | -8 -8 |
| 0 -3 | -2 -5 | -7 -5 | -10 -12 |
| 0 -3 | 0 7 | 7 7 | 4 14 |
| 0 -3 | 0 5 | 5 5 | 2 10 |
| 0 -3 | 0 3 | 3 3 | 0 6 |
| 0 -3 | 0 1 | 1 1 | -2 2 |
| 0 -3 | 0 -1 | -1 -1 | -4 -2 |
| 0 -3 | 0 -3 | -3 -3 | -6 -6 |
| 0 -3 | 0 -5 | -5 -5 | -8 -10 |
| 0 -3 | 0 -7 | -7 -7 | -10 -14 |
| 0 -3 | 2 5 | 7 5 | 4 12 |
| 0 -3 | 2 3 | 5 3 | 2 8 |
| 0 -3 | 2 1 | 3 1 | 0 4 |
| 0 -3 | 2 -1 | 1 -1 | -2 0 |
| 0 -3 | 2 -3 | -1 -3 | -4 -4 |
| 0 -3 | 2 -5 | -3 -5 | -6 -8 |
| 0 -1 | -6 7 | 1 7 | 0 8 |
| 0 -1 | -6 5 | -1 5 | -2 4 |
| 0 -1 | -6 3 | -3 3 | -4 0 |
| 0 -1 | -6 1 | -5 1 | -6 4 |
| 0 -1 | -6 -1 | -7 -1 | -8 -8 |
| 0 -1 | -4 7 | 3 7 | 2 10 |
| 0 -1 | -4 5 | 1 5 | 0 6 |
| 0 -1 | -4 3 | -1 3 | -2 2 |
| 0 -1 | -4 1 | -3 1 | -4 -2 |
| 0 -1 | -4 -1 | -5 -1 | -6 -6 |
| 0 -1 | -4 -3 | -7 -3 | -8 -10 |
| 0 -1 | -2 7 | 5 7 | 4 12 |
| 0 -1 | -2 5 | 3 5 | 2 8 |
| 0 -1 | -2 3 | 1 3 | 0 4 |
| 0 -1 | -2 1 | -1 1 | -2 0 |
| 0 -1 | -2 -1 | -3 -1 | -4 4 |
| 0 -1 | -2 -3 | -5 -3 | -6 -8 |
| 0 -1 | -2 -5 | -7 -5 | -8 -12 |
| 0 -1 | 0 7 | 7 7 | 6 14 |
| 0 -1 | 0 5 | 5 5 | 4 10 |
| 0 -1 | 0 3 | 3 3 | 2 6 |
| 0 -1 | 0 1 | 1 1 | 0 2 |
| 0 -1 | 0 -1 | -1 -1 | -2 -2 |
| 0 -1 | 0 -3 | -3 -3 | 4 -6 |
| 0 -1 | 0 -5 | -5 -5 | -6 -10 |
| 0 -1 | 0 -7 | -7 -7 | -8 -14 |
| 0 -1 | 2 5 | 7 5 | 6 12 |
| 0 -1 | 2 3 | 5 3 | 4 8 |
| 0 -1 | 2 1 | 3 1 | 2 4 |
| 0 -1 | 2 -1 | 1 -1 | 0 0 |
| 0 -1 | 2 -3 | -1 -3 | -2 -4 |
| 0 -1 | 2 -5 | -3 -5 | -4 -8 |
| 0 1 | -6 7 | 1 7 | 2 8 |
| 0 1 | -6 5 | -1 5 | 0 4 |
| 0 1 | -6 3 | -3 3 | -2 0 |
| 0 1 | -6 1 | -5 1 | -4 -4 |
| 0 1 | -6 -1 | -7 -1 | -6 -8 |
| 0 1 | -4 7 | 3 7 | 4 10 |
| 0 1 | -4 5 | 1 5 | 2 6 |
| 0 1 | -4 3 | -1 3 | 0 2 |
| 0 1 | -4 1 | -3 1 | -2 -2 |
| 0 1 | -4 -1 | -5 -1 | -4 -6 |
| 0 1 | -4 -3 | -7 -3 | -6 -10 |
| 0 1 | -2 7 | 5 7 | 6 12 |
| 0 1 | -2 5 | 3 5 | 4 8 |
| 0 1 | -2 3 | 1 3 | 2 4 |

TABLE 2-continued

Example joint MSN/Channel Decoder

| Begin state | end state | channel input | channel output |
|---|---|---|---|
| 0 1 | −2 1 | −1 1 | 0 0 |
| 0 1 | −2 −1 | −3 −1 | −2 −4 |
| 0 1 | −2 −3 | −5 −3 | −4 −8 |
| 0 1 | −2 −5 | −7 −5 | −6 −12 |
| 0 1 | 0 7 | 7 7 | 8 14 |
| 0 1 | 0 5 | 5 5 | 6 10 |
| 0 1 | 0 3 | 3 3 | 4 6 |
| 0 1 | 0 1 | 1 1 | 2 2 |
| 0 1 | 0 −1 | −1 −1 | 0 −2 |
| 0 1 | 0 −3 | −3 −3 | −2 −6 |
| 0 1 | 0 −5 | −5 −5 | −4 −10 |
| 0 1 | 0 −7 | −7 −7 | −6 −14 |
| 0 1 | 2 5 | 7 5 | 8 12 |
| 0 1 | 2 3 | 5 3 | 6 8 |
| 0 1 | 2 1 | 3 1 | 4 4 |
| 0 1 | 2 −1 | 1 −1 | 2 0 |
| 0 1 | 2 −3 | −1 −3 | 0 −4 |
| 0 1 | 2 −5 | −3 −5 | −2 −8 |
| 0 3 | −6 7 | 1 7 | 4 8 |
| 0 3 | −6 5 | −1 5 | 2 4 |
| 0 3 | −6 3 | −3 3 | 0 0 |
| 0 3 | −6 1 | −5 1 | −2 −4 |
| 0 3 | −6 −1 | −7 −1 | −4 −8 |
| 0 3 | −4 7 | 3 7 | 6 10 |
| 0 3 | −4 5 | 1 5 | 4 6 |
| 0 3 | −4 3 | −1 3 | 2 2 |
| 0 3 | −4 1 | −3 1 | 0 −2 |
| 0 3 | −4 −1 | −5 −1 | −2 −6 |
| 0 3 | −4 −3 | 7 −3 | −4 −10 |
| 0 3 | −2 7 | 5 7 | 8 12 |
| 0 3 | −2 5 | 3 5 | 6 8 |
| 0 3 | −2 3 | 1 3 | 4 4 |
| 0 3 | −2 1 | −1 1 | 2 0 |
| 0 3 | −2 −1 | −3 −1 | 0 −4 |
| 0 3 | −2 −3 | 5 −3 | −2 −8 |
| 0 3 | −2 −5 | −7 −5 | −4 −12 |
| 0 3 | 0 7 | 7 7 | 10 14 |
| 0 3 | 0 5 | 5 5 | 8 10 |
| 0 3 | 0 3 | 3 3 | 6 6 |
| 0 3 | 0 1 | 1 1 | 4 2 |
| 0 3 | 0 −1 | −1 −1 | 2 −2 |
| 0 3 | 0 −3 | −3 −3 | 0 −6 |
| 0 3 | 0 −5 | −5 −5 | −2 −10 |
| 0 3 | 0 −7 | −7 −7 | −4 −14 |
| 0 3 | 2 5 | 7 5 | 10 12 |
| 0 3 | 2 3 | 5 3 | 8 8 |
| 0 3 | 2 1 | 3 1 | 6 4 |
| 0 3 | 2 −1 | 1 −1 | 4 0 |
| 0 3 | 2 −3 | −1 −3 | 2 −4 |
| 0 3 | 2 −5 | −3 −5 | 0 −8 |
| 0 5 | −6 7 | 1 7 | 6 8 |
| 0 5 | −6 5 | −1 5 | 4 4 |
| 0 5 | −6 3 | −3 3 | 2 0 |
| 0 5 | −6 1 | −5 1 | 0 −4 |
| 0 5 | −6 −1 | −7 −1 | −2 −8 |
| 0 5 | −4 7 | 3 7 | 8 10 |
| 0 5 | −4 5 | 1 5 | 6 6 |
| 0 5 | −4 3 | −1 3 | 4 2 |
| 0 5 | −4 1 | −3 1 | 2 −2 |
| 0 5 | −4 −1 | −5 −1 | 0 −6 |
| 0 5 | −4 −3 | −7 −3 | −2 −10 |
| 0 5 | −2 7 | 5 7 | 10 12 |
| 0 5 | −2 5 | 3 5 | 8 8 |
| 0 5 | −2 3 | 1 3 | 6 4 |
| 0 5 | −2 1 | −1 1 | 4 0 |
| 0 5 | −2 −1 | −3 −1 | 2 −4 |
| 0 5 | −2 −3 | −5 −3 | 0 −8 |
| 0 5 | −2 −5 | −7 −5 | −2 −12 |
| 0 5 | 0 7 | 7 7 | 12 14 |
| 0 5 | 0 5 | 5 5 | 10 10 |
| 0 5 | 0 3 | 3 3 | 8 6 |
| 0 5 | 0 1 | 1 1 | 6 2 |
| 0 5 | 0 −1 | −1 −1 | 4 −2 |
| 0 5 | 0 −3 | −3 −3 | 2 −6 |
| 0 5 | 0 −5 | −5 −5 | 0 −10 |
| 0 5 | 0 −7 | −7 −7 | −2 −14 |
| 0 5 | 2 5 | 7 5 | 12 12 |
| 0 5 | 2 3 | 5 3 | 10 8 |
| 0 5 | 2 1 | 3 1 | 8 4 |
| 0 5 | 2 −1 | 1 −1 | 6 0 |
| 0 5 | 2 −3 | −1 −3 | 4 −4 |
| 0 5 | 2 −5 | −3 −5 | 2 −8 |
| 0 7 | −6 7 | 1 7 | 8 8 |
| 0 7 | −6 5 | −1 5 | 6 4 |
| 0 7 | −6 3 | −3 3 | 4 0 |
| 0 7 | −6 1 | −5 1 | 2 −4 |
| 0 7 | −6 −1 | −7 −1 | 0 −8 |
| 0 7 | −4 7 | 3 7 | 10 10 |
| 0 7 | −4 5 | 1 5 | 8 6 |
| 0 7 | −4 3 | −1 3 | 6 2 |
| 0 7 | −4 1 | −3 1 | 4 −2 |
| 0 7 | −4 −1 | −5 −1 | 2 −6 |
| 0 7 | −4 −3 | −7 −3 | 0 −10 |
| 0 7 | −2 7 | 5 7 | 12 12 |
| 0 7 | −2 5 | 3 5 | 10 8 |
| 0 7 | −2 3 | 1 3 | 8 4 |
| 0 7 | −2 1 | −1 1 | 6 0 |
| 0 7 | −2 −1 | −3 −1 | 4 −4 |
| 0 7 | −2 −3 | −5 −3 | 2 −8 |
| 0 7 | −2 −5 | −7 −5 | 0 −12 |
| 0 7 | 0 7 | 7 7 | 14 14 |
| 0 7 | 0 5 | 5 5 | 12 10 |
| 0 7 | 0 3 | 3 3 | 10 6 |
| 0 7 | 0 1 | 1 1 | 8 2 |
| 0 7 | 0 −1 | −1 −1 | 6 −2 |
| 0 7 | 0 −3 | −3 −3 | 4 −6 |
| 0 7 | 0 −5 | −5 −5 | 2 −10 |
| 0 7 | 0 −7 | −7 −7 | 0 −14 |
| 0 7 | 2 5 | 7 5 | 14 12 |
| 0 7 | 2 3 | 5 3 | 12 8 |
| 0 7 | 2 1 | 3 1 | 10 4 |
| 0 7 | 2 −1 | 1 −1 | 8 0 |
| 0 7 | 2 −3 | −1 −3 | 6 −4 |
| 0 7 | 2 −5 | −3 −5 | 4 −8 |
| 2 −7 | −6 7 | −1 7 | −8 6 |
| 2 −7 | −6 5 | −3 5 | −10 2 |
| 2 −7 | −6 3 | −5 3 | −12 −2 |
| 2 −7 | −6 1 | −7 1 | −14 −6 |
| 2 −7 | −4 7 | 1 7 | −6 8 |
| 2 −7 | −4 5 | −1 5 | −8 4 |
| 2 −7 | −4 3 | −3 3 | −10 0 |
| 2 −7 | −4 1 | −5 1 | −12 −4 |
| 2 −7 | −4 −1 | −7 −1 | −14 −8 |
| 2 −7 | −2 7 | 3 7 | −4 10 |
| 2 −7 | −2 5 | 1 5 | −6 6 |
| 2 −7 | −2 3 | −1 3 | −8 2 |
| 2 −7 | −2 1 | −3 1 | −10 −2 |
| 2 −7 | −2 −1 | −5 −1 | −12 −6 |
| 2 −7 | −2 −3 | −7 −3 | −14 −10 |
| 2 −7 | 0 7 | 5 7 | −2 12 |
| 2 −7 | 0 5 | 3 5 | −4 8 |
| 2 −7 | 0 3 | 1 3 | −6 4 |
| 2 −7 | 0 1 | −1 1 | −8 0 |
| 2 −7 | 0 −1 | −3 −1 | −10 −4 |
| 2 −7 | 0 −3 | −5 −3 | −12 −8 |
| 2 −7 | 0 −5 | −7 −5 | −14 −12 |
| 2 −7 | 2 7 | 7 7 | 0 14 |
| 2 −7 | 2 5 | 5 5 | −2 10 |
| 2 −7 | 2 3 | 3 3 | −4 6 |
| 2 −7 | 2 1 | 1 1 | −6 2 |
| 2 −7 | 2 −1 | −1 −1 | −8 −2 |
| 2 −7 | 2 −3 | −3 −3 | −10 −6 |
| 2 −7 | 2 −5 | −5 −5 | −12 −10 |
| 2 −7 | 2 −7 | −7 −7 | −14 −14 |
| 2 −7 | 4 5 | 7 5 | 0 12 |
| 2 −7 | 4 3 | 5 3 | −2 8 |
| 2 −5 | −6 7 | −1 7 | −6 6 |
| 2 −5 | −6 5 | −3 5 | −8 2 |

TABLE 2-continued

Example joint MSN/Channel Decoder

| Begin state | end state | channel input | channel output |
|---|---|---|---|
| 2 −5 | −6 3 | −5 3 | −10 −2 |
| 2 −5 | −6 1 | −7 1 | −12 −6 |
| 2 −5 | −4 7 | 1 7 | −4 8 |
| 2 −5 | −4 5 | −1 5 | −6 4 |
| 2 −5 | −4 3 | −3 3 | −8 0 |
| 2 −5 | −4 1 | −5 1 | −10 −4 |
| 2 −5 | −4 −1 | −7 −1 | −12 −8 |
| 2 −5 | −2 7 | 3 7 | −2 10 |
| 2 −5 | −2 5 | 1 5 | −4 6 |
| 2 −5 | −2 3 | −1 3 | −6 2 |
| 2 −5 | −2 1 | −3 1 | −8 −2 |
| 2 −5 | −2 −1 | −5 −1 | −10 −6 |
| 2 −5 | −2 −3 | −7 −3 | −12 −10 |
| 2 −5 | 0 7 | 5 7 | 0 12 |
| 2 −5 | 0 5 | 3 5 | −2 8 |
| 2 −5 | 0 3 | 1 3 | −4 4 |
| 2 −5 | 0 1 | −1 1 | −6 0 |
| 2 −5 | 0 −1 | −3 −1 | −8 −4 |
| 2 −5 | 0 −3 | −5 −3 | −10 −8 |
| 2 −5 | 0 −5 | −7 −5 | −12 −12 |
| 2 −5 | 2 7 | 7 7 | 2 14 |
| 2 −5 | 2 5 | 5 5 | 0 10 |
| 2 −5 | 2 3 | 3 3 | −2 6 |
| 2 −5 | 2 1 | 1 1 | −4 2 |
| 2 −5 | 2 −1 | −1 −1 | −6 −2 |
| 2 −5 | 2 −3 | −3 −3 | −8 −6 |
| 2 −5 | 2 −5 | −5 −5 | −10 −10 |
| 2 −5 | 2 −7 | −7 −7 | −12 −14 |
| 2 −5 | 4 5 | 7 5 | 2 12 |
| 2 −5 | 4 3 | 5 3 | 0 8 |
| 2 −3 | −6 7 | −1 7 | −4 6 |
| 2 −3 | −6 5 | −3 5 | −6 2 |
| 2 −3 | −6 3 | −5 3 | −8 −2 |
| 2 −3 | −6 1 | −7 1 | −10 −6 |
| 2 −3 | −47 | 1 7 | −2 8 |
| 2 −3 | −4 5 | −1 5 | −4 4 |
| 2 −3 | −4 3 | −3 3 | −6 0 |
| 2 −3 | −4 1 | −5 1 | −8 −4 |
| 2 −3 | −4 −1 | −7 −1 | −10 −8 |
| 2 −3 | −2 7 | 3 7 | 0 10 |
| 2 −3 | −2 5 | 1 5 | −2 6 |
| 2 −3 | −2 3 | −1 3 | −4 2 |
| 2 −3 | −2 1 | −3 1 | −6 −2 |
| 2 −3 | −2 −1 | −5 −1 | −8 −6 |
| 2 −3 | −2 −3 | −7 −3 | −10 −10 |
| 2 −3 | 0 7 | 5 7 | 2 12 |
| 2 −3 | 0 5 | 3 5 | 0 8 |
| 2 −3 | 0 3 | 1 3 | −2 4 |
| 2 −3 | 0 1 | −1 1 | −4 0 |
| 2 −3 | 0 −1 | −3 −1 | −6 −4 |
| 2 −3 | 0 −3 | −5 −3 | −8 −8 |
| 2 −3 | 0 −5 | −7 −5 | −10 −12 |
| 2 −3 | 2 7 | 7 7 | 4 14 |
| 2 −3 | 2 5 | 5 5 | 2 10 |
| 2 −3 | 2 3 | 3 3 | 0 6 |
| 2 −3 | 2 1 | 1 1 | −2 2 |
| 2 −3 | 2 −1 | −1 −1 | −4 −2 |
| 2 −3 | 2 −3 | −3 −3 | −6 −6 |
| 2 −3 | 2 −5 | −5 −5 | −8 −10 |
| 2 −3 | 2 −7 | −7 −7 | −10 −14 |
| 2 −3 | 4 5 | 7 5 | 4 12 |
| 2 −3 | 4 3 | 5 3 | 2 8 |
| 2 −1 | −6 7 | −1 7 | −2 6 |
| 2 −1 | −6 5 | −3 5 | −4 2 |
| 2 −1 | −6 3 | −5 3 | −6 −2 |
| 2 −1 | −6 1 | −7 1 | −8 −6 |
| 2 −1 | −4 7 | 1 7 | 0 8 |
| 2 −1 | −4 5 | −1 5 | −2 4 |
| 2 −1 | −4 3 | −3 3 | −4 0 |
| 2 −1 | −4 1 | −5 1 | −6 −4 |
| 2 −1 | −4 −1 | −7 −1 | −8 −8 |
| 2 −1 | −2 7 | 3 7 | 2 10 |
| 2 −1 | −2 5 | 1 5 | 0 6 |
| 2 −1 | −2 3 | −1 3 | −2 2 |
| 2 −1 | −2 1 | −3 1 | −4 −2 |
| 2 −1 | −2 −1 | −5 −1 | −6 −6 |
| 2 −1 | −2 −3 | −7 −3 | −8 −10 |
| 2 −1 | 0 7 | 5 7 | 4 12 |
| 2 −1 | 0 5 | 3 5 | 2 8 |
| 2 −1 | 0 3 | 1 3 | 0 4 |
| 2 −1 | 0 1 | −1 1 | −2 0 |
| 2 −1 | 0 −1 | −3 −1 | −4 −4 |
| 2 −1 | 0 −3 | −5 −3 | −6 −8 |
| 2 −1 | 0 −5 | −7 −5 | −8 −12 |
| 2 −1 | 2 7 | 7 7 | 6 14 |
| 2 −1 | 2 5 | 5 5 | 4 10 |
| 2 −1 | 2 3 | 3 3 | 2 6 |
| 2 −1 | 2 1 | 1 1 | 0 2 |
| 2 −1 | 2 −1 | −1 −1 | −2 2 |
| 2 −1 | 2 −3 | −3 −3 | −4 −6 |
| 2 −1 | 2 −5 | −5 −5 | −6 −10 |
| 2 −1 | 2 −7 | −7 −7 | −8 −14 |
| 2 −1 | 4 5 | 7 5 | 6 12 |
| 2 −1 | 4 3 | 5 3 | 4 8 |
| 2 1 | −6 7 | 1 7 | 0 6 |
| 2 1 | −6 5 | −3 5 | −2 2 |
| 2 1 | −6 3 | −5 3 | −4 −2 |
| 2 1 | −6 1 | −7 1 | −6 −6 |
| 2 1 | −4 7 | 1 7 | 2 8 |
| 2 1 | −4 5 | −1 5 | 0 4 |
| 2 1 | −4 3 | −3 3 | −2 0 |
| 2 1 | −4 1 | −5 1 | −4 −4 |
| 2 1 | −4 −1 | −7 −1 | −6 −8 |
| 2 1 | −2 7 | 3 7 | 4 10 |
| 2 1 | −2 5 | 1 5 | 2 6 |
| 2 1 | −2 3 | −1 3 | 0 2 |
| 2 1 | −2 1 | −3 1 | −2 −2 |
| 2 1 | −2 −1 | −5 −1 | −4 −6 |
| 2 1 | −2 −3 | −7 −3 | −6 −10 |
| 2 1 | 0 7 | 5 7 | 6 12 |
| 2 1 | 0 5 | 3 5 | 4 8 |
| 2 1 | 0 3 | 1 3 | 2 4 |
| 2 1 | 0 1 | −1 1 | 0 0 |
| 2 1 | 0 −1 | −3 −1 | −2 −4 |
| 2 1 | 0 −3 | −5 −3 | −4 −8 |
| 2 1 | 0 −5 | −7 −5 | −6 −12 |
| 2 1 | 2 7 | 7 7 | 8 14 |
| 2 1 | 2 5 | 5 5 | 6 10 |
| 2 1 | 2 3 | 3 3 | 4 6 |
| 2 1 | 2 1 | 1 1 | 2 2 |
| 2 1 | 2 −1 | −1 −1 | 0 −2 |
| 2 1 | 2 −3 | −3 −3 | −2 −6 |
| 2 1 | 2 −5 | −5 −5 | −4 −10 |
| 2 1 | 2 −7 | −7 −7 | −6 −14 |
| 2 1 | 4 5 | 7 5 | 8 12 |
| 2 1 | 4 3 | 5 3 | 6 8 |
| 2 3 | −6 7 | −1 7 | 2 6 |
| 2 3 | −6 5 | −3 5 | 0 2 |
| 2 3 | −6 3 | −5 3 | −2 −2 |
| 2 3 | −6 1 | −7 1 | −4 −6 |
| 2 3 | −4 7 | 1 7 | 4 8 |
| 2 3 | −4 5 | −1 5 | 2 4 |
| 2 3 | −4 3 | −3 3 | 0 0 |
| 2 3 | −4 1 | −5 1 | −2 −4 |
| 2 3 | −4 −1 | −7 −1 | −4 −8 |
| 2 3 | −2 7 | 3 7 | 6 10 |
| 2 3 | −2 5 | 1 5 | 4 6 |
| 2 3 | −2 3 | −1 3 | 2 2 |
| 2 3 | −2 1 | −3 1 | 0 −2 |
| 2 3 | −2 −1 | −5 −1 | −2 −6 |
| 2 3 | −2 −3 | −7 3 | −4 −10 |
| 2 3 | 0 7 | 5 7 | 8 12 |
| 2 3 | 0 5 | 3 5 | 6 8 |
| 2 3 | 0 3 | 1 3 | 4 4 |
| 2 3 | 0 1 | −1 1 | 2 0 |
| 2 3 | 0 −1 | −3 −1 | 0 −4 |
| 2 3 | 0 −3 | −5 −3 | −2 −8 |
| 2 3 | 0 −5 | −7 −5 | −4 −12 |

TABLE 2-continued

Example joint MSN/Channel Decoder

| Begin state | end state | channel input | channel output |
|---|---|---|---|
| 2 3 | 2 7 | 7 7 | 10 14 |
| 2 3 | 2 5 | 5 5 | 8 10 |
| 2 3 | 2 3 | 3 3 | 6 6 |
| 2 3 | 2 1 | 1 1 | 4 2 |
| 2 3 | 2 -1 | -1 -1 | 2 -2 |
| 2 3 | 2 -3 | -3 -3 | 0 -6 |
| 2 3 | 2 -5 | -5 -5 | -2 -10 |
| 2 3 | 2 -7 | -7 -7 | -4 -14 |
| 2 3 | 4 5 | 7 5 | 10 12 |
| 2 3 | 4 3 | 5 3 | 8 8 |
| 2 5 | -6 7 | -1 7 | 4 6 |
| 2 5 | -6 5 | -3 5 | 2 2 |
| 2 5 | -6 3 | -5 3 | 0 -2 |
| 2 5 | -6 1 | -7 1 | -2 -6 |
| 2 5 | -4 7 | 1 7 | 6 8 |
| 2 5 | -4 5 | -1 5 | 4 4 |
| 2 5 | -4 3 | -3 3 | 2 0 |
| 2 5 | -4 1 | -5 1 | 0 -4 |
| 2 5 | -4 -1 | -7 -1 | -2 -8 |
| 2 5 | -2 7 | 3 7 | 8 10 |
| 2 5 | -2 5 | 1 5 | 6 6 |
| 2 5 | -2 3 | -1 3 | 4 2 |
| 2 5 | -2 1 | -3 1 | 2 -2 |
| 2 5 | -2 -1 | -5 -1 | 0 -6 |
| 2 5 | -2 -3 | -7 -3 | -2 -10 |
| 2 5 | 0 7 | 5 7 | 10 12 |
| 2 5 | 0 5 | 3 5 | 8 8 |
| 2 5 | 0 3 | 1 3 | 6 4 |
| 2 5 | 0 1 | -1 1 | 4 0 |
| 2 5 | 0 -1 | -3 -1 | 2 -4 |
| 2 5 | 0 -3 | -5 -3 | 0 -8 |
| 2 5 | 0 -5 | -7 -5 | -2 -12 |
| 2 5 | 2 7 | 7 7 | 12 14 |
| 2 5 | 2 5 | 5 5 | 10 10 |
| 2 5 | 2 3 | 3 3 | 8 6 |
| 2 5 | 2 1 | 1 1 | 6 2 |
| 2 5 | 2 -1 | -1 -1 | 4 -2 |
| 2 5 | 2 -3 | -3 -3 | 2 -6 |
| 2 5 | 2 -5 | -5 -5 | 0 -10 |
| 2 5 | 2 -7 | -7 -7 | -2 -14 |
| 2 5 | 4 5 | 7 5 | 12 12 |
| 2 5 | 4 3 | 5 3 | 10 8 |
| 2 7 | -6 7 | -1 7 | 6 6 |
| 2 7 | -6 5 | -3 5 | 4 2 |
| 2 7 | -6 3 | -5 3 | 2 -2 |
| 2 7 | -6 1 | -7 1 | 0 -6 |
| 2 7 | -4 7 | 1 7 | 8 8 |
| 2 7 | -4 5 | -1 5 | 6 4 |
| 2 7 | -4 3 | -3 3 | 4 0 |
| 2 7 | -4 1 | -5 1 | 2 -4 |
| 2 7 | -4 -1 | -7 -1 | 0 -8 |
| 2 7 | -2 7 | 3 7 | 10 10 |
| 2 7 | -2 5 | 1 5 | 8 6 |
| 2 7 | -2 3 | -1 3 | 6 2 |
| 2 7 | -2 1 | -3 1 | 4 -2 |
| 2 7 | -2 -1 | -5 -1 | 2 -6 |
| 2 7 | -2 -3 | -7 -3 | 0 -10 |
| 2 7 | 0 7 | 5 7 | 12 12 |
| 2 7 | 0 5 | 3 5 | 10 8 |
| 2 7 | 0 3 | 1 3 | 8 4 |
| 2 7 | 0 1 | -1 1 | 6 0 |
| 2 7 | 0 -1 | -3 -1 | 4 -4 |
| 2 7 | 0 -3 | -5 -3 | 2 -8 |
| 2 7 | 0 -5 | -7 -5 | 0 -12 |
| 2 7 | 2 7 | 7 7 | 14 14 |
| 2 7 | 2 5 | 5 5 | 12 10 |
| 2 7 | 2 3 | 3 3 | 10 6 |
| 2 7 | 2 1 | 1 1 | 8 2 |
| 2 7 | 2 -1 | -1 -1 | 6 -2 |
| 2 7 | 2 -3 | -3 -3 | 4 -6 |
| 2 7 | 2 -5 | -5 -5 | 2 -10 |
| 2 7 | 2 -7 | -7 -7 | 0 -14 |
| 2 7 | 4 5 | 7 5 | 14 12 |
| 2 7 | 4 3 | 5 3 | 12 8 |
| 4 -7 | -6 7 | -3 7 | -10 4 |
| 4 -7 | -8 5 | -5 5 | -12 0 |
| 4 -7 | -6 3 | -7 3 | -14 -4 |
| 4 -7 | -4 7 | -1 7 | -8 6 |
| 4 -7 | -4 5 | -3 5 | -10 2 |
| 4 -7 | -4 3 | -5 3 | -12 -2 |
| 4 -7 | -4 1 | -7 1 | -14 -6 |
| 4 -7 | -2 7 | 1 7 | -6 8 |
| 4 -7 | -2 5 | -1 5 | -8 4 |
| 4 -7 | -2 3 | -3 3 | -10 0 |
| 4 -7 | -2 1 | -5 1 | -12 -4 |
| 4 -7 | -2 -1 | -7 -1 | -14 -8 |
| 4 -7 | 0 7 | 3 7 | -4 10 |
| 4 -7 | 0 5 | 1 5 | -6 6 |
| 4 -7 | 0 3 | -1 3 | -8 2 |
| 4 -7 | 0 1 | -3 1 | -10 -2 |
| 4 -7 | 0 -1 | -5 -1 | -12 -6 |
| 4 -7 | 0 -3 | -7 -3 | -14 -10 |
| 4 -7 | 2 7 | 5 7 | -2 12 |
| 4 -7 | 2 5 | 3 5 | -4 8 |
| 4 -7 | 2 3 | 1 3 | -6 4 |
| 4 -7 | 2 1 | -1 1 | -8 0 |
| 4 -7 | 2 -1 | -3 -1 | -10 -4 |
| 4 -7 | 2 -3 | -5 -3 | -12 -8 |
| 4 -7 | 2 -5 | -7 -5 | -14 -12 |
| 4 -7 | 4 5 | 5 5 | -2 10 |
| 4 -7 | 4 3 | 3 3 | -4 6 |
| 4 -7 | 4 1 | 1 1 | -6 2 |
| 4 -7 | 4 -1 | -1 -1 | -8 -2 |
| 4 -7 | 4 -3 | -3 -3 | -10 -6 |
| 4 -7 | 4 -5 | -5 -5 | -12 -10 |
| 4 -7 | 4 -7 | -7 -7 | -14 -14 |
| 4 -5 | -6 7 | -3 7 | -8 4 |
| 4 -5 | -6 5 | -5 5 | -10 0 |
| 4 -5 | -6 3 | -7 3 | -12 -4 |
| 4 -5 | -4 7 | -1 7 | -6 6 |
| 4 -5 | -4 5 | -3 5 | -8 2 |
| 4 -5 | -4 3 | -5 3 | -10 -2 |
| 4 -5 | -41 | -7 1 | -12 -6 |
| 4 -5 | -2 7 | 1 7 | -4 8 |
| 4 -5 | -2 5 | -1 5 | -6 4 |
| 4 -5 | -2 3 | -3 3 | -8 0 |
| 4 -5 | -2 1 | -5 1 | -10 -4 |
| 4 -5 | -2 -1 | -7 -1 | -12 -8 |
| 4 -5 | 0 7 | 3 7 | -2 10 |
| 4 -5 | 0 5 | 1 5 | -4 6 |
| 4 -5 | 0 3 | -1 3 | -6 2 |
| 4 -5 | 0 1 | -3 1 | -8 -2 |
| 4 -5 | 0 -1 | -5 -1 | -10 -6 |
| 4 -5 | 0 -3 | -7 -3 | -12 -10 |
| 4 -5 | 2 7 | 5 7 | 0 12 |
| 4 -5 | 2 5 | 3 5 | -2 8 |
| 4 -5 | 2 3 | 1 3 | -4 4 |
| 4 -5 | 2 1 | -1 1 | -6 0 |
| 4 -5 | 2 -1 | -3 -1 | -8 -4 |
| 4 -5 | 2 -3 | -5 -3 | -10 -8 |
| 4 -5 | 2 -5 | -7 -5 | -12 -12 |
| 4 -5 | 4 5 | 5 5 | 0 10 |
| 4 -5 | 4 3 | 3 3 | -2 6 |
| 4 -5 | 4 1 | 1 1 | -4 2 |
| 4 -5 | 4 -1 | -1 -1 | -6 -2 |
| 4 -5 | 4 -3 | -3 -3 | -8 -6 |
| 4 -5 | 4 -5 | -5 -5 | -10 -10 |
| 4 -5 | 4 -7 | -7 -7 | -12 -14 |
| 4 -3 | -6 7 | -3 7 | -6 4 |
| 4 -3 | -6 5 | -5 5 | -8 0 |
| 4 -3 | -6 3 | -7 3 | -10 -4 |
| 4 -3 | -4 7 | -1 7 | -4 6 |
| 4 -3 | -4 5 | -3 5 | -6 2 |
| 4 -3 | -4 3 | -5 3 | -8 -2 |
| 4 -3 | -4 1 | -7 1 | -10 -6 |
| 4 -3 | -2 7 | 1 7 | -2 8 |
| 4 -3 | -2 5 | -1 5 | -4 4 |
| 4 -3 | -2 3 | -3 3 | -6 0 |

TABLE 2-continued

Example joint MSN/Channel Decoder

| Begin state | end state | channel input | channel output |
|---|---|---|---|
| 4 −3 | −2 1 | −5 1 | −8 −4 |
| 4 −3 | −2 −1 | −7 −1 | −10 −8 |
| 4 −3 | 0 7 | 3 7 | 0 10 |
| 4 −3 | 0 5 | 1 5 | −2 6 |
| 4 −3 | 0 3 | −1 3 | −4 2 |
| 4 −3 | 0 1 | −3 1 | −6 −2 |
| 4 −3 | 0 −1 | −5 −1 | −8 −6 |
| 4 −3 | 0 −3 | −7 −3 | −10 −10 |
| 4 −3 | 2 7 | 5 7 | 2 12 |
| 4 −3 | 2 5 | 3 5 | 0 8 |
| 4 −3 | 2 3 | 1 3 | −2 4 |
| 4 −3 | 2 1 | −1 1 | −4 0 |
| 4 −3 | 2 −1 | −3 −1 | −6 −4 |
| 4 −3 | 2 −3 | −5 −3 | −8 −8 |
| 4 −3 | 2 −5 | −7 −5 | −10 −12 |
| 4 −3 | 4 5 | 5 5 | 2 10 |
| 4 −3 | 4 3 | 3 3 | 0 6 |
| 4 −3 | 4 1 | 1 1 | −2 2 |
| 4 −3 | 4 −1 | −1 −1 | −4 −2 |
| 4 −3 | 4 −3 | −3 −3 | −6 −6 |
| 4 −3 | 4 −5 | −5 −5 | −8 −10 |
| 4 −3 | 4 −7 | −7 −7 | −10 −14 |
| 4 −1 | −6 7 | −3 7 | −4 4 |
| 4 −1 | −6 5 | −5 5 | −6 0 |
| 4 −1 | −6 3 | −7 3 | −8 −4 |
| 4 −1 | −4 7 | −1 7 | −2 6 |
| 4 −1 | −4 5 | −3 5 | −4 2 |
| 4 −1 | −4 3 | −5 3 | −6 −2 |
| 4 −1 | −4 1 | −7 1 | −8 −6 |
| 4 −1 | −2 7 | 1 7 | 0 8 |
| 4 −1 | −2 5 | −1 5 | −2 4 |
| 4 −1 | −2 3 | −3 3 | −4 0 |
| 4 −1 | −2 1 | −5 1 | −6 −4 |
| 4 −1 | −2 −1 | −7 −1 | −8 −8 |
| 4 −1 | 0 7 | 3 7 | 2 10 |
| 4 −1 | 0 5 | 1 5 | 0 6 |
| 4 −1 | 0 3 | −1 3 | −2 2 |
| 4 −1 | 0 1 | −3 1 | −4 −2 |
| 4 −1 | 0 −1 | −5 −1 | −6 −6 |
| 4 −1 | 0 −3 | −7 −3 | −8 −10 |
| 4 −1 | 2 7 | 5 7 | 4 12 |
| 4 −1 | 2 5 | 3 5 | 2 8 |
| 4 −1 | 2 3 | 1 3 | 0 4 |
| 4 −1 | 2 1 | −1 1 | −2 0 |
| 4 −1 | 2 −1 | −3 −1 | −4 −4 |
| 4 −1 | 2 −3 | −5 −3 | −6 −8 |
| 4 −1 | 2 −5 | −7 −5 | −8 −12 |
| 4 −1 | 4 5 | 5 5 | 4 10 |
| 4 −1 | 4 3 | 3 3 | 2 6 |
| 4 −1 | 4 1 | 1 1 | 0 2 |
| 4 −1 | 4 −1 | −1 −1 | −2 −2 |
| 4 −1 | 4 −3 | −3 −3 | −4 −6 |
| 4 −1 | 4 −5 | −5 −5 | −6 −10 |
| 4 −1 | 4 −7 | −7 −7 | −8 −14 |
| 4 1 | −6 7 | −3 7 | −2 4 |
| 4 1 | −6 5 | −5 5 | −4 0 |
| 4 1 | −6 3 | −7 3 | −6 −4 |
| 4 1 | −4 7 | −1 7 | 0 6 |
| 4 1 | −4 5 | −3 5 | −2 2 |
| 4 1 | −4 3 | −5 3 | −4 −2 |
| 4 1 | 4 1 | −7 1 | −6 −6 |
| 4 1 | −2 7 | 1 7 | 2 8 |
| 4 1 | −2 5 | −1 5 | 0 4 |
| 4 1 | −2 3 | −3 3 | −2 0 |
| 4 1 | −2 1 | −5 1 | −4 −4 |
| 4 1 | −2 −1 | −7 −1 | −6 −8 |
| 4 1 | 0 7 | 3 7 | 4 10 |
| 4 1 | 0 5 | 1 5 | 2 6 |
| 4 1 | 0 3 | −1 3 | 0 2 |
| 4 1 | 0 1 | −3 1 | −2 −2 |
| 4 1 | 0 −1 | −5 −1 | −4 −6 |
| 4 1 | 0 −3 | −7 −3 | −6 −10 |
| 4 1 | 2 7 | 5 7 | 6 12 |
| 4 1 | 2 5 | 3 5 | 4 8 |
| 4 1 | 2 3 | 1 3 | 2 4 |
| 4 1 | 2 1 | −1 1 | 0 0 |
| 4 1 | 2 −1 | −3 −1 | −2 −4 |
| 4 1 | 2 −3 | −5 −3 | −4 −8 |
| 4 1 | 2 −5 | −7 −5 | −6 −12 |
| 4 1 | 4 5 | 5 5 | 6 10 |
| 4 1 | 4 3 | 3 3 | 4 6 |
| 4 1 | 4 1 | 1 1 | 2 2 |
| 4 1 | 4 −1 | −1 −1 | 0 −2 |
| 4 1 | 4 −3 | −3 −3 | −2 −6 |
| 4 1 | 4 −5 | −5 −5 | −4 −10 |
| 4 1 | 4 −7 | −7 −7 | −6 −14 |
| 4 3 | −6 7 | −3 7 | 0 4 |
| 4 3 | −6 5 | −5 5 | −2 0 |
| 4 3 | −6 3 | −7 3 | −4 −4 |
| 4 3 | −4 7 | −1 7 | 2 6 |
| 4 3 | −4 5 | −3 5 | 0 2 |
| 4 3 | −4 3 | −5 3 | −2 −2 |
| 4 3 | −4 1 | −7 1 | −4 −6 |
| 4 3 | −2 7 | 1 7 | 4 8 |
| 4 3 | −2 5 | −1 5 | 2 4 |
| 4 3 | −2 3 | −3 3 | 0 0 |
| 4 3 | −2 1 | −5 1 | −2 −4 |
| 4 3 | −2 −1 | −7 −1 | −4 −8 |
| 4 3 | 0 7 | 3 7 | 6 10 |
| 4 3 | 0 5 | 1 5 | 4 6 |
| 4 3 | 0 3 | −1 3 | 2 2 |
| 4 3 | 0 1 | −3 1 | 0 2 |
| 4 3 | 0 −1 | −5 −1 | −2 −6 |
| 4 3 | 0 −3 | −7 −3 | −4 −10 |
| 4 3 | 2 7 | 5 7 | 8 12 |
| 4 3 | 2 5 | 3 5 | 6 8 |
| 4 3 | 2 3 | 1 3 | 4 4 |
| 4 3 | 2 1 | −1 1 | 2 0 |
| 4 3 | 2 −1 | −3 −1 | 0 −4 |
| 4 3 | 2 −3 | −5 −3 | −2 −8 |
| 4 3 | 2 −5 | −7 −5 | −4 −12 |
| 4 3 | 4 5 | 5 5 | 8 10 |
| 4 3 | 4 3 | 3 3 | 6 6 |
| 4 3 | 4 1 | 1 1 | 4 2 |
| 4 3 | 4 −1 | −1 −1 | 2 −2 |
| 4 3 | 4 −3 | −3 −3 | 0 −6 |
| 4 3 | 4 −5 | −5 −5 | −2 −10 |
| 4 3 | 4 −7 | −7 −7 | −4 −14 |
| 4 5 | −6 7 | −3 7 | 2 4 |
| 4 5 | −6 5 | −5 5 | 0 0 |
| 4 5 | −6 3 | −7 3 | −2 −4 |
| 4 5 | −4 7 | −1 7 | 4 6 |
| 4 5 | −4 5 | −3 5 | 2 2 |
| 4 5 | −4 3 | −5 3 | 0 −2 |
| 4 5 | −4 1 | −7 1 | −2 −6 |
| 4 5 | −2 7 | 1 7 | 6 8 |
| 4 5 | −2 5 | −1 5 | 4 4 |
| 4 5 | −2 3 | −3 3 | 2 0 |
| 4 5 | −2 1 | −5 1 | 0 −4 |
| 4 5 | −2 −1 | −7 −1 | −2 −8 |
| 4 5 | 0 7 | 3 7 | 8 10 |
| 4 5 | 0 5 | 1 5 | 6 6 |
| 4 5 | 0 3 | −1 3 | 4 2 |
| 4 5 | 0 1 | −3 1 | 2 −2 |
| 4 5 | 0 −1 | −5 −1 | 0 −6 |
| 4 5 | 0 −3 | −7 −3 | −2 −10 |
| 4 5 | 2 7 | 5 7 | 10 12 |
| 4 5 | 2 5 | 3 5 | 8 8 |
| 4 5 | 2 3 | 1 3 | 6 4 |
| 4 5 | 2 1 | −1 1 | 4 0 |
| 4 5 | 2 −1 | −3 −1 | 2 −4 |
| 4 5 | 2 −3 | −5 −3 | 0 −8 |
| 4 5 | 2 −5 | −7 −5 | −2 −12 |
| 4 5 | 4 5 | 5 5 | 10 10 |
| 4 5 | 4 3 | 3 3 | 8 6 |
| 4 5 | 4 1 | 1 1 | 6 2 |
| 4 5 | 4 −1 | −1 −1 | 4 −2 |
| 4 5 | 4 −3 | −3 −3 | 2 −6 |

TABLE 2-continued

Example joint MSN/Channel Decoder

| Begin state | end state | channel input | channel output |
|---|---|---|---|
| 4 5 | 4 −5 | −5 −5 | 0 −10 |
| 4 5 | 4−7 | −7 −7 | −2 −14 |
| 6 −7 | −6 7 | −5 7 | −12 2 |
| 6 −7 | −6 5 | −7 5 | −14 −2 |
| 6 −7 | −4 7 | −3 7 | −10 4 |
| 6 −7 | −4 5 | −5 5 | −12 0 |
| 6 −7 | −4 3 | −7 3 | −14 −4 |
| 6 −7 | −2 7 | −1 7 | −8 6 |
| 6 −7 | −2 5 | −3 5 | −10 2 |
| 6 −7 | −2 3 | −5 3 | −12 −2 |
| 6 −7 | −2 1 | −7 1 | −14 −6 |
| 6 −7 | 0 7 | 1 7 | −6 8 |
| 6 −7 | 0 5 | −1 5 | −8 4 |
| 6 −7 | 0 3 | −3 3 | −10 0 |
| 6 −7 | 0 1 | −5 1 | −12 −4 |
| 6 −7 | 0 −1 | −7 −1 | −14 −8 |
| 6 −7 | 2 7 | 3 7 | −4 10 |
| 6 −7 | 2 5 | 1 5 | −6 6 |
| 6 −7 | 2 3 | −1 3 | −8 2 |
| 6 −7 | 2 1 | −3 1 | −10 −2 |
| 6 −7 | 2 −1 | −5 −1 | −12 −6 |
| 6 −7 | 2 −3 | −7 −3 | −14 −10 |
| 6 −7 | 4 5 | 3 5 | −4 8 |
| 6 −7 | 4 3 | 1 3 | −6 4 |
| 6 −7 | 4 1 | −1 1 | −8 0 |
| 6 −7 | 4 −1 | −3 −1 | −10 −4 |
| 6 −7 | 4 −3 | −5 −3 | −12 −8 |
| 6 −7 | 4 −5 | −7 −5 | −14 −12 |
| 6 −7 | 6 3 | 3 3 | −4 6 |
| 6 −7 | 6 1 | 1 1 | −6 2 |
| 6 −7 | 6 −1 | −1 −1 | −8 −2 |
| 6 −7 | 6 −3 | −3 −3 | −10 −6 |
| 6 −7 | 6 −5 | −5 −5 | −12 −10 |
| 6 −7 | 6 −7 | −7 −7 | −14 −14 |
| 6 −5 | −6 7 | −5 7 | −10 2 |
| 6 −5 | −6 5 | −7 5 | −12 −2 |
| 6 −5 | −4 7 | −3 7 | −8 4 |
| 6 −5 | −4 5 | −5 5 | −10 0 |
| 6 −5 | −4 3 | −7 3 | −12 −4 |
| 6 −5 | −2 7 | −1 7 | −6 6 |
| 6 −5 | −2 5 | −3 5 | −8 2 |
| 6 −5 | −2 3 | −5 3 | −10 −2 |
| 6 −5 | −2 1 | −7 1 | −12 −6 |
| 6 −5 | 0 7 | 1 7 | −4 8 |
| 6 −5 | 0 5 | −1 5 | −6 4 |
| 6 −5 | 0 3 | −3 3 | −8 0 |
| 6 −5 | 0 1 | −5 1 | −10 −4 |
| 6 −5 | 0 −1 | −7 −1 | −12 −8 |
| 6 −5 | 2 7 | 3 7 | −2 10 |
| 6 −5 | 2 5 | 1 5 | −4 6 |
| 6 −5 | 2 3 | −1 3 | −6 2 |
| 6 −5 | 2 1 | −3 1 | −8 −2 |
| 6 −5 | 2 −1 | −5 −1 | −10 −6 |
| 6 −5 | 2 −3 | −7 −3 | −12 −10 |
| 6 −5 | 4 5 | 3 5 | −2 8 |
| 6 −5 | 4 3 | 1 3 | −4 4 |
| 6 −5 | 4 1 | −1 1 | −6 0 |
| 6 −5 | 4 −1 | −3 −1 | −8 −4 |
| 6 −5 | 4 −3 | −5 −3 | −10 −8 |
| 6 −5 | 4 −5 | −7 −5 | −12 −12 |
| 6 −5 | 6 3 | 3 3 | −2 6 |
| 6 −5 | 6 1 | 1 1 | −4 2 |
| 6 −5 | 6 −1 | −1 −1 | −6 −2 |
| 6 −5 | 6 −3 | −3 −3 | −8 −6 |
| 6 −5 | 6 −5 | −5 −5 | −10 −10 |
| 6 −5 | 6 −7 | −7 −7 | −12 −14 |
| 6 −3 | −6 7 | −5 7 | −8 2 |
| 6 −3 | −6 5 | −7 5 | −10 −2 |
| 6 −3 | −4 7 | −3 7 | −6 4 |
| 6 −3 | −4 5 | −5 5 | −8 0 |
| 6 −3 | −4 3 | −7 3 | −10 −4 |
| 6 −3 | −2 7 | −1 7 | −4 6 |
| 6 −3 | −2 5 | −3 5 | −6 2 |
| 6 −3 | −2 3 | −5 3 | −8 −2 |
| 6 −3 | −2 1 | −7 1 | −10 −6 |
| 6 −3 | 0 7 | 1 7 | −2 8 |
| 6 −3 | 0 5 | −1 5 | −4 4 |
| 6 −3 | 0 3 | −3 3 | −6 0 |
| 6 −3 | 0 1 | −5 1 | −8 −4 |
| 6 −3 | 0 −1 | −7 −1 | −10 −8 |
| 6 −3 | 2 7 | 3 7 | 0 10 |
| 6 −3 | 2 5 | 1 5 | −2 6 |
| 6 −3 | 2 3 | −1 3 | −4 2 |
| 6 −3 | 2 1 | −3 1 | −6 −2 |
| 6 −3 | 2 −1 | −5 −1 | −8 −6 |
| 6 −3 | 2 −3 | −7 −3 | −10 −10 |
| 6 −3 | 4 5 | 3 5 | 0 8 |
| 6 −3 | 4 3 | 1 3 | −2 4 |
| 6 −3 | 4 1 | −1 1 | −4 0 |
| 6 −3 | 4 −1 | −3 −1 | −6 −4 |
| 6 −3 | 4 −3 | −5 −3 | −8 −8 |
| 6 −3 | 4 −5 | −7 −5 | −10 −12 |
| 6 −3 | 6 3 | 3 3 | 0 6 |
| 6 −3 | 6 1 | 1 1 | −2 2 |
| 6 −3 | 6 −1 | −1 −1 | −4 −2 |
| 6 −3 | 6 −3 | −3 −3 | −6 −6 |
| 6 −3 | 6 −5 | −5 −5 | −8 −10 |
| 6 −3 | 6 −7 | −7 −7 | −10 −14 |
| 6 −1 | −6 7 | −5 7 | −6 2 |
| 6 −1 | −6 5 | −7 5 | −8 −2 |
| 6 −1 | −4 7 | −3 7 | −4 4 |
| 6 −1 | −4 5 | −5 5 | −6 0 |
| 6 −1 | −4 3 | −7 3 | −8 −4 |
| 6 −1 | −2 7 | −1 7 | −2 6 |
| 6 −1 | −2 5 | −3 5 | −4 2 |
| 6 −1 | −2 3 | −5 3 | −6 −2 |
| 6 −1 | −2 1 | −7 1 | −8 −6 |
| 6 −1 | 0 7 | 1 7 | 0 8 |
| 6 −1 | 0 5 | −1 5 | −2 4 |
| 6 −1 | 0 3 | −3 3 | −4 0 |
| 6 −1 | 0 1 | −5 1 | −6 −4 |
| 6 −1 | 0 −1 | −7 −1 | −8 −8 |
| 6 −1 | 2 7 | 3 7 | 2 10 |
| 6 −1 | 2 5 | 1 5 | 0 6 |
| 6 −1 | 2 3 | −1 3 | −2 2 |
| 6 −1 | 2 1 | −3 1 | −4 −2 |
| 6 −1 | 2 −1 | −5 −1 | −6 −6 |
| 6 −1 | 2 −3 | −7 −3 | −8 −10 |
| 6 −1 | 4 5 | 3 5 | 2 8 |
| 6 −1 | 4 3 | 1 3 | 0 4 |
| 6 −1 | 4 1 | −1 1 | −2 0 |
| 6 −1 | 4 −1 | −3 −1 | −4 −4 |
| 6 −1 | 4 −3 | −5 −3 | −6 −8 |
| 6 −1 | 4 −5 | −7 −5 | −8 −12 |
| 6 −1 | 6 3 | 3 3 | 2 6 |
| 6 −1 | 6 1 | 1 1 | 0 2 |
| 6 −1 | 6 −1 | −1 −1 | −2 −2 |
| 6 −1 | 6 −3 | −3 −3 | −4 −6 |
| 6 −1 | 6 −5 | −5 −5 | −6 −10 |
| 6 −1 | 6 −7 | −7 −7 | −8 −14 |
| 6 1 | −6 7 | −5 7 | −4 2 |
| 6 1 | −6 5 | −7 5 | −6 −2 |
| 6 1 | −4 7 | −3 7 | −2 4 |
| 6 1 | −4 5 | −5 5 | −4 0 |
| 6 1 | −4 3 | −7 3 | −6 −4 |
| 6 1 | −2 7 | −1 7 | 0 6 |
| 6 1 | −2 5 | −3 5 | −2 2 |
| 6 1 | −2 3 | −5 3 | −4 −2 |
| 6 1 | −2 1 | −7 1 | −6 −6 |
| 6 1 | 0 7 | 1 7 | 2 8 |
| 6 1 | 0 5 | −1 5 | 0 4 |
| 6 1 | 0 3 | −3 3 | −2 0 |
| 6 1 | 0 1 | −5 1 | −4 −4 |
| 6 1 | 0 −1 | −7 −1 | −6 −8 |
| 6 1 | 2 7 | 3 7 | 4 10 |
| 6 1 | 2 5 | 1 5 | 2 6 |
| 6 1 | 2 3 | −1 3 | 0 2 |
| 6 1 | 2 1 | −3 1 | −2 −2 |

TABLE 2-continued

Example joint MSN/Channel Decoder

| Begin state | end state | channel input | channel output |
|---|---|---|---|
| 6 1 | 2 −1 | −5 −1 | −4 −6 |
| 6 1 | 2 −3 | −7 −3 | −6 −10 |
| 6 1 | 4 5 | 3 5 | 4 8 |
| 6 1 | 4 3 | 1 3 | 2 4 |
| 6 1 | 4 1 | −1 1 | 0 0 |
| 6 1 | 4 −1 | −3 −1 | −2 −4 |
| 6 1 | 4 −3 | −5 −3 | −4 −8 |
| 6 1 | 4 −5 | −7 −5 | −6 −12 |
| 6 1 | 6 3 | 3 3 | 4 6 |
| 6 1 | 6 1 | 1 1 | 2 2 |
| 6 1 | 6 −1 | −1 −1 | 0 −2 |
| 6 1 | 6 −3 | −3 −3 | −2 −6 |
| 6 1 | 6 −5 | −5 −5 | −4 −10 |
| 6 1 | 6 −7 | −7 −7 | −6 −14 |
| 6 3 | −6 7 | −5 7 | −2 2 |
| 6 3 | −6 5 | −7 5 | −4 −2 |
| 6 3 | −4 7 | −3 7 | 0 4 |
| 6 3 | −4 5 | −5 5 | −2 0 |
| 6 3 | −4 3 | −7 3 | −4 −4 |
| 6 3 | −2 7 | −1 7 | 2 6 |
| 6 3 | −2 5 | −3 5 | 0 2 |
| 6 3 | −2 3 | −5 3 | −2 −2 |
| 6 3 | −2 1 | −7 1 | −4 −6 |
| 6 3 | 0 7 | 1 7 | 4 8 |
| 6 3 | 0 5 | −1 5 | 2 4 |
| 6 3 | 0 3 | −3 3 | 0 0 |
| 6 3 | 0 1 | −5 1 | −2 −4 |
| 6 3 | 0 −1 | −7 −1 | −4 −8 |
| 6 3 | 2 7 | 3 7 | 6 10 |
| 6 3 | 2 5 | 1 5 | 4 6 |
| 6 3 | 2 3 | −1 3 | 2 2 |
| 6 3 | 2 1 | −3 1 | 0 −2 |
| 6 3 | 2 −1 | −5 −1 | −2 −6 |
| 6 3 | 2 −3 | −7 −3 | −4 −10 |
| 6 3 | 4 5 | 3 5 | 6 8 |
| 6 3 | 4 3 | 1 3 | 4 4 |
| 6 3 | 4 1 | −1 1 | 2 0 |
| 6 3 | 4 −1 | −3 −1 | 0 −4 |
| 6 3 | 4 −3 | −5 −3 | −2 −8 |
| 6 3 | 4 −5 | −7 −5 | −4 −12 |
| 6 3 | 6 3 | 3 3 | 6 6 |
| 6 3 | 6 1 | 1 1 | 4 2 |
| 6 3 | 6 −1 | −1 −1 | 2 −2 |
| 6 3 | 6 −3 | −3 −3 | 0 −6 |
| 6 3 | 6 −5 | −5 −5 | −2 −10 |
| 6 3 | 6 −7 | −7 −7 | −4 −14 |

Figure 19:
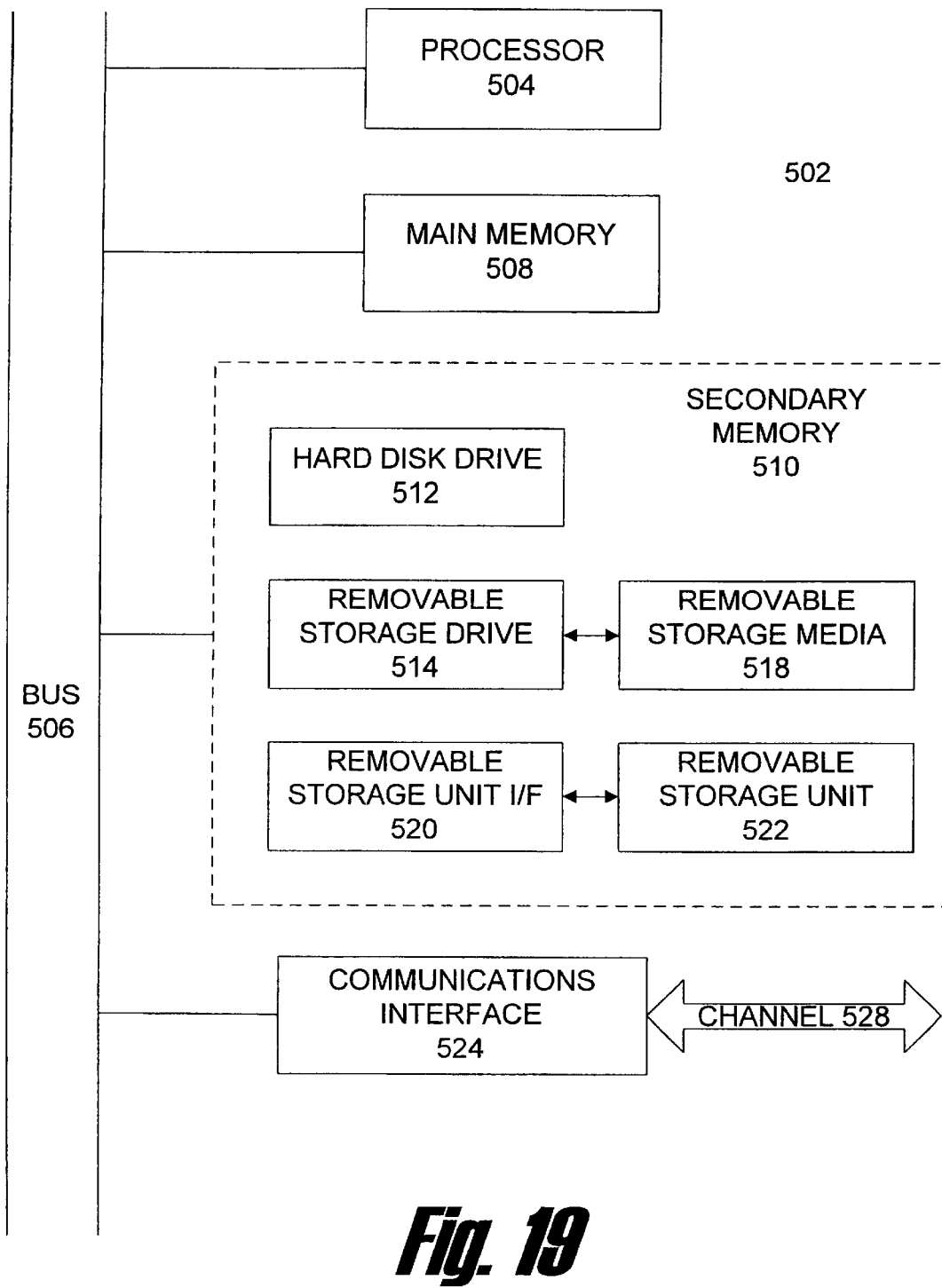
FIG. 19 is a block diagram illustrating an example processor-based system according to one embodiment of the invention.

One or more of the various embodiments, aspects and features of the invention described above may be implemented using hardware, software or a combination thereof and may be implemented using a computing system having one or more processors. In fact, in one embodiment, these elements are implemented using a processor-based system capable of carrying out the functionality described with respect thereto. An example processor-based system 502 s shown in FIG. 19 according to one embodiment of the invention. The computer system 502 includes one or more processors, such as processor 504. The processor 504 is connected to a communication bus 506. Various software embodiments are described in terms of this example computer system. The embodiments, features and functionality of the invention as described above are not dependent on a particular computer system or processor architecture or on a particular operating system. In fact, after reading this document, it will become apparent to a person of ordinary skill in the relevant art how to implement the invention using other computer or processor systems and/or architectures.

Processor-based system 502 can include a main memory 508, preferably random access memory (RAM), and can also include a secondary memory 510. The secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage medium 518 in a well known manner. Removable storage media 518, represents a floppy disk, magnetic tape, optical disk, etc. which is read by and written to by removable storage drive 514. As will be appreciated, the removable storage media 518 includes a computer usable storage medium having stored therein computer software and/or data.

In alternative embodiments, secondary memory 510 may include other similar means for allowing computer programs or other instructions to be loaded into computer system 502. Such means can include, for example, a removable storage unit 522 and an interface 520. Examples of such can include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 518 to computer system 502.

Computer system 502 can also include a communications interface 524. Communications interface 524 allows software and data to be transferred between computer system 502 and external devices. Examples of communications interface 524 can include a modem, a network interface (such as, for example, an Ethernet card), a communications port, a PCMCIA slot and card, etc. Software and data transferred via communications interface 524 are in the form of signals which can be electronic, electromagnetic, optical or other signals capable of being received by communications interface 524. These signals are provided to communications interface via a channel 528. This channel 528 carries signals and can be implemented using a wireless medium, wire or cable, fiber optics, or other communications medium. Some examples of a channel can include a phone line, a cellular phone link, an RF link, a network interface, and other communications channels.

In this document, the terms "computer program medium" and "computer usable medium" are used to generally refer to media such as removable storage device 518, a disk capable of installation in disk drive 512, and signals on channel 528. These computer program products are means for providing software or program instructions to computer system 502.

Computer programs (also called computer control logic) are stored in main memory 508 and/or secondary memory 510. Computer programs can also be received via communications interface 524. Such computer programs, when executed, enable the computer system 502 to perform the features of the present invention as discussed herein. In particular, the computer programs, when executed, enable the processor 504 to perform the features of the present invention. Accordingly, such computer programs represent controllers of the computer system 502.

In an embodiment where the elements are implemented using software, the software may be stored in, or transmitted via, a computer program product and loaded into computer system 502 using removable storage drive 514, hard drive 512 or communications interface 524. The control logic (software), when executed by the processor 504, causes the processor 504 to perform the functions of the invention as described herein.

In another embodiment, the elements are implemented primarily in hardware using, for example, hardware components such as PALs, application specific integrated circuits (ASICs) or other hardware components. Implementation of a hardware state machine so as to perform the functions described herein will be apparent to persons skilled in the relevant art(s). In yet another embodiment, elements are implemented using a combination of both hardware and software.

4. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for writing data to and reading data from a multi-level partial response channel, comprising:
   a trellis coder configured to encode a digital input data stream into a stream of multi-level M-ary data symbols, where $M \geq 3$;
   a laser light source modulated with said data symbols to write said stream of multi-level data symbols to said multi-level partial response channel;
   an optical detector configured to read said written data symbols from said partial response channel, wherein said symbols read differ from said symbols written as a result of a modulation transfer function of said partial response channel, wherein said modulation transfer function includes effects of inter-symbol interference; and
   a symbol decoder configured to decode said symbols read from the partial response channel and to predict a maximum likelihood sequence of said digital data stream, wherein said symbol decoder considers combined effects of said trellis coder and said partial response channel.

2. The system of claim 1, wherein said trellis coder outputs a pair of output symbols for each state transition.

3. The system of claim 2, wherein said trellis coder is further configured to produce a matched spectral null code, having a null at DC.

4. The system of claim 3, wherein a second symbol of said pair of symbols is negated prior to writing said symbols to said partial response channel, thereby creating a null at a desired frequency for said partial response channel.

5. The system of claim 4, wherein said desired frequency is a Nyquist frequency.

6. The system of claim 1, wherein the modulation transfer function of said partial response channel is given by $$c_k = a_k + a_{k-1}$$

where $c_k$ is the output of the partial response channel, $a_k$ is channel input and $a_{k-1}$ is the previous channel input.

7. A system for writing data to and reading data from a multi-level partial response channel, comprising:
   an encoder configured to encode a digital data stream into a stream of multi-level M-ary data symbols, where $M \geq 3$;
   an optical energy source modulated with said data symbols and configured to write said stream of multi-level data symbols to said partial response channel;
   a optical detector configured to read said written data symbols from said partial response channel, wherein said symbols read differ from said symbols written as a result of a transfer function of said partial response channel; and
   a symbol decoder configured to decode said symbols read from the partial response channel and to predict a sequence of said digital data stream, wherein said symbol decoder considers combined effects of said trellis coder and said partial response channel.

8. The system of claim 7, wherein said encoder is a K-state trellis coder and said partial response channel is an L-state channel and wherein said decoder is a K*L-state decoder.

9. The system of claim 8, wherein said trellis coder is a K-state encoder, said partial response channel is an L-state channel and there are J unused joint states, and wherein said decoder is a (K*L −J)-state decoder.

10. The system of claim 8, wherein said trellis coder is an Ungerboeck style trellis coder.

11. The system of claim 7, wherein said decoder is a maximum likelihood decoder.

12. The system of claim 7, wherein said encoder outputs plurality of output symbols for each state transition.

13. The system of claim 7, wherein said encoder is further configured to produce a matched spectral null code, having a null at DC.

14. The system of claim 13, wherein selected symbols of said plurality of symbols is negated prior to writing said symbols to said partial response channel, thereby creating a null at a desired frequency for said partial response channel.

15. The system of claim 14, wherein said desired frequency is a Nyquist frequency.

16. The system of claim 7, wherein the transfer function of said partial response channel is given by $$c_k = a_k + a_{k-1}$$

where $c_k$ is the output of the partial response channel, $a_k$ is channel input and $a_{k-1}$ is the previous channel input.

17. The system of claim 7, wherein the transfer function of said partial response channel is given by at least one of the group of $$c_k = a_k + a_{k-1}$$
$$c_k = a_k + 2a_{k-1} + a_{k-2}$$
$$c_k = a_k + 2a_{k-1} + 2a_{k-2} + a_{k-3}$$
$$c_k = a_k + a_{k-1} + a_{k-2} + a_{k-3}$$

where $c_k$ is the output of the partial response channel, $a_k$ is channel input and $a_{k-N}$ is the previous channel input.

18. The system of claim 7, wherein the transfer function of said partial response channel is given by $$c_k = \sum_{j=0}^{j=N} \alpha_j (a_{k-j})$$

where $c_k$ is the output of the partial response channel, $a_j$ is channel input and $a_{j-N}$ is the previous channel input.

19. A method for writing data to and reading data from a multi-level partial response channel, comprising:
   encoding a digital data stream into a stream of multi-level M-ary data symbols using a trellis encoder, where $M \geq 3$;
   optically writing said stream of multi-level data symbols to said partial response channel;
   optically reading said written data symbols from said partial response channel, wherein said symbols read differ from said symbols written as a result of a modulation transfer function of said partial response channel; and decoding said symbols read from the partial response channel and to predict a sequence of said digital data stream, wherein said decoding considers combined effects of said trellis coder and said partial response channel.

20. The method of claim 19, wherein said trellis coder is a K-state encoder and said partial response channel is an L-state channel and wherein said decoder is a K*L-state decoder.

21. The method of claim 19, wherein said trellis coder is a K-state encoder, said partial response channel is an L-state channel and there are J unused states, and wherein said decoder is a (K*L−J)-state decoder.

22. The method of claim 19, wherein said encoding utilizes an Ungerboeck style trellis encoder.

23. The method of claim 19, wherein said decoding utilizes a Viterbi decoder.

24. The method of claim 19, wherein said encoding outputs a plurality of output symbols for each state transition.

25. The method of claim 19, wherein said encoding produces a matched spectral null code, having a null at DC.

26. The method of claim 24, further comprising negating a selected symbols of said plurality of symbols prior to writing said symbols to said partial response channel, thereby creating a null at a desired frequency for said partial response channel.

27. The method of claim 26, wherein said desired frequency is a Nyquist frequency.

28. The method of claim 19, wherein the transfer function of said partial response channel is given by $$c_k = \sum_{j=0}^{j=N} \alpha_j(a_{k-j})$$

where $c_k$ is the output of the partial response channel, $a_j$ is channel input and $a_{j-N}$ is the previous channel input.

29. The system of claim 19, wherein the transfer function of said partial response channel is given by at least one of the group of $c_k = a_k + a_{k-1}$ $c_k = a_k + 2a_{k-1} + a_{k-2}$ $c_k = a_k + 2a_{k-1} + 2a_{k-2} + a_{k-3}$ $c_k = a_k + a_{k-1} + a_{k-2} + a_{k-3}$ where $c_k$ is the output of the partial response channel, $a_k$ is channel input and $a_{k-N}$ is the previous channel input.

30. A system for writing data to and reading data from a multi-level partial response channel, comprising:
means for encoding a digital data stream into a stream of multi-level M-ary data symbols, where M≧3;
means for optically writing said stream of multi-level data symbols to said partial response channel;
means for optically reading said written data symbols from said partial response channel, wherein said symbols read differ from said symbols written as a result of a modulation transfer function of said partial response channel; and
means for decoding said symbols read from the partial response channel and to predict a sequence of said digital data stream, wherein said means for decoding considers combined effects of said encoding means and said partial response channel.

31. The system of claim 30, wherein said means for encoding outputs a plurality of output symbols for each state transition.

32. The system of claim 30, wherein said means for encoding is further configured to produce a matched spectral null code, having a null at DC.

33. The system of claim 31, further comprising means for negating selected symbols of said plurality of symbols prior to writing said symbols to said partial response channel, thereby creating a null at a desired frequency for said partial response channel.

34. The system of claim 33, wherein said desired frequency is a Nyquist frequency.

35. A computer program product comprising a computer useable medium having computer program logic recorded thereon for writing data to and reading data from a multi-level partial response channel, comprising:
computer program code logic configured to encode a digital data stream into a stream of multi-level M-ary data symbols, where M≧3;
computer program code logic configured to modulate an optical signal so as to write said stream of multi-level data symbols to said partial response channel;
computer program code logic configured to interpret a received optical signal so as to read said written data symbols from said partial response channel, wherein said symbols read differ from said symbols written as a result of a modulation transfer function of said partial response channel; and
computer program code logic configured to decode said symbols read from the partial response channel and to predict a sequence of said digital data stream, wherein said computer program code logic for decoding considers combined effects of said trellis coder and said partial response channel.

36. The computer program product of claim 35, wherein said computer program code logic configured to encode provides a plurality of output symbols for each state transition.

37. The computer program product of claim 35, wherein said computer program code logic configured to encode is further configured to produce a matched spectral null code, having a null at DC.

38. The computer program product of claim 36, further comprising computer program code logic configured to negate selected symbols of said plurality of symbols prior to writing said symbols to said partial response channel, thereby creating a null at a desired frequency for said partial response channel.

39. The computer program product of claim 38, wherein said desired frequency is a Nyquist frequency.

40. A system for decoding data read from an optical multi-level partial response recording or transmission channel, comprising:
an optical detector configured to read data symbols from said multi-level partial response channel, wherein said symbols were written to said channel using a trellis coder configured to encode a digital input data stream into a stream of multi-level M-ary data symbols, where M≧3, and wherein said symbols read differ from said symbols written as a result of a modulation transfer function of said partial response channel; and
a symbol decoder configured to decode said symbols read from the partial response channel and to predict a sequence of said digital data stream, wherein said symbol decoder considers combined effects of said trellis coder and said partial response channel.

41. The system of claim 40, wherein said trellis coder is a K-state encoder, said partial response channel is an L-state channel and there are J unused states, and wherein said decoder is a (K*L−J)-state decoder.

42. The system of claim 40, wherein said trellis coder is a K-state encoder, said partial response channel is an L-state channel and wherein said decoder is a K*L-state decoder.

43. A method for reading data from an optical multi-level partial response recording or transmission channel, comprising;

receiving an optical signal defining data symbols from said multi-level partial response channel, wherein said symbols were written to said channel using an encoder configured to encode a digital input data stream into a stream of multi-level M-ary data symbols, where $M \geq 3$, and wherein said symbols read differ from said symbols written as a result of a modulation transfer function of said partial response channel; and decoding said symbols read from the partial response channel and to predict a sequence of said digital data stream, wherein said symbol decoding considers combined effects of said trellis coder and said partial response channel.

44. A computer program product comprising a computer useable medium having computer program logic stored thereon for reading data from a multi-level partial response channel, comprising:

computer program code logic configured to receive data symbols from said multi-level partial response channel generated by an optical signal receiver, wherein said symbols were written to said channel using an encoder configured to encode a digital input data stream into a stream of multi-level M-ary data symbols, where $M \geq 3$, and wherein said symbols read differ from said symbols written as a result of a modulation transfer function of said partial response channel; and computer program code logic configured to decode said symbols read from the partial response channel and to predict a sequence of said digital data stream, wherein said symbol decoding considers combined effects of said encoder and said partial response channel.

45. The computer program product of claim 44, wherein said trellis coder is a K-state encoder, said partial response channel is an L-state channel and there are J unused joint states, and wherein said computer program code logic configured to decode said symbols read from the partial response channel is a (K*L−J)-state decoder.

46. The computer program product of claim 44, wherein said trellis coder is a K-state encoder, said partial response channel is an L-state channel and wherein said computer program code logic configured to decode said symbols read from the partial response channel is a K*L-state decoder.

47. A system for writing data to a multi-level partial response channel, comprising:

a K-state encoder configured to encode a digital data stream into a stream of multi-level M-ary data symbols, where $M \geq 3$; and an optical energy source modulated with said data symbols to write said stream of multi-level data symbols to said partial response channel, wherein said partial response channel is an L-state channel, and wherein said written data are subsequently decoded using a K*L state decoder.

48. The system of claim 47, wherein there are J unused states, and wherein said decoder is a (K*L−J)-state decoder.

49. The system of claim 47, wherein said encoder outputs a plurality of output symbols for each state transition.

50. The system of claim 47, wherein said trellis coder is further configured to produce a matched spectral null code, having a null at DC.

51. The system of claim 49, wherein selected symbols of said plurality of symbols is negated prior to writing said symbols to said partial response channel, thereby creating a null at a selected frequency for said partial response channel.

52. The system of claim 47, wherein the transfer function of said partial response channel is given by $$c_k = \sum_{j=0}^{j=N} \alpha_j(a_{k-j})$$

where $c_k$ is the output of the partial response channel, $a_j$ is channel input and $a_{j-N}$ is the previous channel input.

53. The system of claim 47, wherein the transfer function of said partial response channel is given by at least one of the group of $$c_k = a_k + a_{k-1}$$

$$c_k = a_k + 2a_{k-1} + a_{k-2}$$

$$c_k = a_k + 2a_{k-1} + 2a_{k-2} + a_{k-3}$$

$$c_k = a_k + a_{k-1} + a_{k-2} + a_{k-3}$$

where $c_k$ is the output of the partial response channel, $a_k$ is channel input and $a_{k-N}$ is the previous channel input.

54. A system for optical data storage or transmission via a channel that is characterized by at least some inter-symbol interference, said system comprising:

a trellis encoder having a binary stream of data bits as an input and a multi-level M-ary first stream of symbols as an output, wherein M is at least 8, and wherein said trellis encoder has a code rate of at least 2.5 bits per symbol;

a light source modulated at least in part in accordance with said first stream of symbols so as to introduce an optical signal to said channel;

an optical signal detector coupled to said channel and configured to output a second stream of symbols, said second stream of symbols being defined at least in part by said first optical signal and by inter-symbol interference introduced by said channel; and a decoder coupled to receive said second stream of symbols and configured to predict a maximum likelihood bit sequence of said binary bit stream therefrom, wherein said decoder considers the combined effect on said binary bit stream of both said trellis coder and said channel.

55. The system of claim 54, wherein said decoder comprises Viterbi decoder having at least 50 states.

56. The system of claim 54, wherein said optical signal detector comprises an equalization filter characterized by a transfer function, and wherein said second stream of symbols is also defined at least in part by said transfer function.

* * * * *